US008479018B2

(12) United States Patent
Futa et al.

(10) Patent No.: US 8,479,018 B2
(45) Date of Patent: Jul. 2, 2013

(54) SYSTEM FOR MAKING PROGRAM DIFFICULT TO READ, DEVICE FOR MAKING PROGRAM DIFFICULT TO READ, AND METHOD FOR MAKING PROGRAM DIFFICULT TO READ

(75) Inventors: Yuichi Futa, Osaka (JP); Taichi Sato, Osaka (JP); Rieko Asai, Osaka (JP); Motoji Ohmori, Osaka (JP); Masahiro Mambo, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1143 days.

(21) Appl. No.: 12/297,929

(22) PCT Filed: Apr. 27, 2007

(86) PCT No.: PCT/JP2007/059158
§ 371 (c)(1),
(2), (4) Date: Mar. 16, 2009

(87) PCT Pub. No.: WO2007/126049
PCT Pub. Date: Nov. 8, 2007

(65) Prior Publication Data
US 2009/0228717 A1  Sep. 10, 2009

(30) Foreign Application Priority Data
Apr. 28, 2006   (JP) ................. 2006-125926

(51) Int. Cl.
*G06F 11/30* (2006.01)
(52) U.S. Cl.
USPC ........................................ 713/190; 713/194
(58) Field of Classification Search
USPC ................................ 713/190, 194
See application file for complete search history.

(56) References Cited

U.S. PATENT DOCUMENTS

| | | | | |
|---|---|---|---|---|
| 7,587,616 | B2* | 9/2009 | Jakubowski | 713/190 |
| 2004/0139340 | A1* | 7/2004 | Johnson et al. | 713/194 |
| 2005/0071655 | A1* | 3/2005 | de Jong | 713/190 |
| 2005/0084098 | A1* | 4/2005 | Brickell | 380/28 |
| 2005/0210275 | A1* | 9/2005 | Homing et al. | 713/190 |
| 2006/0195703 | A1* | 8/2006 | Jakubowski | 713/190 |

OTHER PUBLICATIONS

International Search Report issued Jun. 20, 2007 in the International (PCT) Application of which the present application is the U.S. National Stage.
M. Shand and J. Vuillemin. *Fast Implementations of RSA Cryptography.* IEEE (Online), 1993. pp. 252-259.
Paul Tyma. *The New Obfuscation.* Java.net (Online), 2004.
Marjanne Plasmans. *White-Box Cryptography for Digital Content Protection.* Master"s Thesis for Department of Mathematics and Computer Science Technische Universiteit Eindhoven (Online), 2005. pp. 28-41.

* cited by examiner

*Primary Examiner* — Thuong Nguyen
*Assistant Examiner* — James Forman
(74) *Attorney, Agent, or Firm* — Wenderoth, Lind & Ponack, L.L.P.

(57) ABSTRACT

An obfuscating apparatus creates a table for inputting the same number of arguments for multiplying and squaring operations, and sets the output values of the table so that the outputs may depend on the arguments. With regard to the squaring operations, there are added and tabulated adding operations using the arguments necessary only for the multiplications, so that the number of arguments is equal to that of the multiplication operations. The outputs depend on all the arguments, so that the presence or absence of the added arguments is unknown unlike the case in which dummy arguments that are not processed are added.

11 Claims, 40 Drawing Sheets

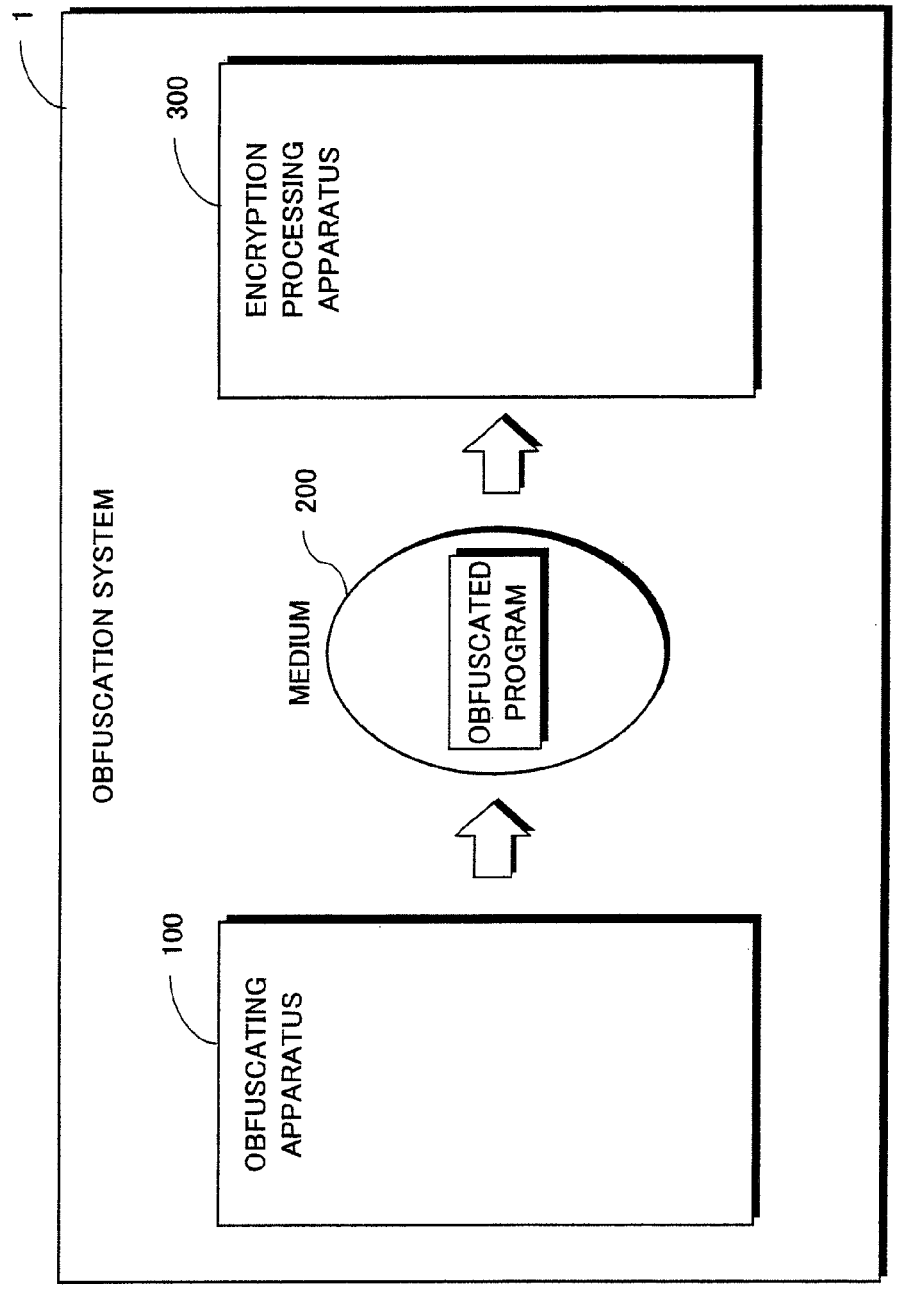

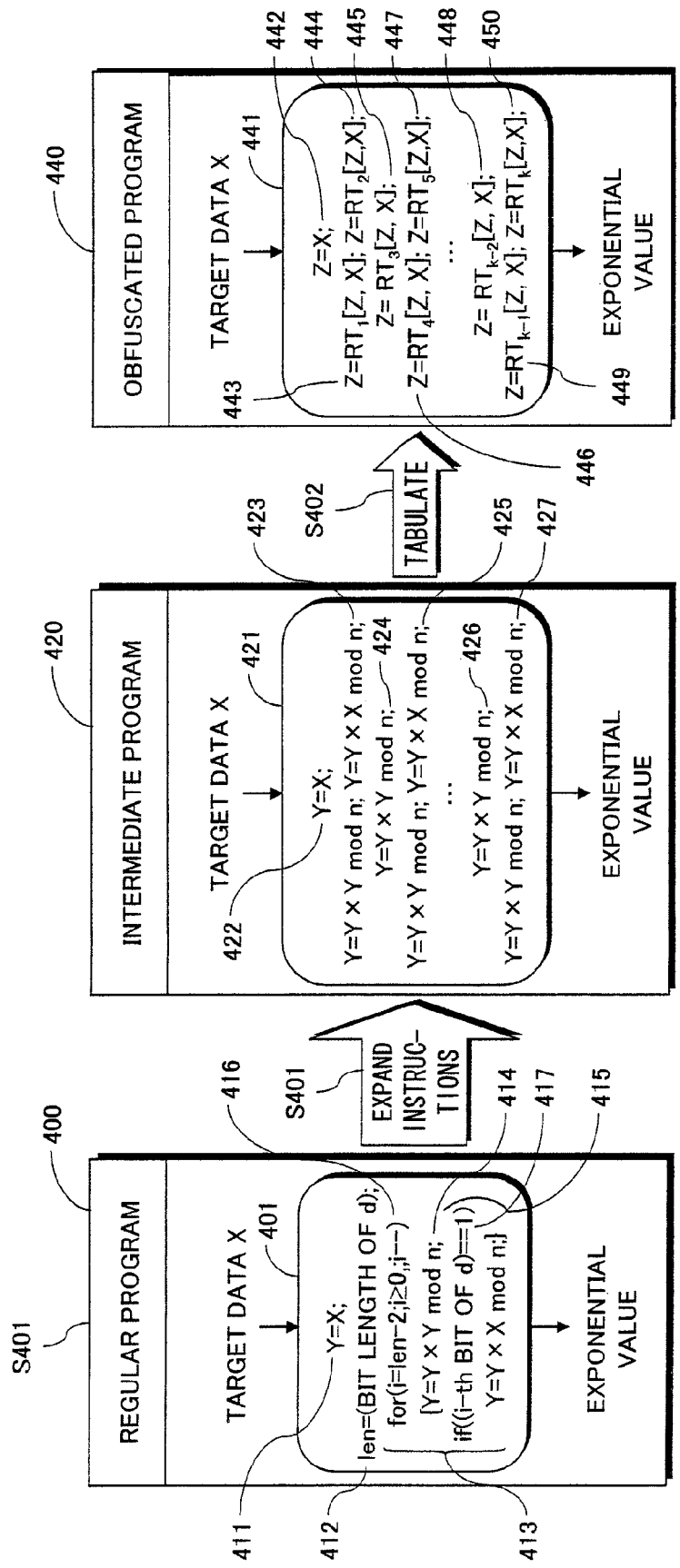

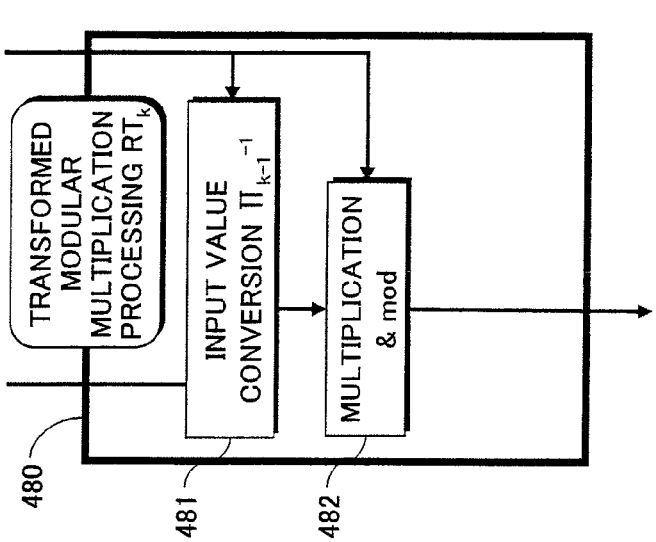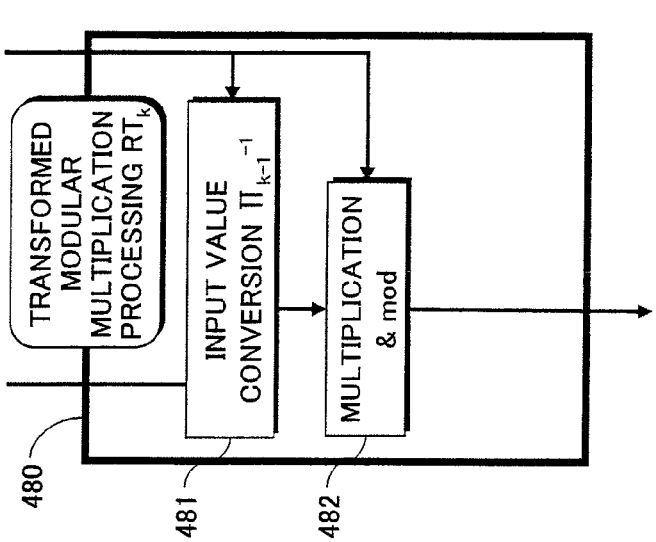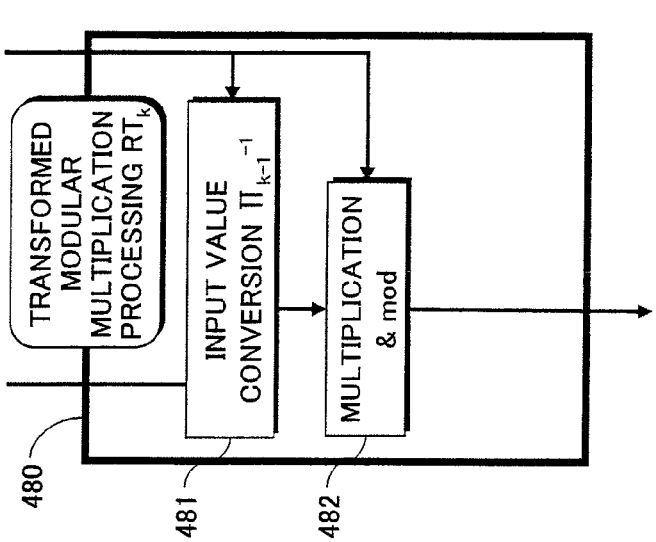

FIG.25

| $Z_0$ | $Z_1$ | $X_0$ | $X_1$ | $\phi^{-1}(Z_0)$ | $\phi^{-1}(Z_1)$ | $g(X_0)$ | $g(X_1)$ | $\phi^{-1}(Z_0) \times X_1 + \phi^{-1}(Z_1) \times X_0 - g(X_0) \times X_1 - g(X_1) \times X_0$ | out1 | out2 | out3 |
|---|---|---|---|---|---|---|---|---|---|---|---|
| 0 | 0 | 0 | 0 | 2 | 2 | 2 | 2 | $2 \times 0 + 2 \times 0 - 2 \times 0 - 2 \times 0 = 0$ | $\gamma_3(0)=5$ | $\beta(0)=5$ | $\beta(0)=5$ |
| 0 | 0 | 0 | 1 | 2 | 2 | 2 | 6 | $2 \times 1 + 2 \times 0 - 2 \times 1 - 6 \times 0 = 0$ | $\gamma_3(0)=7$ | $\beta(0)=5$ | $\beta(0)=5$ |
| ⋮ | ⋮ | ⋮ | ⋮ | ⋮ | ⋮ | ⋮ | ⋮ | | ⋮ | ⋮ | ⋮ |
| 1 | 2 | 3 | 4 | 1 | 6 | 3 | 1 | $1 \times 4 + 6 \times 3 - 3 \times 4 - 1 \times 3 = 7$ | $\gamma_3(0)=5$ | $\beta(0)=0$ | $\beta(7)=2$ |
| ⋮ | ⋮ | ⋮ | ⋮ | ⋮ | ⋮ | ⋮ | ⋮ | | ⋮ | ⋮ | ⋮ |
| 6 | 5 | 4 | 3 | 5 | 3 | 1 | 3 | $5 \times 3 + 3 \times 4 - 1 \times 3 - 3 \times 4 = 12$ | $\gamma_3(0)=7$ | $\beta(1)=6$ | $\beta(12)=4$ |
| ⋮ | ⋮ | ⋮ | ⋮ | ⋮ | ⋮ | ⋮ | ⋮ | | ⋮ | ⋮ | ⋮ |
| 7 | 7 | 7 | 7 | 0 | 0 | 4 | 4 | $0 \times 7 + 0 \times 7 - 4 \times 7 - 4 \times 7 = -56$ | $\gamma_3(-1)=1$ | $\beta(1)=6$ | $\beta(0)=5$ |

1360

1361  1362  1363  1364

| U | β(U) |
|---|------|
| 0 | 5 |
| 1 | 6 |
| 2 | 7 |
| 3 | 0 |
| 4 | 4 |
| 5 | 3 |
| 6 | 1 |
| 7 | 2 |

| U | φ⁻¹(U) |
|---|--------|
| 0 | 2 |
| 1 | 1 |
| 2 | 6 |
| 3 | 7 |
| 4 | 4 |
| 5 | 3 |
| 6 | 5 |
| 7 | 0 |

| U | g(U) |
|---|------|
| 0 | 2 |
| 1 | 6 |
| 2 | 0 |
| 3 | 3 |
| 4 | 1 |
| 5 | 5 |
| 6 | 7 |
| 7 | 4 |

| U | $\gamma_3(U)$ |
|---|------|
| -2 | 4 |
| -1 | 0 |
| -1 | 1 |
| 0 | 5 |
| 0 | 7 |
| 1 | 6 |
| 1 | 3 |
| 2 | 2 |

FIG.28

| $Z_0$ | $Z_1$ | $X_0$ | $X_1$ | $\phi^{-1}(Z_0)$ | $\phi^{-1}(Z_1)$ | $g(X_0)$ | $g(X_1)$ | $\phi^{-1}(Z_0) \times X_1 + \phi^{-1}(Z_1) \times X_0 - g(X_0) \times X_1 - g(X_1) \times X_0$ | out1 | out2 | out3 |
|---|---|---|---|---|---|---|---|---|---|---|---|
| 0 | 0 | 0 | 0 | 2 | 2 | 2 | 2 | $2\times 0 + 2\times 0 - 2\times 0 - 2\times 0 = 0$ | $\gamma_3(0)=5$ | $\beta(0)=5$ | $\beta(0)=5$ |
| 0 | 0 | 0 | 1 | 2 | 2 | 2 | 6 | $2\times 1 + 2\times 0 - 2\times 1 - 6\times 0 = 0$ | $\gamma_3(0)=7$ | $\beta(0)=5$ | $\beta(0)=5$ |
| ⋮ | ⋮ | ⋮ | ⋮ | ⋮ | ⋮ | ⋮ | ⋮ | ⋮ | ⋮ | ⋮ | ⋮ |
| 1 | 2 | 3 | 4 | 1 | 6 | 3 | 1 | $1\times 4 + 6\times 3 - 3\times 4 - 1\times 3 = 7$ | $\gamma_3(0)=5$ | $\beta(0)=0$ | $\beta(7)=2$ |
| ⋮ | ⋮ | ⋮ | ⋮ | ⋮ | ⋮ | ⋮ | ⋮ | ⋮ | ⋮ | ⋮ | ⋮ |
| 6 | 5 | 4 | 3 | 5 | 3 | 1 | 3 | $5\times 3 + 3\times 4 - 1\times 3 - 3\times 4 = 12$ | $\gamma_3(0)=7$ | $\beta(1)=6$ | $\beta(12)=4$ |
| ⋮ | ⋮ | ⋮ | ⋮ | ⋮ | ⋮ | ⋮ | ⋮ | ⋮ | ⋮ | ⋮ | ⋮ |
| 7 | 7 | 7 | 7 | 0 | 0 | 4 | 4 | $0\times 7 + 0\times 7 - 4\times 7 - 4\times 7 = -56$ | $\gamma_3(-1)=1$ | $\beta(1)=6$ | $\beta(0)=5$ |

1390

| U | $\beta(U)$ |
|---|---|
| 0 | 5 |
| 1 | 6 |
| 2 | 7 |
| 3 | 0 |
| 4 | 4 |
| 5 | 3 |
| 6 | 1 |
| 7 | 2 |

1391

| U | $\phi^{-1}(U)$ |
|---|---|
| 0 | 2 |
| 1 | 1 |
| 2 | 6 |
| 3 | 7 |
| 4 | 4 |
| 5 | 3 |
| 6 | 5 |
| 7 | 0 |

1392

| U | $g(U)$ |
|---|---|
| 0 | 2 |
| 1 | 6 |
| 2 | 0 |
| 3 | 3 |
| 4 | 1 |
| 5 | 5 |
| 6 | 7 |
| 7 | 4 |

1393

| U | $\gamma_3(U)$ |
|---|---|
| -2 | 4 |
| -1 | 0 |
| -1 | 1 |
| 0 | 5 |
| 0 | 7 |
| 1 | 6 |
| 1 | 3 |
| 2 | 2 |

| in1 | in2 | $\beta^{-1}(in1)$ | $\beta^{-1}(in2)$ | $\beta^{-1}(in1)+$ $\beta^{-1}(in2)$ | $\beta^{-1}(in1)+$ $\beta^{-1}(in2)$ mod 8 | out2 | $[(\beta^{-1}(in1)+$ $\beta^{-1}(in2))-out2]/8$ | out1 |
|---|---|---|---|---|---|---|---|---|
| 0 | 0 | 3 | 3 | 6 | 6 | 1 | 0 | 1 |
|   | 1 | 3 | 6 | 9 | 3 | 1 | 1 | 3 |
|   | 2 | 3 | 7 | 10 | 2 | 7 | 1 | 5 |
| ... | ... | ... | ... | ... | ... | ... | ... | ... |
| 1 | 0 | 6 | 3 | 9 | 1 | 6 | 1 | 2 |
|   | 1 | 6 | 6 | 12 | 4 | 4 | 1 | 7 |
|   | 2 | 6 | 7 | 13 | 5 | 3 | 1 | 2 |
| ... | ... | ... | ... | ... | ... | ... | ... | ... |

1410

1411

| U | β(U) |
|---|---|
| 0 | 5 |
| 1 | 6 |
| 2 | 7 |
| 3 | 0 |
| 4 | 4 |
| 5 | 3 |
| 6 | 1 |
| 7 | 2 |

1412

| U | $\gamma_1(U)$ |
|---|---|
| 0 | 0 |
| 0 | 1 |
| 0 | 4 |
| 0 | 6 |
| 1 | 2 |
| 1 | 3 |
| 1 | 5 |
| 1 | 7 |

1413

| in1 | $\beta^{-1}(in1)$ |
|---|---|
| 0 | 3 |
| 1 | 6 |
| 2 | 7 |
| 3 | 5 |
| 4 | 4 |
| 5 | 0 |
| 6 | 1 |
| 7 | 2 |

| U | $\beta(U)$ |
|---|---|
| 0 | 5 |
| 1 | 6 |
| 2 | 7 |
| 3 | 0 |
| 4 | 4 |
| 5 | 3 |
| 6 | 1 |
| 7 | 2 |

| U | g(U) |
|---|---|
| 0 | 2 |
| 1 | 6 |
| 2 | 0 |
| 3 | 3 |
| 4 | 1 |
| 5 | 5 |
| 6 | 7 |
| 7 | 4 |

| U | $\gamma_3(U)$ |
|---|---|
| -2 | 4 |
| -1 | 0 |
| -1 | 1 |
| 0 | 5 |
| 0 | 7 |
| 1 | 6 |
| 1 | 3 |
| 2 | 2 |

FIG.43

| $Z_0$ | $Z_1$ | $X_0$ | $X_1$ | $g(X_0)$ | $g(X_1)$ | $Z_0 \times X_1 + Z_1 \times X_0 - g(X_0) \times X_1 - g(X_1) \times X_0 + g(X_1)$ | out3 | out2 | out1 |
|---|---|---|---|---|---|---|---|---|---|
| 0 | 0 | 0 | 0 | 2 | 2 | $0\times 0+0\times 0-2\times 0-2\times 0+2=2$ | $\beta(2)=7$ | $\beta(0)=5$ | $\gamma_3(0)=5$ |
| 0 | 0 | 0 | 1 | 2 | 6 | $0\times 1+0\times 0-2\times 1-6\times 0+6=6$ | $\beta(6)=1$ | $\beta(0)=5$ | $\gamma_3(0)=7$ |
| ⋮ | ⋮ | ⋮ | ⋮ | ⋮ | ⋮ | ⋮ | ⋮ | ⋮ | ⋮ |
| 1 | 2 | 3 | 4 | 3 | 1 | $1\times 4+2\times 3-3\times 4-1\times 3+1=-4$ | $\beta(4)=4$ | $\beta(0)=5$ | $\gamma_3(0)=5$ |
| ⋮ | ⋮ | ⋮ | ⋮ | ⋮ | ⋮ | ⋮ | ⋮ | ⋮ | ⋮ |
| 6 | 5 | 4 | 3 | 1 | 3 | $6\times 3+5\times 4-1\times 3-3\times 4+3=26$ | $\beta(2)=7$ | $\beta(3)=0$ | $\gamma_3(0)=7$ |
| ⋮ | ⋮ | ⋮ | ⋮ | ⋮ | ⋮ | ⋮ | ⋮ | ⋮ | ⋮ |
| 7 | 7 | 7 | 7 | 4 | 4 | $7\times 7+7\times 7-4\times 7-4\times 7+4=46$ | $\beta(6)=1$ | $\beta(5)=3$ | $\gamma_3(0)=5$ |

1421

SYSTEM FOR MAKING PROGRAM DIFFICULT TO READ, DEVICE FOR MAKING PROGRAM DIFFICULT TO READ, AND METHOD FOR MAKING PROGRAM DIFFICULT TO READ

BACKGROUND OF THE INVENTION

1. Technical Field

The present invention relates to an information security technology, in particular, to a technology for obfuscating computer programs.

2. Background Art

In recent years, with widespread use of information communication technology, importance of information security technology is increasingly acknowledged. As one type of information security technology, encryption technology is realized as encryption software, which is a computer program, and is used for conducting secret communication, protecting privacy, confirming communication partners, and so on.

When encryption software is implemented in a computer system such as an information processing device or a communication device, if its secret key, encryption algorithm, and the like are implemented without any additional processing, the secret key will be easily leaked when malicious users analyze (referred to as "program analysis") these during program execution. Accordingly, tamper-resistant techniques for improving resistance against program analysis are in demand. As one example of a tamper-resistant technique, Patent Document 1 discloses a method to obfuscate programs by tabulating processes such as encryption and the like, including random conversion operations.

FIG. 39 shows the conventional obfuscation method described in Patent Document 1.

According to this conventional obfuscation method, obfuscation processing (steps S9001 to S9002) is applied to a regular program 9000, which is an encryption program or decryption program of symmetric-key cryptography and has not been obfuscated yet, to generate and output an obfuscated program 9002. Detail of this obfuscation method is given below.

According to the conventional obfuscation method, first, multiple program instructions which compose the regular program 9000 are divided into processing 1 to n (n being a natural number) which use keys $key_1$ to $key_n$ of symmetric-key cryptography, respectively, thereby generating a processing division program 9001 including the processing 1 to n (step S9001).

Next, an output value conversion operation $\pi_1$ and an output value inverse conversion operation $\pi_1^{-1}$ are inserted immediately after the processing 1, an output value conversion operation $\pi_2$ and an output value inverse conversion operation $\pi_2^{-1}$ are inserted immediately after the processing 2, an output value conversion operation $\pi_3$ and an output value inverse conversion operation $\pi_3^{-1}$ are inserted immediately after the processing 3, ..., an output value conversion operation $\pi_i$ and an output value inverse conversion operation $\pi_i^{-1}$ are inserted immediately after the processing i, ..., and an output value conversion operation $\pi_{n-1}$ and an output value inverse conversion operation $\pi_{n-1}^{-1}$ are inserted immediately after the processing n−1. Here, $\pi_i^{-1}$ represents the inverse conversion of the conversion operation $\pi_i$ (i=1, 2, 3, ..., n−1).

Next, a table $RT_1$ is generated by tabulating the processing 1 and the output value conversion operation $\pi_1$, a table $RT_2$ is generated by tabulating the output value inverse conversion operation $\pi_1^{-1}$, the processing 2, and the output value conversion operation $\pi_2$, a table $RT_3$ is generated by tabulating the output value inverse conversion operation $\pi_2^{-1}$, the processing 3, and the output value conversion operation $\pi_3$, ..., a table $RT_{i+1}$ is generated by tabulating the output value inverse conversion operation $\pi_i^{-1}$, the processing i+1, and the output value conversion operation $\pi_{i+1}$, ..., and lastly, a table $RT_n$ is generated by tabulating the output value inverse conversion operation $\pi_{n-1}^{-1}$ and the processing n. This is how the obfuscated program 9002 including the tables $RT_1, RT_2, \ldots, RT_n$ is generated (step S9002).

Here, if the keys $key_1$ to $key_n$ are predetermined fixed numbers, they can be included in the tables as well.

According to the technique described in Patent Document 1, each table $RT_1, \ldots, RT_{n-1}$ converts the output value of each processing 1, ..., n using the output value conversion operations $\pi_1, \ldots, \pi_{n-1}$, respectively. Thus, input values and output values to/from each table are converted values. Consequently, even with use of the input values and output values of each table, it is difficult to analyze operations performed in each table, which provides resistance against program analysis. In addition, the output value conversion operation z performed in the table $RT_i$ is inversely converted by the output value inverse conversion operation $\pi_i^{-1}$ performed in the table $RT_{i+1}$ that immediately follows the table $RT_i$. Accordingly, the execution result of the program is the same as that of the regular program before obfuscation.

FIG. 40 shows an example of a table generated according to the conventional obfuscation method. As shown in this figure, for each input value "in" included in a set 9011, an intermediate value $a_1$ is calculated using the processing 1 (step S9003). Following that, for each intermediate value $a_1$, the output value conversion operation $\pi_1$ which is a random bijective conversion operation is applied to calculate the post-conversion value $\pi_1(a_1)$ converted by the output value conversion operation $\pi_1$ (step S9004). After that, a table $RT_1$ 9014 in which the input value "in" and the post-conversion value $\pi_1(a_1)$ are associated with each other is created (step S9005).

Therefore, it can be said that the conventional obfuscation method described in Patent Document 1 serves the purpose of obfuscating programs to a certain extent. However, there are needs for an obfuscating technique able to further enhance resistance to program analysis.

Patent Document 1: International Publication Pamphlet No. WO02/46890

Non-Patent Document 1: Tatsuaki Omamoto & Hiroshi Yamamoto, Gendai Angou (Mondern Cryptography), Sangyo Tosho, 1997.

Non-Patent Document 2: H. Cohen, "A Course in Computational Algebraic Number Theory", GTM 138, Springer-verlag, 1996, P. 9.

SUMMARY OF THE INVENTION

In response to the above need, the present invention aims to provide a program obfuscation system, a program obfuscating apparatus, a program obfuscation method, a program obfuscating program, and a recording medium recorded with the program obfuscating program able to further enhance resistance against program analysis.

In order to achieve the aforementioned aim, the present invention is a program obfuscating apparatus which obfuscates an information security program instructing execution of a security operation that processes target information securely and reliably with use of key information. The program obfuscating apparatus comprises: an acquisition unit operable to acquire the information security program in which a plurality of basic operations are placed in an order determined by the key information such that an operation result of the plurality of basic operations is equivalent to an operation result of the security operation, the plurality of basic operations being one or more first basic operations and one or more second basic operations, each of the first basic operations requiring a plurality of inputs, and each of the second basic operations requiring only part of the plurality of inputs; a transformation unit operable to place an input dependent conversion operation and an input dependent inverse conversion operation before and after each of the second basic operations, respectively, the input dependent conversion operation depending on, among the plurality of inputs, one or more inputs unrequired for the second basic operation, and the input dependent inverse conversion operation being an inverse conversion of the input dependent conversion operation; a table generating unit operable to, for each of the second basic operations, (i) generate a table which yields an operation result equivalent to an operation result of a set of operations including the input dependent conversion operation placed immediately before the second basic operation, the second basic operation, and the input dependent inverse conversion operation placed immediately after the second basic operation, and (ii) generate a reference instruction to refer to the table; and an output unit operable to output an obfuscated program including the generated tables and the generated reference instructions.

According to the stated structure, while a first basic operation requires a plurality of inputs, and a second basic operation requires only part of the plurality of inputs, the obfuscating apparatus places an input dependent conversion operation which depends on one or more inputs unrequired for the second basic operation and its inverse conversion operation, namely, an input dependent inverse conversion operation, before and after the second basic operations, respectively. This reduces the difference between the numbers of inputs to the first basic operation and the second basic operation, thereby countering attacks which use the difference in the number of inputs as a clue to program analysis, and increasing resistance to program analysis as a result.

The transformation unit may further, with respect to each of the first basic operations, one of (a) place an input dependent conversion operation before the first basic operation, (b) place an input dependent inverse conversion operation after the first basic operation, and (c) place an input dependent conversion operation and an input dependent inverse conversion operation before and after the first basic operations, respectively, the input dependent conversion operation depending on the inputs required for the first basic operation, and the input dependent inverse conversion operation being an inverse conversion of the input dependent conversion operation which depends on the inputs required for the first basic operation.

According to the stated structure, the obfuscating apparatus places an input dependent conversion operation which depends on the one or more inputs unrequired for the first basic operation and/or its inverse conversion, which is, an input dependent inverse conversion operation, with respect to each of the first basic operations as well. The obfuscating apparatus (i) places an input dependent conversion operation before, (ii) places an input dependent inverse conversion operation after, or (iii) places an input dependent conversion operation and an input dependent inverse conversion operation, before and after, respectively, the first basic operation. Consequently, the resistance to the program analysis is further increased.

Each input dependent conversion operation may be a subtraction, and each input dependent inverse conversion operation may be an addition.

According to the stated structure, the obfuscating apparatus places a subtraction and an addition which depend on input values. This renders the operation result of the program equivalent to that obtained when the subtraction and the addition are not placed.

The transformation unit may further place a first conversion operation and a second conversion operation immediately before each of the plurality of basic operations except for before a basic operation placed first in the information security program, the first conversion operation applying a first conversion to an operation result of a basic operation immediately preceding the basic operation, and the second conversion operation applying a second conversion to an operation result of the first conversion operation, the second conversion being an inverse conversion of the first conversion, the table generating unit further (i) generates a first table which yields an operation result equivalent to an operation result of a set of operations including the basic operation placed first in the information security program and the first conversion operation placed immediately thereafter, and (ii) generates a reference instruction to refer to the first table, for each of the plurality of basic operations except for the basic operation placed first and a basic operation placed last in the information security program, (iii) generates a second table which yields an operation result equivalent to a set of operations including the second conversion operation and the first conversion operation in addition to the subtraction placed immediately before the basic operation, the basic operation, and the addition placed immediately thereafter, and (iv) generates a reference instruction to refer to the second table, and (v) generates a third table which yields an operation result equivalent to a set of operations including the basic operation placed last in the information security program and a second conversion operation placed immediately therebefore, and (vi) generates a reference instruction to refer to the third table, and the output unit outputs the obfuscated program including the generated first, second, and third tables and all generated reference instructions.

According to the stated structure, the obfuscating apparatus places a first conversion operation and a second conversion operation which is an inverse conversion of the first conversion before and after the basic operations. This further improves the resistance against the program analysis. It should be noted that since the first conversion operation and the second conversion operation, which is the inverse conversion of the first conversion operation, are placed, the operation result of the program is equivalent to that obtained when these conversion operations are not placed.

The transformation unit may (i) decompose the basic operations, the subtractions, the additions, the first conversion operations, and the second conversion operations placed in the information security program into a plurality of digit operations, and (ii) place the generated digit operations within the security information program, the table generating unit (i) generates a first digit operation table which yields an operation result equivalent to an operation result of digit operations among the generated digit operations such that the operation result of the first digit operation table is equivalent to the operation result of the set of operations including the basic operation placed first in the information security program and the first conversion operation placed immediately thereafter, and (ii) generates a digit operation reference instruction to refer to the first digit operation table, for each of the plurality of basic operations except for the basic operation placed first and the basic operation placed last in the information security program, (iii) generates a second digit operation table which yields an operation result equivalent to an operation result of digit operations among the generated digit operations such that the operation result of the second digit operation table is equivalent to the operation result of the set of operations including the subtraction placed immediately before the basic operation, the basic operation, the addition placed immediately thereafter, the second conversion operation, and the first conversion operation, and (iv) generates a digit operation reference instruction to refer to the second digit operation table, (v) generates a third digit operation table which yields an operation result equivalent to an operation result of digit operations among the generated digit operations such that the operation result of the third digit operation table is equivalent to the operation result of the set of operations including the basic operation placed last in the information security program and the second conversion operation placed immediately therebefore, and (vi) generates a digit operation reference instruction to refer to the third digit operation table, and the output unit outputs the obfuscated program including the generated first, second, and third digit operation tables and all generated digit operation table reference instructions.

According to the stated structure, the obfuscating apparatus decomposes each operation to digit operations. Consequently, the total amount of the generated tables can be reduced.

The table generating unit may generate each of the first, second, and third digit operation tables by selecting a table out of a predetermined number of shared tables.

According to the stated structure, the table generating unit selects a table out of several predetermined tables which are shared by multiple different tables, thereby enabling a further reduction in the total amount of the tables to be held.

The security operation may be a modular exponential operation $C^d$ mod n, n being a modulus, C being target information and secret key d being the key information, the plurality of basic operations placed in the order determined by the key information are one or more modular multiplication operations and one or more modular squaring operations that are placed according to each bit value of the secret key d based on a binary method so that a result of the plurality of the basic operations is equivalent to an operation result of the modular exponential operation $C^d$ mod n. Immediately before and immediately after each of the modular multiplication operations and the modular squaring operations except for immediately before and immediately after one of (a) a modular multiplication operation and (b) a modular squaring operation, which is placed first in the information security program, and one of (a) a modular multiplication operation and (b) a modular squaring operation, which is placed last in the information security program, the transformation unit may place a subtraction and an addition that depend on one input value to (a) the modular multiplication operation or (b) the modular squaring operation, and the table generating unit generates, for each of the modular multiplication operations and the modular squaring operations except for the one of (a) a modular multiplication operation and (b) a modular squaring operation, which is placed first in the information security program, and the one of (a) a modular multiplication operation and (b) a modular squaring operation, which is placed last in the information security program, a table which yields an operation result equivalent to a result of a set of operations including the subtraction placed immediately before the modular multiplication operation or the modular squaring operation, the modular multiplication operation or the modular squaring operation, and the addition placed immediately thereafter.

According to the stated structure, the security operation is a modular exponential operation $C^d$ mod n, where n is the modulus, C is the target information, and d is the secret key which is the key information. Consequently, the obfuscating apparatus is able to utilize the RSA encryption technology whose security is established to a certain degree.

The security operation may be a modular exponential operation $C^d$ mod n, n being a modulus, C being target information and secret key d being the key information, the plurality of basic operations placed in the order determined by the key information are one or more modular multiplication operations and one or more modular squaring operations that are placed according to each bit value of the secret key d based on a binary method so that a result of the plurality of the basic operations is equivalent to an operation result of the modular exponential operation $C^d$ mod n, the transformation unit (i) decomposes each of the modular multiplication operations except for (a) a modular multiplication operation placed first in the information security program and (b) a modular multiplication operation placed last in the information security program, places resulting multiplication operation and modular operation, and places, immediately before and immediately after the placed multiplication operation, a subtraction and an addition, respectively, the subtraction and the addition depending on an input value to the placed multiplication operation, and (ii) decomposes each of the modular squaring operations except for (a) a modular squaring operation placed first in the information security program and (b) a modular squaring operation placed last in the information security program, places resulting squaring operation and modular operation, and places, immediately before and immediately after the placed squaring operation, a subtraction and an addition, respectively, the subtraction and the addition depending on an input value to the placed squaring operation, and the table generating unit generates, for each placed multiplication operation or each placed squaring operation, which has a subtraction and an addition placed therebefore and thereafter, respectively, a table which yields an operation result equivalent to a result of a set of operations including the subtraction placed immediately before the placed multiplication operation or the placed squaring operation, the placed multiplication operation or the placed squaring operation, and the addition placed immediately thereafter.

According to the stated structure, the obfuscating apparatus (i) decomposes the modular multiplication operations and modular squaring operations of the modular exponential operation $C^n$ mod n, (ii) places the multiplication operations and modular operations, and the squaring operations and modular operations, (iii) places the subtraction and addition immediately before and immediately after each multiplication operation, and (iv) places the subtraction and addition immediately before and immediately after each squaring operation. As a result, the resistance against the program analysis is further increased. It should be noted that since the subtraction and addition which depend on the input values are placed, the operation result of the program is equivalent to that obtained when the subtraction and addition are not placed.

BRIEF DESCRIPTION OF THE DRAWINGS

FIG. 3 is a block diagram showing a structure of an obfuscation system 1 of a second embodiment;

FIG. 4 shows a conceptual flow of a first obfuscation method according to the obfuscation system 1;

FIGS. 5A to 5C each show a structure of transformed modular multiplication processing. FIG. 5A shows a case where i=1, FIG. 5B shows a case where $2 \leq i \leq k-1$, and FIG. 5C shows a case where i=k.

FIG. 8A shows pre-decomposition transformed multiplication processing; FIG. 8B shows the post-decomposition transformed multiplication processing;

FIG. 25 provides a specific example of $RM_1$ of $RT_1$ ($2 \leq i \leq k-1$) shown in FIG. 17;

FIG. 28 provides a specific example of a table of $RM_1$ of $RT_k$ shown in FIG. 19;

FIG. 31 provides a specific example of a table of $RA_1$ of $RT_1$ shown in FIG. 15;

FIG. 43 indicates a specific example of a table of $RM_1$ of $RT_1$ shown in FIG. 15.

Figure 1:
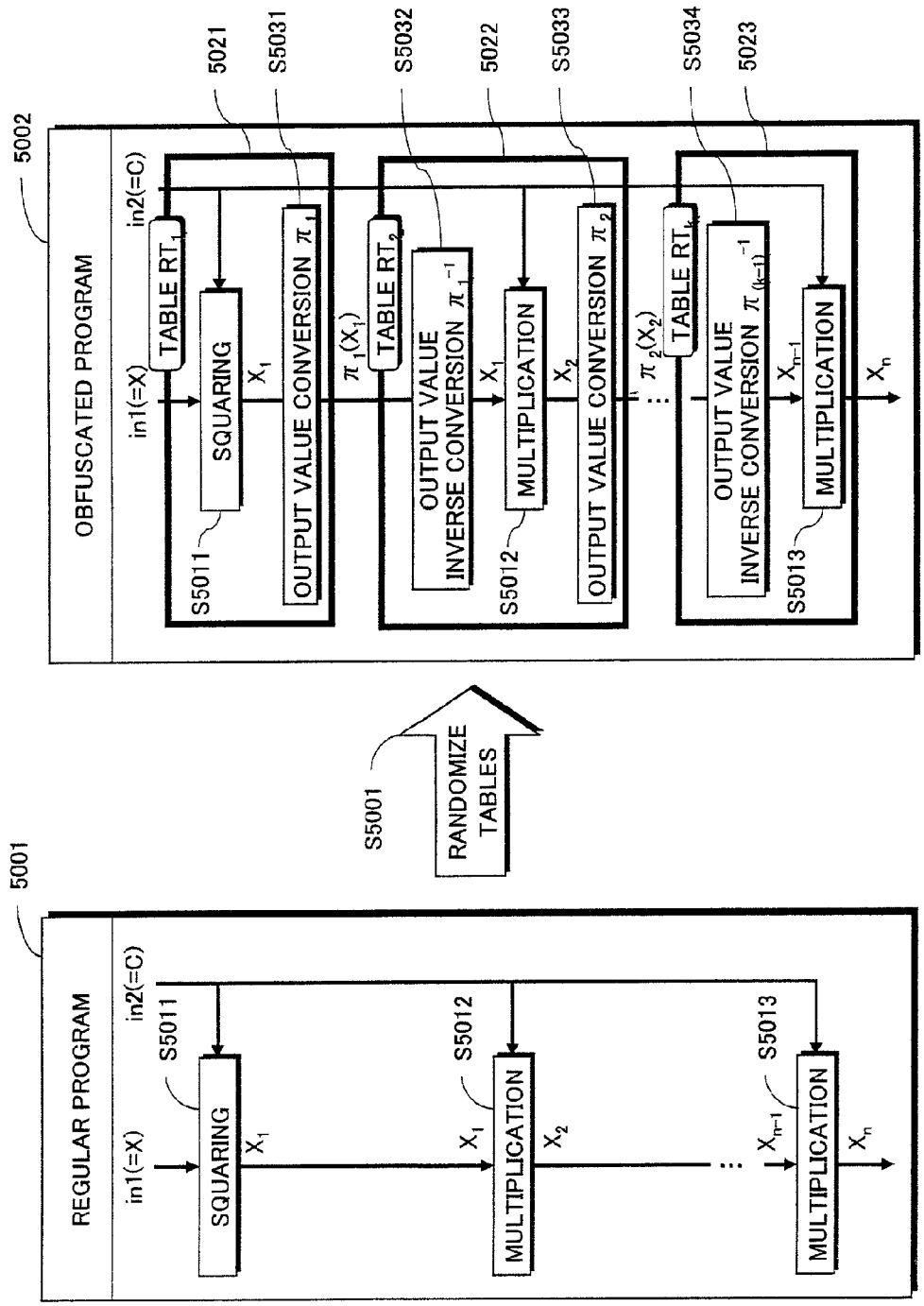
FIG. 1 shows a transformation from a regular program 5001 to an obfuscated program 5002 in a first embodiment.

| Description of Reference Numerals | |
|---|---|
| 1 | obfuscation system |
| 100 | obfuscating apparatus |
| 101 | input unit |
| 102 | multiplication placement information generating unit |
| 103 | post-decomposition processing placement information generating unit |
| 104 | conversion operation generating unit |
| 105 | table generating unit |
| 106 | read information placement unit |
| 107 | program generating unit |
| 108 | medium recording unit |
| 200 | medium |
| 300 | encryption processing apparatus |
| 301 | input unit |
| 302 | output unit |
| 303 | data memory |
| 304 | program memory |
| 305 | CPU |
| 306 | medium reading unit |

DETAILED DESCRIPTION OF THE INVENTION

1. First Embodiment

In the following, an obfuscation method is described as a first embodiment of the present invention.

Here, description is given on a case where a decryption program, which is not of symmetric-key cryptography, but of public key cryptography, is used as the target program of obfuscation. Specifically, an obfuscation method used to obfuscate a decryption program of RSA cryptosystem, which is an example of public key cryptography, is described. Note that the RSA cryptosystem is described in pp. 110 to 113 of Non-Patent Document 1, and accordingly, details are omitted here.

In decryption of the RSA cryptosystem, the decrypted text M of an encrypted text C is calculated using a secret key d, which is a positive integer.

$$M = C^d \bmod n$$

Such an operation is also called a security operation.

Here, n is a product of a prime number p and a prime number q. In the present specification, "X^Y" denotes X raised to the power of Y, while "X mod Y" denotes the remainder when X is divided by Y.

The calculation of C^d mod n is realized by repeatedly performing multiplications and squarings, and this property is often utilized when implementing the RSA cryptosystem in a computer system. Here, the order in which the multiplications and squarings are applied depends on the value of the secret key. Thus, by analyzing this order, an attacker is able to find out the secret key.

As shown in FIG. 1, a regular program 5001, which is a program before obfuscation and a decryption program of the RSA cryptosystem, includes a squaring S5011, a multiplication S5012, . . . , and a multiplication S5013. Here, the order in which the squarings and multiplications are applied depends on the value of the secret key d. Here, the secret key d is k-bit in length, and, for instance, "111 . . . 1".

$$X_1 = C \times C \bmod n$$

$$X_2 = X_1 \times C \bmod n$$

. . .

$$X_n = X_{n-1} \times C \bmod n$$

This is how the decrypted text $M = X_n (C^d \bmod n)$ is obtained.

Here, for convenience of description, each of the following equations is referred to as an operation 1 (S5011) an operation 2 (S5012), . . . , and an operation n (S5013).

$$X_1 = C \times C \bmod n$$

$$X_2 = X_1 \times C \bmod n$$

. . .

$$X_n = X_{n-1} \times C \bmod n$$

This obfuscation method inserts an output value conversion operation $\pi_1$ S5031 and an output value inverse conversion operation $\pi_1^{-1}$ S5032 immediately after the operation 1 (S5011), inserts an output value conversion operation $\pi_2$ S5033 and an output value inverse conversion operation $\pi_2^{-1}$ immediately after the operation 2 (S5012) inserts an output value conversion operation $\pi_3$ and an output value inverse conversion operation $\pi_3^{-1}$ immediately after the operation 3, . . . , inserts an output value conversion operation $\pi_i$ and an output value inversion $\pi_i^{-1}$ immediately after the operation i, . . . , and inserts an output value conversion operation $\pi_{n-1}$ and an output value inversion $\pi_{n-1}^{-1}$ S5034 immediately after the operation (n−1). Here, $\pi_i^{-1}$ represents the inverse conversion of $\pi_i$ (i=1, 2, 3, . . . , n−1).

Next, the obfuscation method generates a table $RT_1$ 5021 by tabulating the operation X1 (S5011) and the output value conversion operation $\pi_1$ S5031, generates a table $RT_2$ 5022 by tabulating the output value inverse conversion operation $\pi_1^{-1}$ S5032, the operation X2 (S5012), and the output value conversion operation $\pi_2$ S5033, generates a table $RT_3$ 5023 by tabulating the output value inverse conversion operation $\pi_2^{-1}$, the operation X3 (S5013), and the output value conversion operation $\pi_3$, . . . , generates a table $RT_{i+1}$ by tabulating the output value inverse conversion operation $\pi_i^{-1}$, the operation Xi+1, and the output value conversion operation $\pi_{i+1}$, . . . , and lastly, generates a table $RT_n$ 5023 by tabulating the output value inverse conversion operation $\pi_{n-1}^{-1}$ S5034, and the operation Xn (S5013). This is how the obfuscated program 5002 which includes the tables $RT_1$ 5021, $RT_2$ 5022, . . . , and $RT_n$ 5023 is generated (step S5001).

As described above, according to the present obfuscation method, an output value conversion operation and an output value inverse conversion are inserted, as a set, before and after each operation except for the first and the last operations. After that, the first operation and the output value conversion operation immediately thereafter are tabulated. Next, for each operation except for the first and the last, the output value inverse conversion operation, the operation itself, and the output value conversion operation are tabulated. Lastly, for the last operation, the output value inverse conversion operation and the operation itself are tabulated. Thus, intermediate values obtained during the operations are converted, thereby concealing the contents of the operations.

Figure 2A:
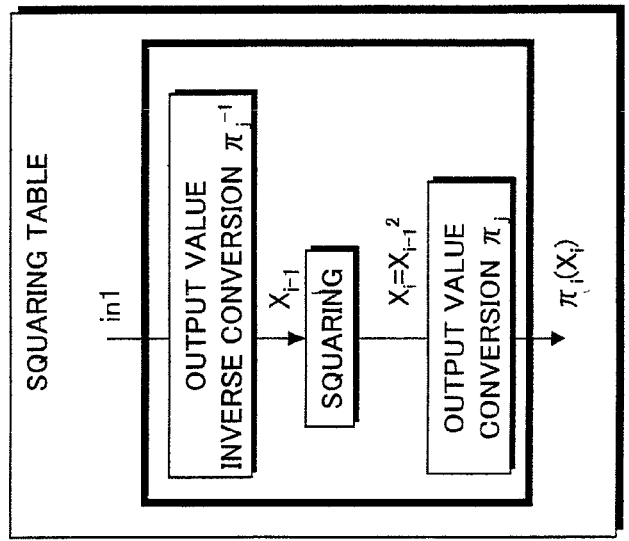
FIG. 2 shows obfuscation of a multiplication and a squaring in the first embodiment.
Figure 2B:
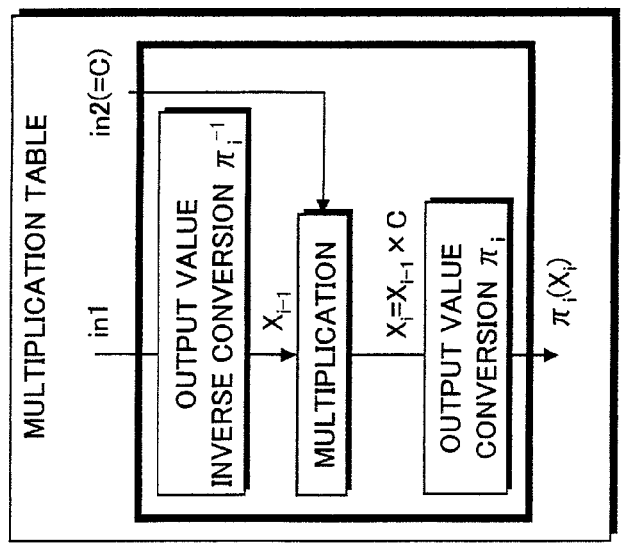

However, when the RSA cryptosystem is realized by exponential operations which are performed by repetition of multiplications and squarings, input values used for the multiplications and those used for the squarings are different. That is to say, as shown in FIG. 2A, in the multiplication operations, a first input value in1 is multiplied by a second input value in2, while in the squaring operations, only the first input in1 is used to perform squaring of the first input value in1, as shown in FIG. 2B.

Thus, output from the multiplication table depends on both the in1 and in2, while output from the squaring table depends only on the in1.

This property allows attackers to identify which of the multiplication and squaring is performed at each table by focusing on the input and output of the table. In other words, since a squaring table does not require the input value in2, a table not receiving input of the input value in2 can be assumed to be a squaring table, while a table receiving input of the input value in2 can be assumed to be a multiplication table. Additionally, even if the squaring table is configured to receive input of the input value in2 (although not actually used in the processing), the output value of the squaring table still does not depend on the input value in2. Accordingly, which of the squaring and multiplication is performed at the table may be guessed based on this property.

Consequently, the order of the multiplications and squarings may be estimated, and as a result, the secret key value may be found out.

2. Second Embodiment

A second embodiment described below aims to solve the problem of the first embodiment and prevent attacks exploiting the difference between the number of input for multiplication and that for squaring.

In the following, the obfuscation system 1 is described as the second embodiment of the present invention.

2.1 Outline of Obfuscation System 1

FIG. 3 shows the obfuscation system 1 according to the second embodiment. The obfuscation system 1 receives the secret key d as an input value and generates an obfuscated program. The obfuscation system includes the obfuscating apparatus 100, a medium 200, and an encryption processing apparatus 300. The obfuscating apparatus 100 outputs the generated obfuscated program; the medium 200 stores the output obfuscated program; and the encryption processing apparatus 300 reads the obfuscated program from the medium 200, executes the read obfuscated program, and generates a decrypted text from the encrypted text or generates signature data from the message.

In the obfuscation system 1, the obfuscating apparatus 100 generates, with respect to the secret key d and target data X which is used in the decryption and signature generation of the RSA cryptosystem, an obfuscated program which calculates $X^d \bmod n$ and stores the generated obfuscated program in the medium 200. The encryption processing apparatus 300 reads the obfuscated program stored in the medium 200 and, by operating in accordance with the obfuscated program read by the CPU of the encryption processing apparatus 300, generates the decrypted text from the encrypted text, or generates the signature data from the message.

2.2 RSA Cryptosystem and RSA Signature Scheme

Here, the RSA cryptosystem and RSA signature scheme are described. Use of the RSA cryptosystem and RSA signature scheme allows secure and reliable processing of information.

(1) RSA Cryptosystem (a) Generation of Keys

According to the RSA cryptosystem, public keys and secret keys are calculated as follows.

(i) Large prime numbers p and q are arbitrarily selected, and the product n=p×q is calculated. The size of p and q is, for example, 512 bits, and the size of n is, for example, 1024 bits.

(ii) The least common multiple L=LCM (p−1)(q−1) is calculated.

(iii) An integer e that is mutually prime with L (i.e. the greatest common divisor of e and L is 1) and smaller than L is arbitrarily selected.

$1 \leq e \leq L-1$; $GCD(e,L)=1$

Here, GCD(e,L) indicates the greatest common divisor of e and L.

(iv) Calculation is performed to find d that satisfies e×d=1 mod L. It is mathematically known that such d always exists when GCD(e,L)=1. The integer e and the integer n obtained in this manner are the public keys, and the integer d is the secret key.

(b) Generation of Encrypted Text

The encrypted text c is obtained by calculation which applies the following encryption operation to the plaintext m using the integer e and the integer n, which are the public keys. It should be noted that the plaintext m is smaller than the integer n.

$c = m^e \bmod n$ (c) Generation of Decrypted Text

The decrypted text m' is obtained by calculation which applies decryption computation to the encrypted text c using the integer d, which is the secret key.

$m' = c^d \bmod n$

Here, the following should be noted.

$$m' = c^{\wedge}d \bmod n$$
$$= (m^{\wedge}e)^{\wedge}d \bmod n$$
$$= m^{\wedge}(e \times d \bmod L) \bmod n$$
$$= m^{\wedge} 1 \bmod n$$
$$= m \bmod n$$

Due to the above and m<n, m mod n=m. Accordingly, the decrypted text m' and the plaintext m are the same.

Note that the RSA cryptosystem is described in detail in pp. 110-113 of Non-Patent Document 1.

(2) RSA Signature Scheme (a) Generation of Keys

The method for generating keys is the same as that in the RSA cryptosystem.

(b) Signature Generation

Signature data S is calculated with respect to the message D, as in the following.

First, a hash value h=Hash(D) of the message data D is calculated using a hash function Hash.

Next, the signature data S is calculated using the secret key d, which is an integer, by raising the hash value h to the power of d.

$S = h^d \bmod n$

That is to say, the signature data S is an encrypted value which has been encrypted using the RSA cryptosystem with respect to the hash value h as the plaintext.

(c) Signature Verification

Whether or not the signature data S is the correct signature of the message data D is verified as follows.

Upon receipt of the message data D and the signature data S, Hash(D) is calculated, and after that, $S^e \bmod n$ (corresponds to the value obtained by decrypting the signature data S using the RSA cryptosystem) is calculated.

Following that, whether or not Hash (D) and $S^e \bmod n$ are equivalent is checked. When equivalent, the signature data S is accepted as the correct signature. When not equivalent, the signature data S is rejected as an incorrect signature.

Note that the RSA signature scheme is described in detail in pp. 175-176 of Non-Patent Document 1.

2.3 Obfuscation Executed by Obfuscating apparatus 100

(1) Modular Exponentiation Using Binary Method

A regular program before obfuscation, which is the obfuscation target of the obfuscating apparatus 100, includes an instruction to calculate the exponential value of $X^d \bmod n$. Such a modular exponentiation operation is also called a security operation.

Here, the regular program uses a binary method called binary exponentiation method as an exponentiaion operation. The binary exponentiation method calculates the value of an expression such as $X^d \bmod n$ (generally referred to as a modular exponentiation) by performing multiplications and squarings repeatedly. Detail of the binary method is described in Non-Patent Document 2.

(2) Obfuscation Processing by Obfuscating Apparatus 100

(First Obfuscation Method)

An obfuscation processing method used by the obfuscating apparatus 100 (first obfuscation method) is described with reference to FIG. 4 which shows a conceptual flow of the obfuscation processing.

As shown in FIG. 4, in the present obfuscation processing method (first obfuscation method), a regular program 400 before obfuscation is transformed to an intermediate program 420 (step S401), and further transformed to an obfuscated program 440 (step S402).

Here, computation results of the regular program 400, the intermediate program 420, and the obfuscated program 440 are the same. This property is also called equivalence.

(Contents of Regular Program 400)

The regular program 400 before obfuscation, shown in FIG. 4, includes an instruction block 401 that executes modular exponentiation using the binary method and includes instructions 411, 412, and 413.

Sometimes, the regular program 400 structured as above is called an information security program.

In the regular program 400, a variable X stores a value which is the target data of the modular exponentiation, a variable "len" stores the total bit length of the secret key d, and a variable Y stores a result value part way through the processing. In addition, a variable i indicates the position of the focused bit. Here, bits of the secret key d are counted in the ascending order from the least significant bit, which is the 0-th bit.

In the instruction 411, the value of the variable X is assigned to the variable Y.

In the instruction 412, the total bit length of the secret key d is stored in the variable "len".

In the instruction 413, first, the value (len−1) is stored in the variable i, and after that, the following instructions 414 and 415 are repeated as long as the expression "the variable i≧0" is satisfied while decrementing the variable i by "1".

In the instruction 414, a modular squaring of the variable Y over a modulus n is performed, and its computation result is stored in the variable Y. In the instruction 415, the bit indicated by the value of the variable i is referred to in the secret key d. If the bit value is "1", a modular multiplication of multiplying the variable Y with the variable X over the modulus n is performed, and its computation result is stored in the variable Y.

As a result of the above operations, upon completion of the operation of the instruction block 401, the value obtained by raising the variable X to the power of d over the modulus n is stored in the variable y.

$$Y = X^d \bmod n$$

As described above, according to the binary exponentiation method, each bit of the secret key d is referred to, and if the bit value is "0", only a squaring operation is performed, and if the bit value is "1", a squaring operation and a multiplication operation are performed. Accordingly, if it is possible to distinguish whether only a squaring operation is performed or a squaring and a multiplication operation are performed, the secret key d can be recovered. Thus, during the obfuscation processing, which one of a squaring operation and a multiplication operation is performed needs to be kept indistinguishable in the processes respectively corresponding to the bits of the secret key d.

(Transformation from Regular Program 400 to Intermediate program 420)

In the following, description is given on a transformation from the regular program 400 to the intermediate program 420 in a step S401 shown in FIG. 4.

The obfuscation processing method used by the obfuscating apparatus 100, first, in the intermediate program 420, generates an initialization instruction 422 "Y=X;", which assigns the value of the variable X to the variable Y.

Next, an if statement that is a branch instruction based on the value of the secret key d and a for statement that is a loop instruction are removed from the instruction block 401 in the regular program 400. In the intermediate program 420, for each bit of the secret key d from the least significant bit to the most significant bit, if the bit value is "0", a modular squaring instruction "Y=Y×Y mod n;" is generated, and if the bit value is "1", a modular squaring instruction "Y=Y×Y mod n;" and a modular multiplication instruction "Y=Y×X mod n;" are generated.

This is how multiplication placement information 421 is generated. The multiplication placement information 421 includes the initialization instruction 422, at least one modular squaring instruction, and at least one set of instructions composed of a modular squaring instruction and a modular multiplication instruction. Here, a modular squaring instruction and a modular multiplication instruction may be referred to as a basic modular operation or simply a basic operation. Alternatively, a modular squaring instruction and a modular multiplication instruction may be referred to as a second basic operation and a first basic operation, respectively. Here, a modular multiplication instruction, which is the first basic operation, requires a plurality of inputs, while a modular squaring instruction, which is the second basic operation, requires only part of the plurality of inputs.

In the multiplication placement information 421, the initialization instruction 422 is placed at the start thereof, and subsequent to that, the at least one modular squaring instruction, and the at least one set of instructions composed of a modular squaring instruction and a modular multiplication instruction are placed in accordance with the value of the secret key d. The order in which these instructions are placed in the multiplication placement information 421 stipulates the execution order of the initialization instruction 422, modular squaring instructions, and modular multiplication instructions.

As an example, the intermediate program 420 in FIG. 4 shows a case where the secret key d is "101 . . . 01". The multiplication placement information 421 includes the initialization instruction 422, a set of instructions 423, a modular squaring instruction 424, a set of instructions 425, . . . , a modular squaring instruction 426, and a set of instructions 427, which are placed in the stated order.

Here, the modular multiplication indicates an operation which performs a modular operation after multiplication, and the modular squaring indicates an operation which performs a modular operation after squaring.

(Transformation from Intermediate Program 420 to Obfuscated Program 440)

In the following, description is given on a transformation from the intermediate program 420 to the obfuscated program 440 in a step S402 shown in FIG. 4.

The obfuscation processing method used by the obfuscating apparatus 100 converts all the modular squaring instructions and all the modular multiplication instructions included in the multiplication placement information 421 in the intermediate program 420 to instructions for referring to process tables ($RT_1$, . . . , $RT_2$). The process tables are of 2-input/1-output with a variable Z converted from the intermediate value Y and target data X being the inputs and the variable Z being the output. Here, $RT_i$ is a table generated from the i-th modular squaring instruction or modular multiplication instruction.

Note that the initialization instruction 422 is converted to an initialization instruction 442 which assigns the value of the variable X to the variable Z.

As a result of the above conversion operation, for example, an instruction block 441 including the initialization instruction 442 and table reference instructions 443, 444, 445, 446, 447, . . . , 448, and 449 is generated. These instructions are placed in the instruction block 441 in the stated order.

By executing these instructions in the stated order, the modular exponentiation operation is performed, thereby yielding the exponential value.

(3) Obfuscation Processing by Obfuscating Apparatus 100 (Second Obfuscation Method)

An obfuscation processing method used by the obfuscating apparatus 100 (second obfuscation method) is described in the following.

(i) Expansion of Operation Instructions

As shown in FIG. 4, the present obfuscation processing method (second obfuscation method) transforms the regular program 400 before obfuscation to the intermediate program 420 (step S401). Up to here, the processing is the same as that in the first obfuscation method.

Here, the modular squaring instructions and the modular multiplication instructions in the multiplication placement information 421 in the intermediate program 420 are referred to as operation instructions, and k pieces of operation instructions are placed in the multiplication placement information 421. In other words, the sum of the number of the modular squaring instructions in the multiplication placement information 421 and the number of the modular multiplication instructions in the multiplication placement information 421 is k.

(ii) Insertion of Output Value Conversion Operation and Input Value Conversion Operation Next, the present obfuscation processing method (second obfuscation method) inserts, in the multiplication placement information 421 in the intermediate program 420, an output value conversion operation $\Pi_i$ and an input value conversion operation $\Pi_i^{-1}$ in the stated order immediately after each i-th operation instruction (i=1, 2, 3, . . . , k−1) placed at the start and part way through, that is, each operation instruction except for the operation instruction placed at the end.

Here, the output value conversion operation Hi is executed using the intermediate value Z, which is the output from the previous operation instruction, and the target data X. The input value conversion operation $\Pi_i^{-1}$ is executed using the intermediate value Z, which is the output of the corresponding output value conversion operation $\Pi_i$, and the target data X. Furthermore, the conversion operation performed by the input value conversion operation $\Pi_i^{-1}$ is equivalent to an inverse conversion of the output value conversion operation $\Pi_i$.

Thus, by inserting a conversion operation and its inverse conversion after an operation instruction, the effect of the conversion operation is cancelled, and thereby allowing the operation result to be the same as that obtained when these conversion and inverse conversion operations are not inserted.

FIGS. 5A, 5B, and 5C show an example of insertion of the output value conversion operation $\Pi_i$ and the input value conversion operation $\Pi_i^{-1}$ when i=1, when 2≦i≦k−1, and when i=k, respectively.

When i=1, as shown in FIG. 5A, an output value conversion operation $\Pi_i$ 462 is inserted immediately after the first operation instruction 461.

When 2≦i≦k−1, as shown in FIG. 5B, an output value conversion operation $\Pi_i$ 473 is inserted immediately after an i-th operation instruction 472. In addition, an input value conversion operation $\Pi_i^{-1}$ 471 is inserted immediately before the i-th operation instruction 472.

When i=k, as shown in FIG. 5C, an input value conversion operation $\Pi_i^{-1}$ 481 is inserted immediately before a k-th operation instruction 482.

(iii) Tabulation

Furthermore, according to the present obfuscation processing method (second obfuscation method), when i=1, as shown in FIG. 5A, the first operation instruction 461 and the output value conversion operation $\Pi_i^{-1}$ 462 are put into a table $RT_1$ 460, and an instruction for referring to the table $RT_1$ 460 is generated.

Also, when 2≦i≦k−1, as shown in FIG. 5B, the input value conversion operation $\Pi_i^{-1}$ 471, the i-th operation instruction 472, and the output value conversion operation $\Pi_i$ 473 are put into a table $RT_i$ 470, and an instruction for referring to the table $RT_i$ 470 is generated.

Further, when i=k, as shown in FIG. 5C, the input value conversion operation $\Pi_i^{-1}$ 481 and the k-th operation instruction 482 are put into a table $RT_k$ 480, and an instruction for referring to the table $RT_k$ 480 is generated.

(4) Obfuscation Processing by Obfuscating Apparatus 100 (Third Obfuscation Method)

An obfuscation processing method used by the obfuscating apparatus 100 (third obfuscation method) is described in the following.

(i) Expansion of Operation Instructions

As with the first obfuscation method and the second obfuscation method, the present obfuscation processing method (third obfuscation method) transforms the regular program 400 before obfuscation to the intermediate program 420, as shown in the step S401 in FIG. 4.

(ii) Insertion of Output Value Conversion Operation and Input Value Conversion Operation Next, as with the third obfuscation method, the present obfuscation processing method (third obfuscation method) inserts output value conversion operations and input value conversion operations in the multiplication placement information 421 in the intermediate program 420. Up to here, the processing is the same as that in the second method.

The third obfuscation method further performs the following.

When i=1, let the output value conversion operation $\Pi_i$ be a conversion operation $\pi_1$, and the conversion operation $\pi_i$ is inserted as the output value conversion operation $\Pi_i$.

Likewise, when i=k, let the input value conversion operation $\Pi_i^{-1}$ be a conversion operation $\pi_i^{-1}$, and the conversion operation $\pi_i^{-1}$ is inserted as the input value conversion operation $\Pi_i^{-1}$.

Figure 6B:
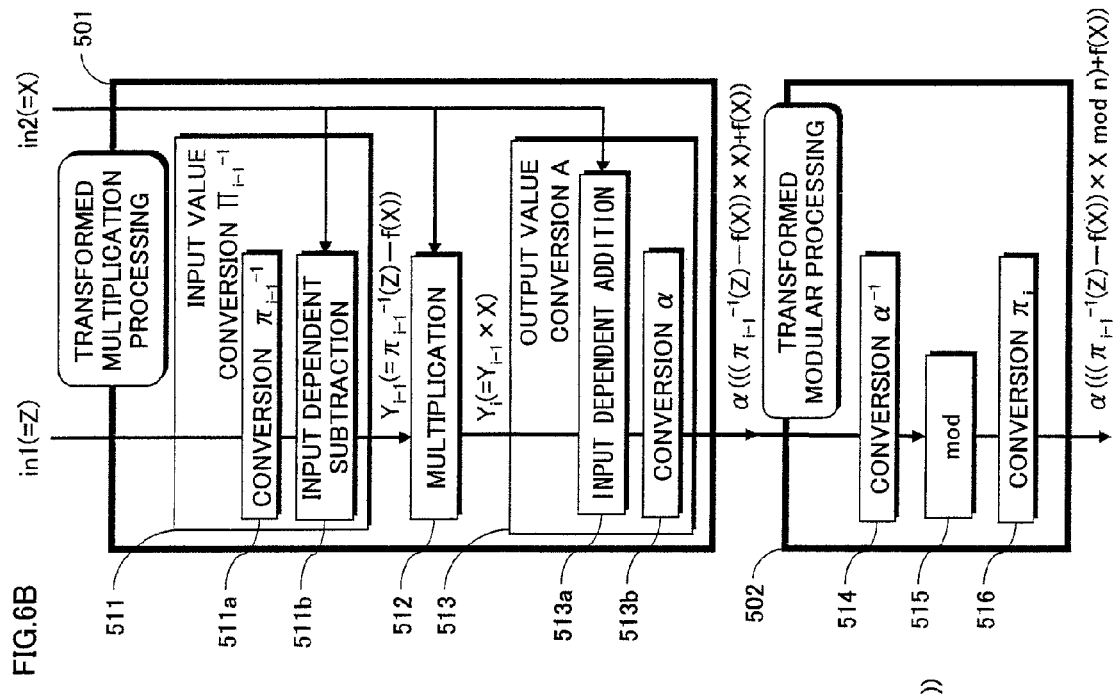
FIG. 6B shows a structure of the post-decomposition modular multiplication processing where $2 \leq i \leq k-1$.
Figure 6A:
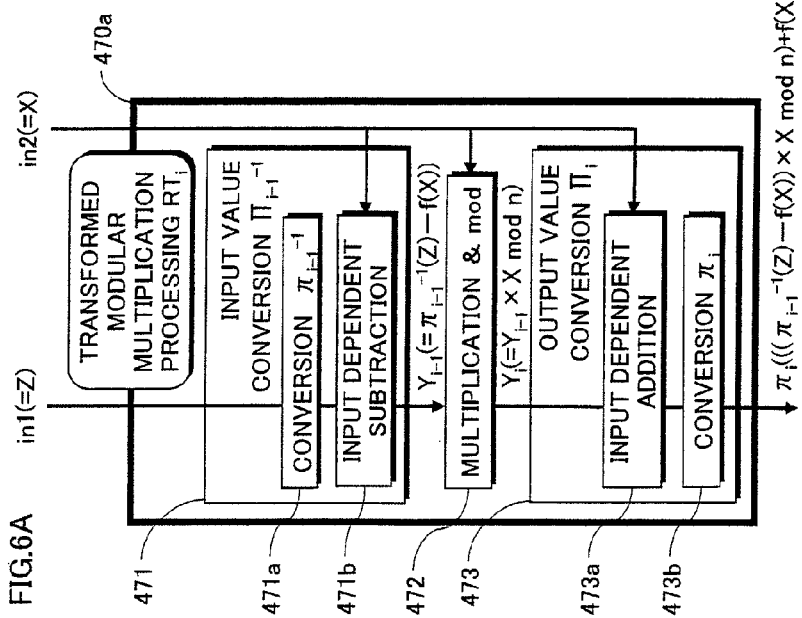
FIG. 6A shows a structure of the transformed modular multiplication processing where $2 \leq i \leq k-1$ with an input value conversion operation and an output value conversion operation inserted therein.

Furthermore, when 2≦i≦k−1, as shown in FIG. 6A, let the input value conversion operation $\Pi_i^{-1}$ 471 be a conversion operation $\Pi_i^{-1}$ 471a and an input dependent subtraction 471b, and the conversion operation $\pi_{i-1}^{-1}$ 471a and the input dependent subtraction 471b are inserted as the input value conversion operation $\pi_{i-1}^{-1}$ 471. Likewise, let the output value conversion operation $\pi_i$ 473 be an input dependent addition 473a and conversion operation $\pi_i$ 473b, and the input dependent addition 473a and the conversion operation $\pi_i$ 473b are inserted as the output value conversion operation $\Pi_i$ 473.

Here, the conversion operation $\pi_i^{-1}$ is an inverse conversion of the conversion operation $\pi_i$, and the conversion operation $\pi_i^{-1}$ and the conversion operation $\pi_i$ each are bijective conversion operation from a number equivalent to Z in bit size to a number of the same bit size.

The input dependent subtraction is an operation of subtracting f (X) which is obtained by applying a conversion operation f to the target data X, while the input dependent addition is an operation of adding f(X) which is obtained by applying the conversion operation f to the target data X. The input dependent addition is an inversion of the input dependent subtraction.

Note that while FIG. 6A shows the case of multiplication, input value conversion operations and output value conversion operations are similarly placed in the case of squaring as well.

(iii) Tabulation

As with the second obfuscation method, the present obfuscation processing method (third obfuscation method) creates tables $RT_1$ after placing conversion operations as described above, and places instructions for referring to each table.

With use of the tables, a sequence of calculation processes can be converted to a process in which a table is searched for a value. In this way, only use of some table can be detected externally. This can prevent malicious analysis performed by tracing calculation processes.

(Outline of Third Obfuscation Method)

As described above, the third method transforms exponential multiplication processing and exponential squaring processing to transformed exponential multiplication processing and transformed exponential squaring processing. The transformed exponential multiplication processing and the transformed exponential squaring processing have input value conversion operations and output value conversion operations including input dependent additions and input dependent subtractions placed therein, and are put into tables. Accordingly, inputs to tables corresponding to the multiplications and to tables corresponding to the squarings both use the intermediate value Z and the target data X. Consequently, output from each table varies depending on the intermediate value Z and the target data X.

As a result, even if inputs to the tables are monitored, it is difficult to track which of multiplication and squaring is performed at each table. In addition, in the tables $RT_i$ obtained by the above-described conversion operations, output from each type of table depends on both the intermediate value Z and the target data X. This makes it difficult to analyze which of multiplication and squaring is performed at each table, even with monitoring of output from the table.

(5) Obfuscation Processing by Obfuscating Apparatus 100 (Fourth Obfuscation Method—Process Decomposition (1))

In the above, description is given on tabulation of the transformed exponential multiplication processing and the transformed exponential squaring processing. However, if the intermediate value Z and the target data X are, for example, 1024-bit integers, size of a table turns out to be $2^{2048}\times$(output byte size of the table) bytes, which is so large as to make the implementation difficult.

In view of this, the fourth obfuscation method of the present embodiment decomposes the transformed exponential multiplication processing and the transformed exponential squaring processing into processing (referred to as "post-decomposition processing") which receive input of a small value (for example, a 4-bit or 8-bit integer) and these processing are put into tables.

The obfuscation processing method used by the obfuscating apparatus 100 (fourth obfuscation method) is described in the following.

As with the third obfuscation method, the present obfuscation processing method (fourth obfuscation method) expands operation instructions. Up to here, the processing is the same as that of the third obfuscation method.

The fourth obfuscation method further performs the following.

Each operation instruction is decomposed. In other words, an exponential multiplication operation is decomposed into a multiplication operation and an exponential operation, and an exponential squaring operation is decomposed into a squaring operation and an exponential operation.

When i=1, the conversion operation $\pi_i$ is inserted immediately after the first multiplication operation or the first squaring operation.

When $2 \leq i \leq k-1$, as an example, description is given on a case where an exponential multiplication operation is decomposed. As FIG. 6B shows, it is assumed that a multiplication operation 512 and an exponential operation 515 are obtained by decomposing the exponential multiplication operation. Next, immediately before the multiplication operation 512, an input value conversion operation $\Pi_{i-1}^{-1}$ 511 is inserted. Here, the input value conversion operation $\Pi_{i-1}^{-1}$ 511 is composed of a conversion operation $\pi_{i-1}^{-1}$ 511a and an input dependent subtraction 511b. Similarly, an output value conversion operation A513 is inserted immediately after the multiplication operation 512. Here, the output value conversion operation A513 is composed of an input dependent addition 513a and a conversion operation $\alpha$ 513b. Also, a conversion operation $\alpha^{-1}$ 514 is inserted immediately before the exponential operation 515, and a conversion operation $\pi_i$ 516 is inserted immediately after the exponential operation 515. Here, $\alpha^{-1}$ is an inverse conversion of the conversion operation $\alpha_1$.

Figure 7:
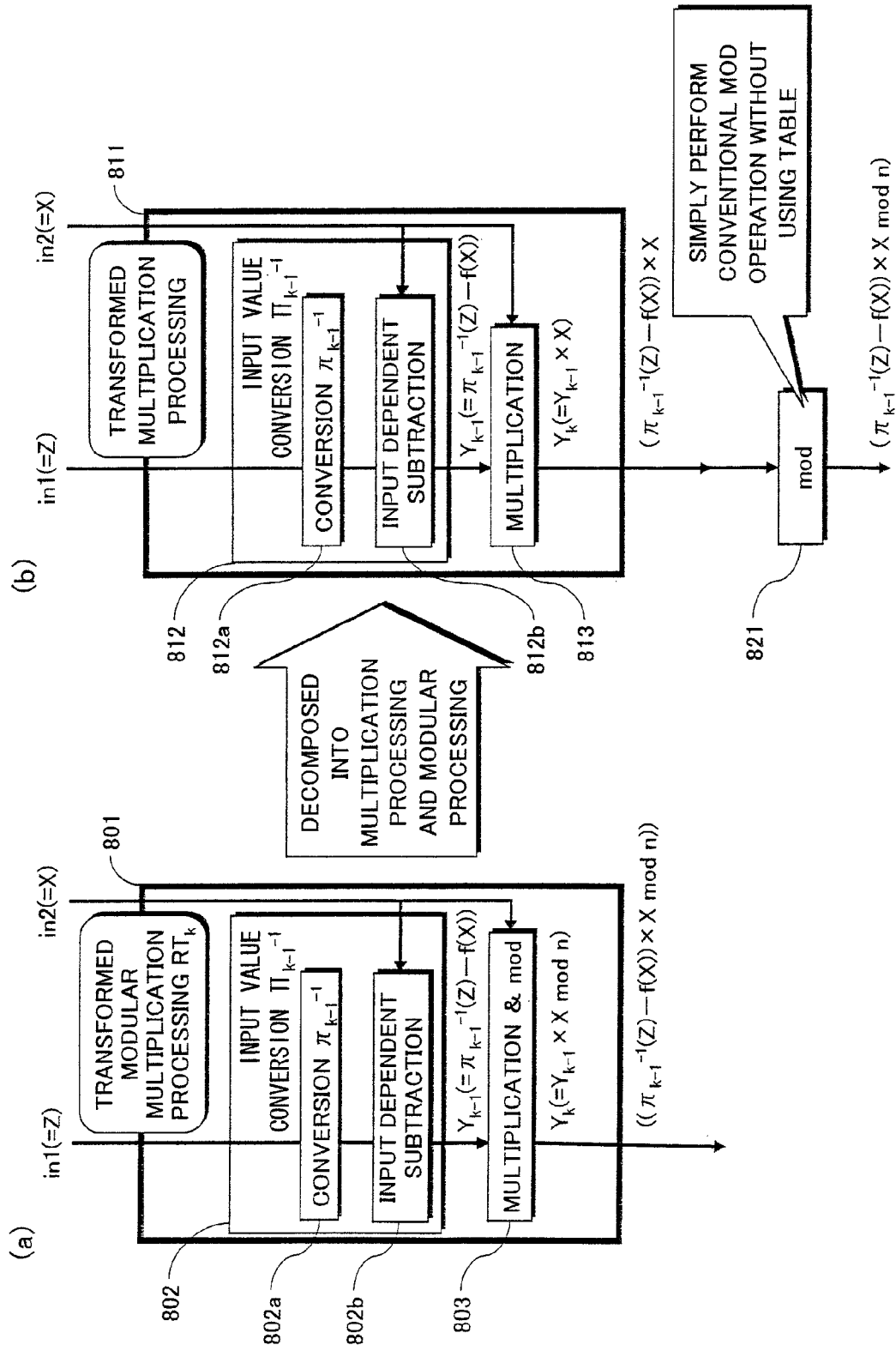
FIG. 7A shows a structure of the transformed modular multiplication processing where i=k with an input value conversion operation inserted therein.
FIG. 7B shows a structure of post-decomposition transformed modular multiplication processing, where i=k.

Further, when i=k, an input value conversion operation $\Pi_{k-1}^{-1}$ is inserted immediately before the last multiplication operation or squaring operation. When an exponential multiplication operation is decomposed, as shown in FIG. 7B, an input value conversion operation $\Pi_{k-1}^{-1}$ 812 is inserted immediately before the last multiplication operation 813. The input value conversion operation $\Pi_{k-1}^{-1}$ 812 is composed of a conversion operation $\Pi_{k-1}^{-1}$ 812a and an input dependent subtraction 812b. The last exponential operation 821 exists on its own, that is, without any inserted conversion operation or the like.

Note that an exponential squaring operation is decomposed in a similar manner.

As described above, according to the fourth obfuscation method, the conversion operation $\alpha$ 513b in the multiplication operation processing is cancelled by the conversion operation $\alpha^{-1}$ 514 in the exponential operation processing. Accordingly, in terms of the entire post-decomposition processing, the processing before the conversion operation is the same as that after the conversion operation.

Hereinafter, the processing which includes the input value conversion operation $\Pi_{i-1}^{-1}$ 511, the multiplication operation 512, and an output value conversion operation A513 is referred to as transformed multiplication processing, while the processing which includes the conversion operation $\alpha^{-1}$ 514, the exponential operation 515, and the conversion operation $\pi_i$ 516 is referred to as transformed modular processing.

The fourth obfuscation method further decomposes each transformed multiplication processing and each exponential processing into processes each corresponding to one of the digits of the intermediate value Z and the target data X.

For example, Z and X are decomposed into 4-bit digits, respectively.

Here, assuming that $Z=Z_0+Z_1\times 2^4+Z_2\times 2^8+\ldots$, and $X=X_0+X_1\times 2^4+X_2\times 2^8+\ldots$, Z is decomposed, starting from the least significant digit, into $Z_0, Z_1, Z_2, \ldots$, each being 4-bit long, and x is decomposed, starting from the least significant digit, into $X_0, X_1, X_2, \ldots$, each being 4-bit long.

Here, the conversion operation $\pi_i$, the conversion operation $\alpha_i$, and the conversion operation f are conversion operations which can be brought back to pre-decomposition status by merging individual digit conversion operations which have resulted from the decomposition.

That is to say, the conversion operation $\pi_i$ is a conversion operation expressed, with use of a bijective conversion operation from a 4-bit number to a 4-bit number, as follows:

$$\pi_i(X) = \phi_i(X_0) + \phi_i(X_1) \times 2^4 + \phi_i(X_2) \times 2^8 + \ldots$$

Similarly, the conversion operation f and the conversion operation $\alpha_i$ are assumed to be respectively expressed as follows:

$$f(X) = g(X_0) + g(X_1) \times 2^4 + g(X_2) \times 2^8 + \ldots$$

$$\alpha(X) = \beta(X_0) + \beta(X_1) \times 2^4 + \beta(X_2) \times 2^8 + \ldots$$

Additionally, the inverse conversion of each of these is assumed to be expressed in a similar manner.

Specific examples of these conversion operations are conversion operations based on logical operations such as AND, OR, and exclusive OR of a predetermined value and each bit. However, in order to improve security, these conversion operations are more preferably random permutations rather than logical operations such as AND, OR, and exclusive OR.

Next, an example of decomposed processing is described using FIGS. 8A and 8B showing how the transformed multiplication processing when $2 \leq i \leq k-1$ is decomposed. FIG. 8A shows the transformed multiplication processing before decomposition, and FIG. 8B shows the post-decomposition transformed multiplication processing after decomposition.

Transformed multiplication processing 520 in FIG. 8B is obtained by decomposing the transformed multiplication processing 501 shown in FIG. 8A. In FIGS. 8A and 8B, each individual digit process is decomposed and converted so as to output values after addition processing is performed. This makes use of the law that a product of large numbers is a sum of products of smaller numbers.

Here, the conversion tables $RM_0, \ldots, RM_k$ for the respective digits are obtained as follows.

First, as shown in FIG. 6B, the entire transformed multiplication processing before decomposition is expressed as follows.

$$\alpha(((\pi_{i-1}^{-1}(Z) - f(X)) \times X) + f(X))$$

Here, the expression is expanded after each of X, Z, and the conversion operations is substituted by the above-described post-decomposition expression which corresponds thereto, and the values or expressions multiplied by $2^4$, $2^8$, . . . are simplified.

As a result, an expression 531 corresponds to the 0-th digit conversion operation, an expression 532 which is simplified in terms of $2^4$ corresponds to the $1^{st}$ digit conversion operation, and an expression 533 simplified in terms of $2^8$ corresponds to the $2^{nd}$ digit conversion operation. This is how the bits are arranged into groups of 4 bits, each group being a digit. Likewise, an expression corresponding to the conversion operation of each digit up to the most significant bit is determined. In these expressions, for the purpose of simplification, index i is omitted.

Thus, tables $RM_0$ 521, $RM$ 522, $RM_2$ 523, . . . each receive input of $Z_0, Z_1, Z_2 \ldots, X_0, X_1, X_2 \ldots$ which are obtained by decomposing, based on the expression corresponding to each individual digit, the intermediate value Z and the target data X used in the expression, and perform the conversion operation equivalent to the expression corresponding to the individual digit.

Figure 10:
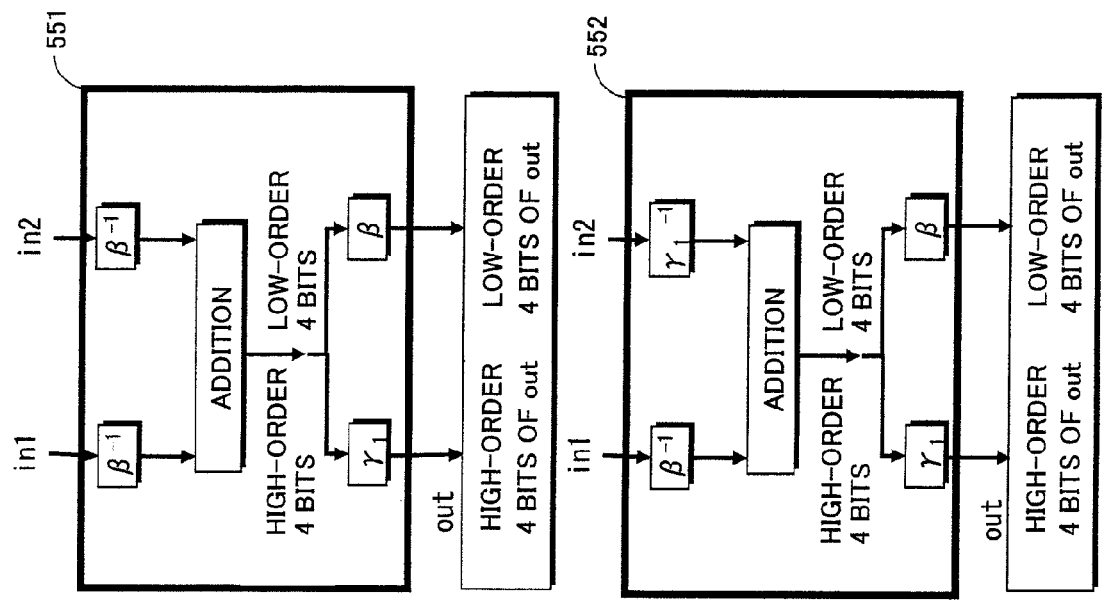
FIG. 10 shows a structure of each addition processing performed in the post-decomposition transformed multiplication processing.

Here, for the respective digits, carry from a lower digit needs to be taken into account. Accordingly, when calculating the value of the first digit or of a digit higher than the first digit, in addition to the operation by each conversion table $RM_1$, addition processing 1 (551) shown in FIG. 10 needs to be performed. Further, as a result of performing the addition processing 1 (551), additional carry may occur. Thus, from the second digit onward, each time the value is calculated, addition processing 2 (552) shown in FIG. 10 needs to be performed. It should be noted that in the addition processing 1 (551) and addition processing 2 (551), as shown in FIG. 10, inversion conversions need to be added as input value conversion operations to cancel the conversion operations such as input dependent subtractions and input dependent additions performed on the input. Furthermore, as the output value conversion operations, output value conversion operations which are cancelled in the immediately following RT (to be more precise, RM obtained as a result of converting RT) need to be added. It should be noted that in the present embodiment, addition processing are similarly tabulated to make it hard to analyze the addition processing.

Figure 8:
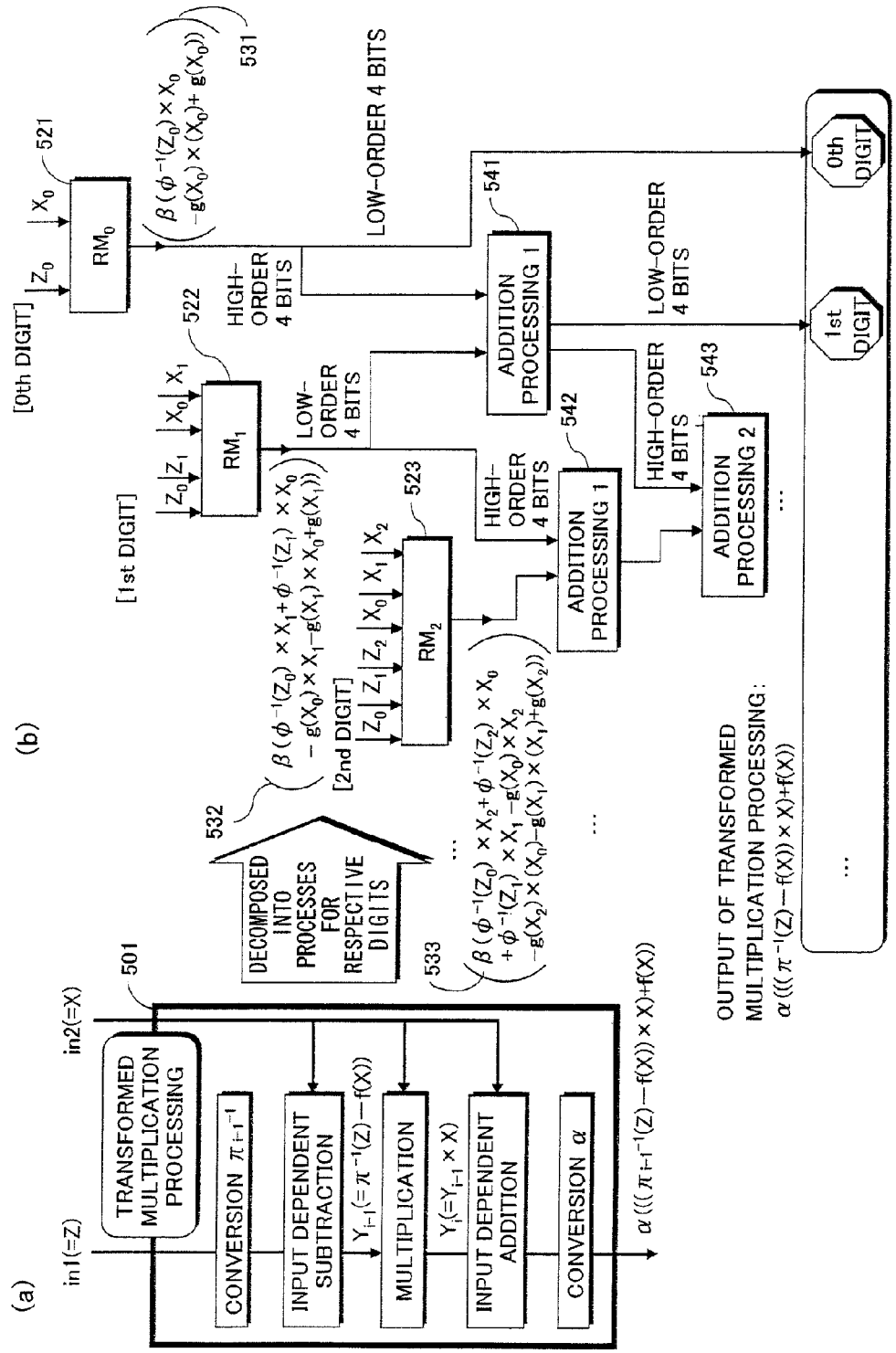
FIGS. 8A and 8B each show a structure of the transformed multiplication processing decomposed into individual digit processes when $2 \leq i \leq k-1$.

FIG. 8 shows the summary of the above description. The figure shows the expressions 531, 532, and 533 corresponding to $RM_0$ 521, $RM_1$ 522, and $RM_2$ 523 of the respective digits.

The low-order 4 bits of the output from $RM_0$ 521 constitute the $0^{th}$ digit of the output value of the transformed multiplication processing 520, and the high-order 4 bits of $RM_0$ 521 are output to the addition processing 1 (541). The low-order 4 bits of the output from $RM_1$ 522 are output to the addition processing 1 (541), and the high-order 4 bits of the output from $RM_1$ 522 are output to the addition processing 1 (542). The low-order 4 bits of the output from $RM_2$ 523 are output to the addition processing 1 (542), and the high-order 4 bits of the output from $RM_2$ 523 are output to the addition processing 1, which is not depicted.

The low-order 4 bits of the output from the addition processing 1 (541) constitute the $1^{st}$ digit of the output value of the transformed multiplication processing 520, and the high-order 4 bits of the output from the addition processing 1 (541) are output to the addition processing 2 (543). The low-order 4 bits of the output from the addition processing 1 (541) are output to addition processing 2 (543), and the high-order 4 bits of the output from the addition processing 1 (542) are output to addition processing 2, which is not depicted.

Figure 9:
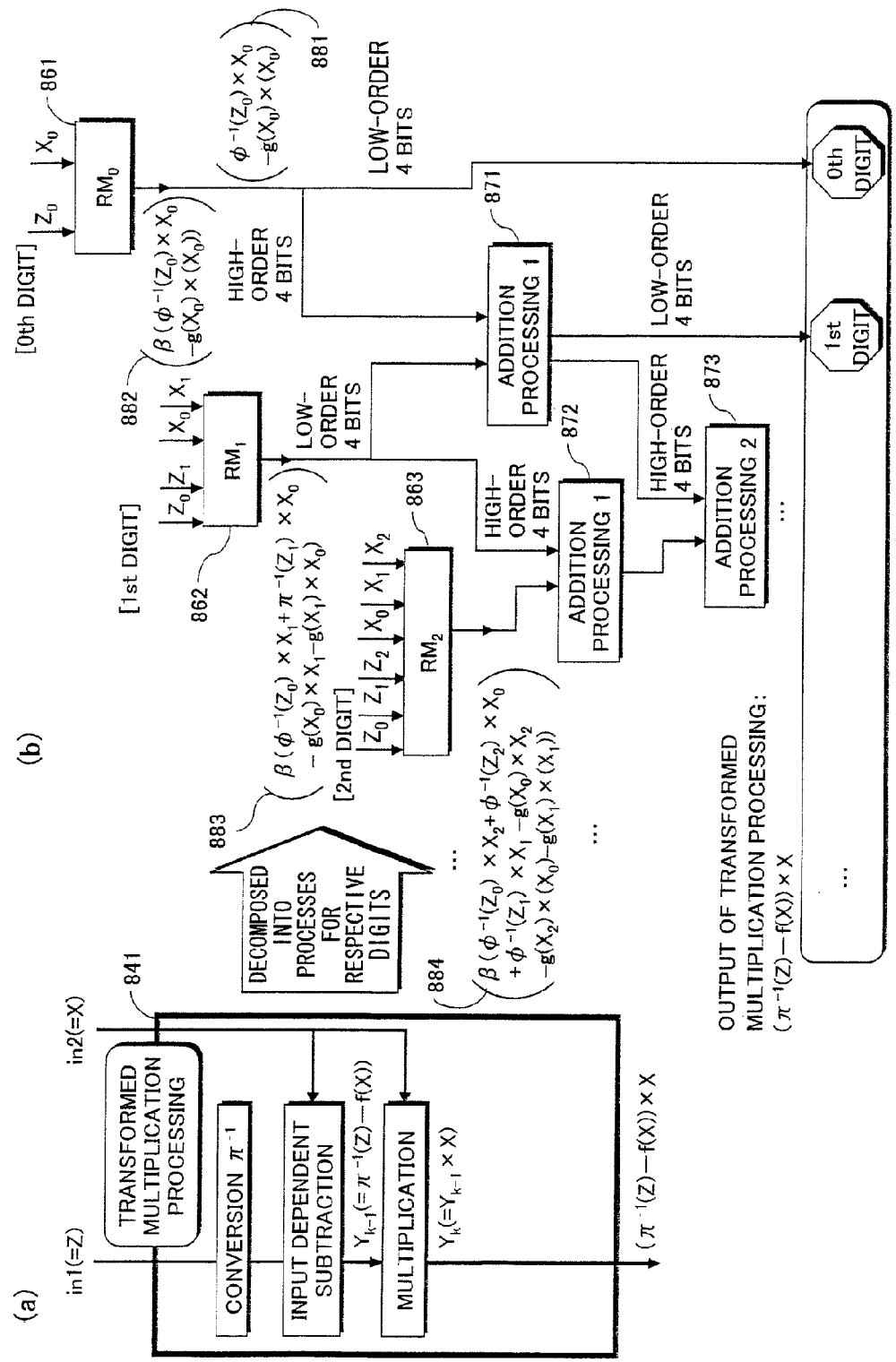
FIG. 9 shows a structure of the transformed multiplication processing decomposed into individual digit processes when i=k.

Additionally, an example of decomposed processing is described using FIG. 9, which indicates how transformed multiplication processing when i=k is decomposed. Transformed multiplication processing 851 is obtained by decomposing transformed multiplication processing 841. In FIG. 9, as in FIG. 8, processing for the individual digits are decomposed and converted so as b to output values after addition processing is performed. This makes use of the rule that a product of large numbers is a sum of products of smaller numbers.

The low-order 4 bits of the output from $RM_0$ 861 constitutes the $0^{th}$ digit of the output value of the transformed multiplication processing 851, and the high-order 4 bits of $RM_0$ 861 are output to addition processing 1 (871). The low-order 4 bits of the output from $RM_1$ 862 are output to the addition processing 1 (871), and the high-order 4 bits of the output from $RM_1$ 862 are output to addition processing 1 (872). The low-order 4 bits of the output from $RM_1$ 863 are output to the addition processing 1 (872), and the high-order 4 bits of the output from $RM_2$ 863 are output to addition processing 1, which is not depicted.

The low-order 4 bits of the output from the addition processing 1 (871) constitute the $1^{st}$ digit of the output value of the transformed multiplication processing 851, and the high-order 4 bits of the output from the addition processing 1 (871) are output to addition processing 2 (873). The low-order 4 bits of the output from the addition processing 1 (872) are output to the addition processing 2 (873), and the high-order 4 bits of the output from the addition processing 1 (872) are output to addition processing 2, which is not depicted.

As described above, by decomposing the processing into processes for the individual digits, the sum of the input 115 bit sizes (in the above example, 1024+1024=2048 bits) becomes smaller, thereby allowing a reduction in the table size of the created tables.

For example, input to the $100^{th}$ digit, that is, $RM_{100}$, is equivalent to 202 4-bit integers. This is to say, the sum of the input bit size is 202×4=808 bits. Accordingly, the table size of the $100^{th}$ digit is 2808×(output byte size of the table) bytes. Since the size of a table before decomposition is $2^{2048}$×(output byte size of the table) bytes, the table size is reduced.

Figure 11:
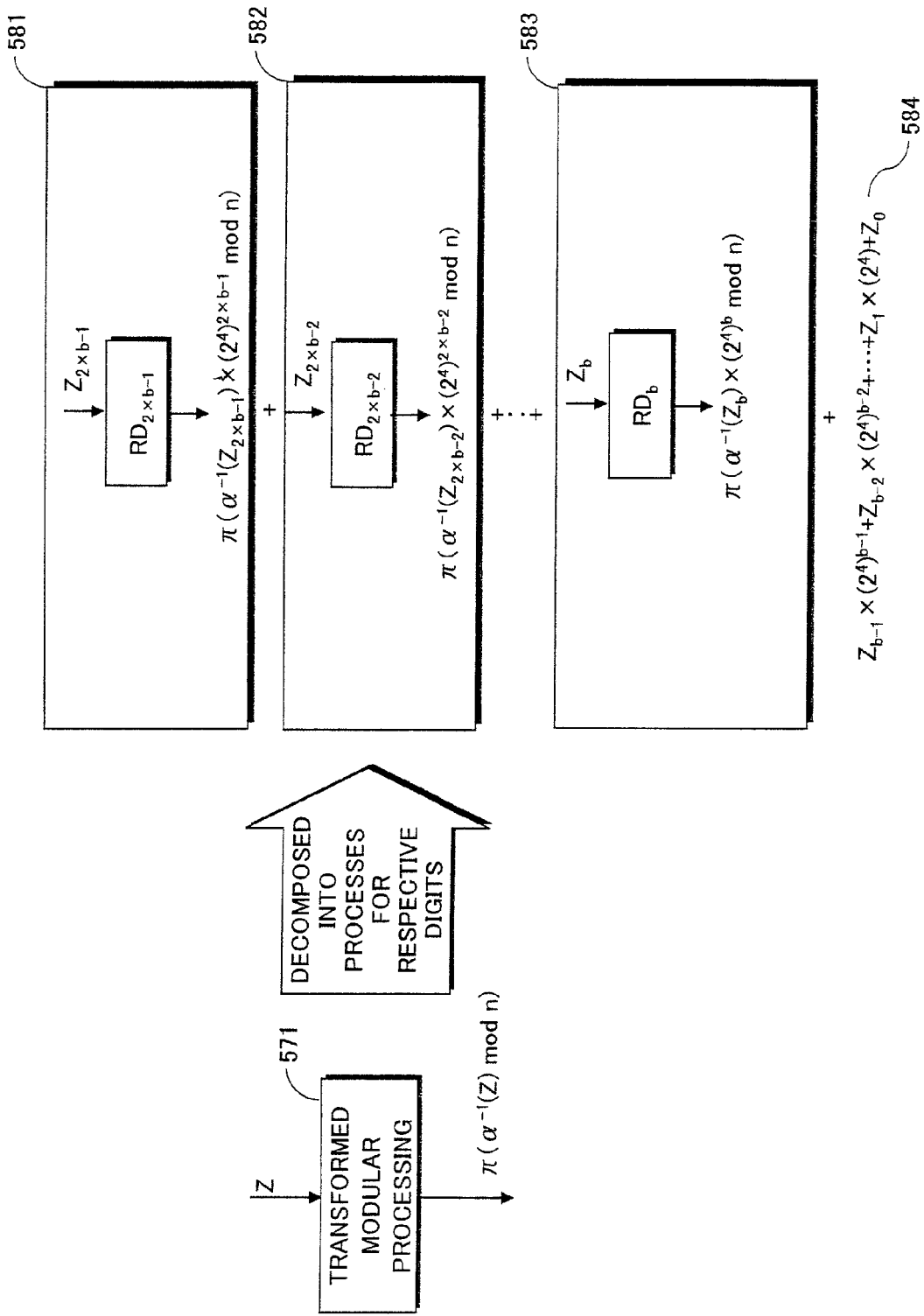
FIG. 11 shows a structure of the post-decomposition transformed modular processing.

While, in the above, the transformed multiplication processing is described, transformed modular processing can be decomposed by performing similar substitution and expansion processing, as shown in FIG. 11. It should be noted that while π in FIG. 11 indicates $π_i$ in the transformed modular multiplication processing $RT_i$, for the purpose of simplification, index i is omitted.

In the following, decomposed processing is described using FIG. 11.

The following expression is substituted into the input Z in the expression denoting transformed modular processing: $Z_0+Z_1×2^4+Z_2×2^8+\ldots+Z_{b-1}×2^{4(b-1)}+Z_b×2^{4b}+\ldots Z_{2b-1}×2^{4(2b-1)}$. Here, b is the number of digits of the integer n in the present embodiment, and is obtained by dividing the bit size of the integer n by 4. When the bit size of n is 1024, b=256.

It should be noted that, in the above expression, the number of digits of the input Z to the transformed modular processing is 2×b−1, and this is due to the following reason. The input Z to the transformed modular processing is a result of the transformed multiplication processing. In this transformed multiplication processing, an operation is performed using the output result of the previous table and the target data X. Here, the number of digits of the output result from the previous table is b−1 or less, as mod n operation has been performed, and, since the value of the target data X needs to be n or less in the RSA cryptosystem, the number of digits of the target data X is also b−1 or less. Multiplication of b−1 digits and b−1 digits yields an operation result 2×b−2, and when single-digit carry occurs, another digit is added thereon, which makes the maximum number of digits of the input to the transformed modular processing 2×b−1.

$$Z \bmod n = ((Z_0 + Z_1 × 2^4 + \ldots + Z_{b-1} × 2^{4(b-1)}) + (Z_b × 2^{4b} \bmod n) + (Z_{b+1} × 2^{4(b+1)} \bmod n) + \ldots + (Z_{2b-1} × 2^{4(2b-1)} \bmod n)) \bmod n$$

Here, by making use of the above property, the modular operation is performed as follows.

1) The modular operation is decomposed into the following processing.
   processing indicating $Z_b × 2^{4b}$ mod n
   processing indicating $Z_{b+1} × 2^{4(2b-1)}$ mod n
   . . .
   processing indicating $Z_{2b-1} × 2^{4(2b-1)}$ mod n
2) Each processing is tabulated.
3) Outputs from the respective tables are added using addition tables.

In FIG. 11, the processing indicating $Z_i × 2^{4i}$ mod n when i≧b is expressed as $RD_i$. Note that each addition sign "+" inserted between respective processing $RD_i$ in FIG. 11 indicates that the addition processing is decomposed into processes for the individual digits, and an input value conversion operation and an output value conversion operation are added to each addition processing after decomposition, as with the addition signs used in the description given on the decomposition of the transformed multiplication processing.

(6) Obfuscation Processing by Obfuscating apparatus 100 (Fifth Obfuscation Method—Process Decomposition (2))

As described in the fourth obfuscation method, when processing is decomposed, the table size for the $0^{th}$ digit (the lowest significant digit) and $1^{st}$ digit is not large, as the number of inputs (4-bit integer) is limited. However, the table size becomes larger with increase of the number of digits.

For example, input to the 100 digit, that is, $RM_{100}$, is equivalent to 202 4-bit integers, and the sum of the input bit sizes is 202×4=808 bits. Accordingly, the table size of the $100^{th}$ digit is $2^{808}$×(output byte size of the table) bytes, which is considerably large.

Figure 12:
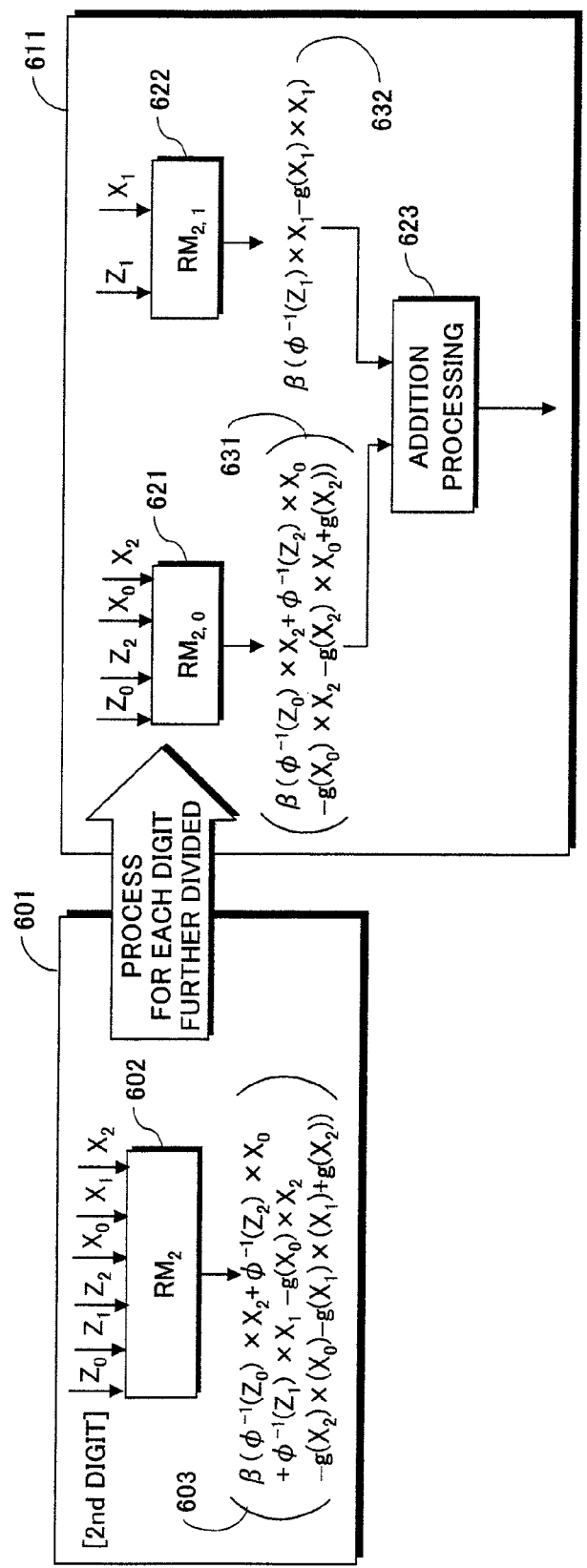
FIG. 12 shows a structure of multiplication processing when each individual digit process is further decomposed.

Thus, the fifth obfuscation method further decomposes each of the processes corresponding to the individual digits. FIG. 12 shows further decomposition of the process for the $2^{nd}$ digit. In processing 601 for the $2^{nd}$ digit before decomposition, input to $RM_2$ 602 includes $Z_0, Z_1, Z_2, X_0, X_1$, and $X_2$. On the other hand, processing 611, the processing after the further decomposition, decomposes the processing 601 into processing 621 that receives four inputs, which are $Z_0, Z_2, X_0$, and $X_2$, and processing 622 that receives two inputs, which are $Z_1$ and $X_1$.

Processes for other digits are similarly decomposed into a table receiving four inputs and a table receiving two inputs.

Here, the processing 621 is a table receiving four inputs. These four inputs include, among the digits of Z, digits whose sum of indexes is the same as the number of the digits included therein (for example, when the process for the $2^{nd}$ digit is decomposed, 0+2=2, thus $Z_0$ and $Z_2$) and digits of X ($X_0$ and $X_2$), indexes of which are the same as those of the digits of Z.

Further, when the number of the digits is an even number, the processing 622 is a table receiving two inputs. One of these inputs is a digit of Z whose index is equivalent to the half of the number of the digits ($Z_1$ when the number of the digits is 2, as 1+1=2.), and the other input is the digit of X($X_1$), which has the same index as $Z_1$. A conversion operation applied to such digits is the same as that applied to the four inputs. However, including inputs whose values after conversion operation are equal to each other, the four inputs can be simplified to two inputs.

For other digits, tables are decomposed in a similar manner. For example, the table for the $5^{th}$ digit is decomposed into tables receiving the following inputs.
   RM_(5,0): $Z_0, Z_5, X_0, X_5$
   RM_(5,1): $Z_1, Z_4, X_1, X_4$
   RM_(5,2): $Z_2, Z_3, X_2, X_3$ The table for the $8^{th}$ digit is decomposed into tables receiving the following inputs.
   RM_(8,0): $Z_0, Z_8, X_0, X_8$
   RM_(8,1): $Z_1, Z_7, X_1, X_7$
   RM_(8,2): $Z_2, Z_6, X_2, X_6$
   RM_(8,3): $Z_3, Z_5, X_3, X_5$
   RM_(8,4): $Z_4, X_4$, It should be noted that regarding the index (X,Y) assigned to RM, the first index X indicates which digit, and the second index Y indicates the smallest index value among the inputs.

As described above, by decomposing processing and tabulating the post-decomposition processes, the table size of one table is reduced to $2^{16}$×(output byte size of the table) bytes.

It should be noted that squaring operations can be decomposed in a similar way. Since the squaring operations are decomposed in substantially the same way as the multiplication operations, description is omitted here.

(7) Sharing Post-Decomposition Tables

Figure 13:
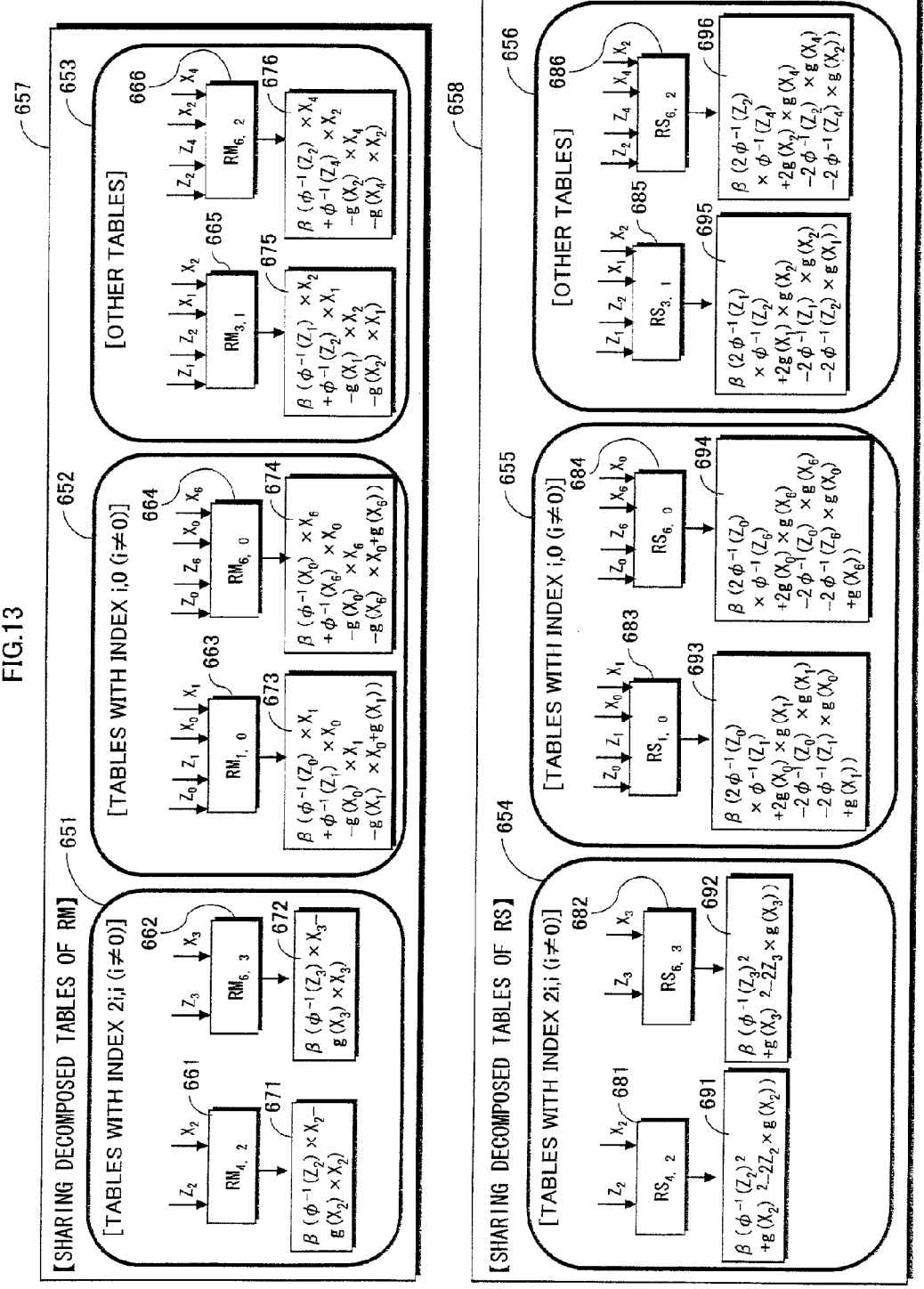
FIG. 13 shows patterns of tables which are commonly used.

When the tables are decomposed as above, as shown in FIG. 13, there are common processes among tables, and a plurality of tables can be represented by one table. FIG. 13 shows sharing by post-decomposition tables of RM 657 and sharing by post-decomposition tables of RS 658. Here, RS indicates a squaring operation.

In the sharing by the post-decomposition tables of RM 657 shown in FIG. 13, the boxed two tables, for example, the table 661 and the table 662 each execute the same processing with respect to its inputs. The index numbers of the tables 661 and 662 are 2×i, i(i≠0). The tables with its index numbers being 2×i, i (i≠0) can be represented by one table, and thus, the same one table can be used in place of a plurality of tables.

Similarly, the tables 663 and 664 each execute the same processing on its inputs. The tables 663 and 664 are tables with the index numbers of i,0(i≠0). For these tables also, one table can be commonly used.

Further, tables 665 and 656 perform the same processing on its inputs. For these tables also, one table can be commonly used.

Thus, each table can be categorized into one of four cases, depending on its combination of the index numbers.

(case a) tables with index numbers 0, 0
(case b) tables with index numbers 2×i, i(i≠0)
(case c) tables with index numbers i,0(i·0)
(case d) tables with other index numbers Here, the only difference between the tables with the index numbers i,0(i≠0) and the tables with other index numbers is whether $g(X_i)$ is added to the output or not. Similarly, the difference between the tables with the index numbers 0,0 and the tables with the index numbers 2×i, i(i≠0) is whether $g(X_i)$ ($g(X_0)$ when the index numbers are 0,0) is added or not. In other words, unlike other tables, the tables with the second index number being 0 have either $g(X_i)$ or $g(X_0)$ added to their outputs.

Thus, for multiple groups of tables, each group belonging to one of case a, case b, case c, and case d, although the input values to the tables are different, the relationships between the input values and the output values are the same. Accordingly, each group of tables belonging to the same case can be represented by one common table.

This is how the post-decomposition multiplication processing is able to use only four tables instead of using a large number of tables. One appropriate table can be selected out of four tables, depending on the index numbers of the received X and Z.

Similarly, in the sharing by the post-decomposition tables of RS 658, the boxed two tables, for example, tables 681 and 682 each perform the same processing on its inputs. The index numbers of the tables 681 and 682 are 2×i, i(i≠0). The tables with the index numbers 2×i, i(i≠0) can be represented by one common table. Accordingly, instead of using multiple tables, the same one table can be used.

Similarly, tables 683 and 684 each execute the same processing on its inputs. The index numbers of the tables 683 and 664 are i,0(i≠0). These tables can also be represented by one common table.

Further, tables 685 and 686 each perform the same processing on its inputs.

In the sharing by the post-decomposition tables of RS 658 shown in FIG. 13, similarly, each table can be categorized into one of the four cases, depending on its combination of the index numbers.

This is how, as with the multiplication processing, the post-decomposition squaring processing is able to use only four tables instead of using a large number of tables.

(8) Execution of Obfuscation by Obfuscating Apparatus 100

As described above, the obfuscating apparatus 100 executes obfuscation by performing the input value conversion operations, output value conversion operations, process decompositions, and sharing of tabulated post-decomposition processes.

Hereinafter, placement information of the modular multiplication and modular squaring in FIG. 4 is referred to as multiplication placement information. Also, as a result of performing the input value conversion operations, output value conversion operations, and process decompositions described in FIGS. 5 to 13, placement of the resulting processing and the tables is determined. Hereinafter, information indicating the placement of these processing and tables is referred to as post-decomposition processing placement information.

The obfuscating apparatus 100 first generates the multiplication placement information, and generates the post-decomposition processing placement information. Following that, the obfuscating apparatus 100 determines the input value conversion operations and output value conversion operations used in the post-decomposition processing placement information, and generates tables based thereon.

The tables are generated by, for example, associating input values with the resulting values obtained by applying the conversion operations to these inputs. A multidimensional array or the like can be applied as a specific realization method. Additionally, based on the post-decomposition processing placement information, the obfuscating apparatus 100 generates read instruction order information indicating an order of instructions for reading tables. Subsequently, the obfuscated program is completed by combining the generated instruction order information and the generated tables.

It should be noted that the obfuscated program generated by the obfuscating apparatus 100 may include instructions and data besides the above instruction order information and the tables. Also, the post-decomposition processing placement information may be provided to the obfuscating apparatus 100 in advance.

(9) Specific Example of Decomposition of Multiplication Processing

A specific example of the decomposition of multiplication processing is described referring to FIGS. 14 to 19.

(a) Decomposition of $RT_1$

Figure 14:
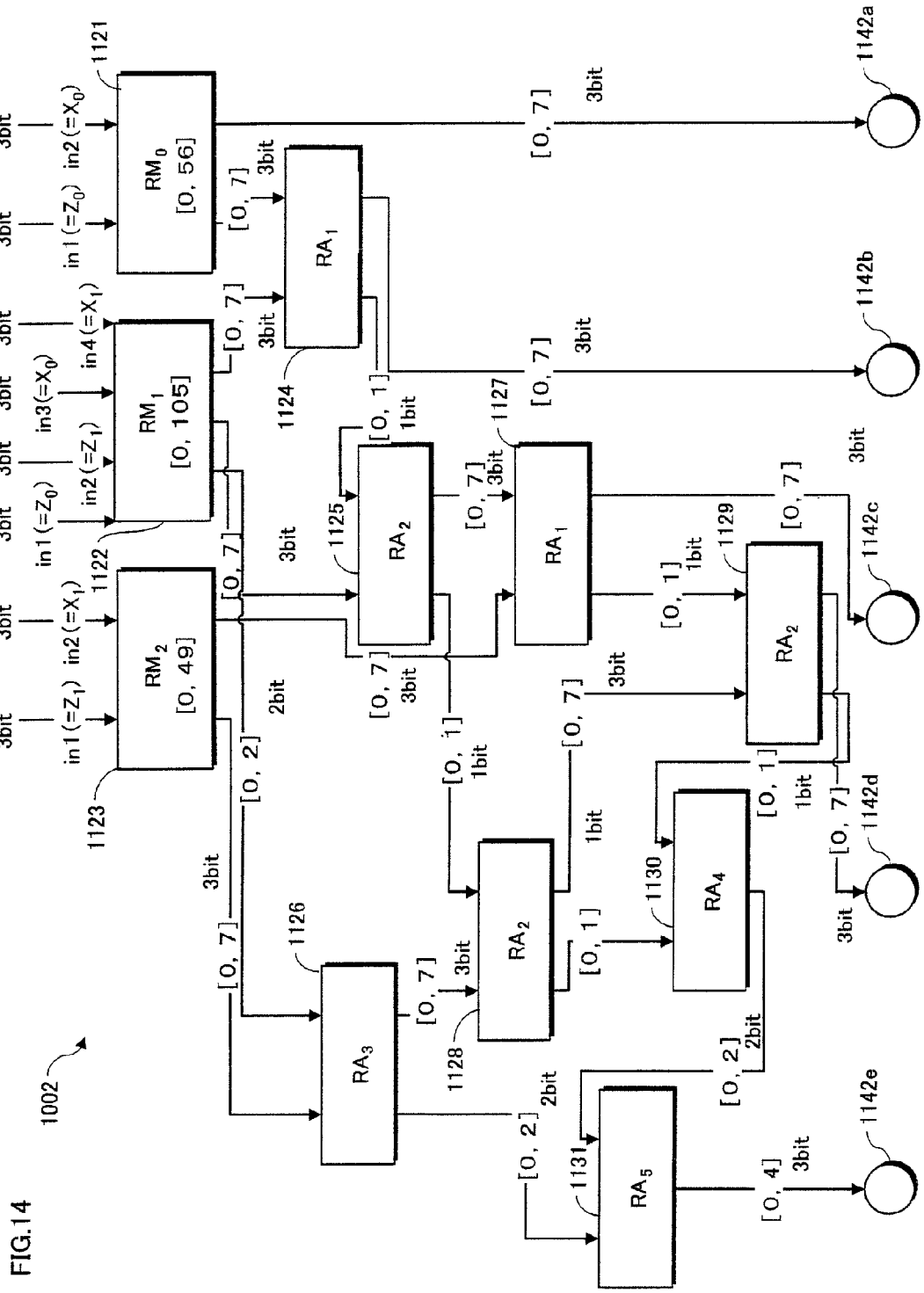
FIG. 14 shows a structure of multiplication processing 1002 decomposed with respect to $RT_1$.

Regarding the decomposition of $RT_1$, which is the conversion operation of the $1^{st}$ digit of the secret key d, description is given on an example where $RT_1$ is multiplication processing. FIG. 14 shows a structure of multiplication processing 1002 which is post-decomposition $RT_1$. Since $RT_1$ is the conversion operation of the $1^{st}$ digit of the secret key d, it does not include an input dependent subtraction and a conversion operation $\pi^{-1}$. In this specific example, the bit size of n is 6 bits, and this 6-bit data is decomposed into 2 digits. Here, each digit is composed of 3 bits. The intermediate values Z and X are as follows.

$Z=Z_0+Z_1\times2^3$ $X=X_0+X_1\times2^3$

In other words, $Z_0$, $Z_1$, $X_0$, and $X_1$ are values obtained as a result of decomposing Z and X into 3 bits. Here, the multiplication processing is decomposed into processes for individual digits according to the above-mentioned method, and as shown in FIG. 14, the multiplication processing 1002 includes $RM_0$ 1121, $RM_1$ 1122, $RM_2$ 1123, addition processing $RA_1$ 1124, $RA_2$ 1125, $RA_3$ 1126, $RA_1$ 1127, $RA_2$ 1128, $RA_2$ 1129, $RM_4$ 1130, and $RA_5$ 1131.

Here, $RM_0$ 1121 computes the $0^{th}$ digit of $RT_1$ and is post-decomposition multiplication processing which receives $Z_0$ and $X_0$ as input; $RM_1$ 1122 computes the $1^{st}$ digit of $RT_1$ and is post-decomposition multiplication processing which receives $Z_0$, $Z_1$, $X_0$, and $X_1$ as input; and $RM_2$ 1123 computes the $2^{nd}$ digit of $RT_1$ and is post-decomposition multiplication processing which receives $Z_1$ and $X_1$ as input.

By adding the outputs of $RM_0$, $RM_1$, and $RM_2$ using the addition processing $RA_1$, $RA_2$, ..., $RA_5$, the post-conversion value of the resulting product of multiplying Z and X is obtained.

In the present embodiment, as described above, each of $RM_0$, $RM_1$, $RM_2$, $RA_1$, $RA_2$, ..., $RA_5$ is also tabulated to increase resistance against analysis. It should be noted that $RA_1$, $RA_2$, ..., $RA_5$ each include the input value conversion operation and output value conversion operation, as with the addition processing 1 and addition processing 2 shown in FIG. 10.

Here, the boxes indicating $RM_0$ 1121, $RM_1$ 1122, and $RM_2$ 1123 contain a description therein such as "[0,56]", "[0,105]", or "[0,105]". These descriptions indicate that the output values of these processing before performing the output value conversion operation are in the range of "0" and "56", "0" and "105", and "0" and "49", respectively.

$RM_0$ 1121, $RM_1$ 1122, $RM_2$ 1123, $RA_1$ 1124, $RA_2$ 1125, and $RA_3$ 1126 each have multiple outputs ($RM_1$ which outputs three digits has a middle part and three outputs, and the others have two outputs each). Here, for all except for $RM_1$ 1122, on the left side facing the figure is the high-order part of the output before application of the output value conversion operation, whereas on the right side is the low-order part of the output before application of the output value conversion operation. $RM_1$ 1122 has a middle part as it has 3-digit output.

For example, the range of the output value of $RM_0$ 1121 is "0" to "56", and the high-order 3 bits of its output value are input to $RA_1$ 1124 while the low-order 3 bits are output from the multiplication processing 1002. The descriptions "[0,7]" at the high-order part and the low-order part of $RM_0$ 1121 also indicate that the values before output value conversion operation are in the range of 0 to 7, respectively. The multiplication processing 1002 outputs 3-bit values 1142a, 1142b, 1142c, 1142d, and 1142e, which are described at the bottom of FIG. 14, as the final output values. In this example, the multiplication processing 1002 receives, as input, Z and X each being 6 bits, and outputs values of 15 bits in total.

Figure 15:
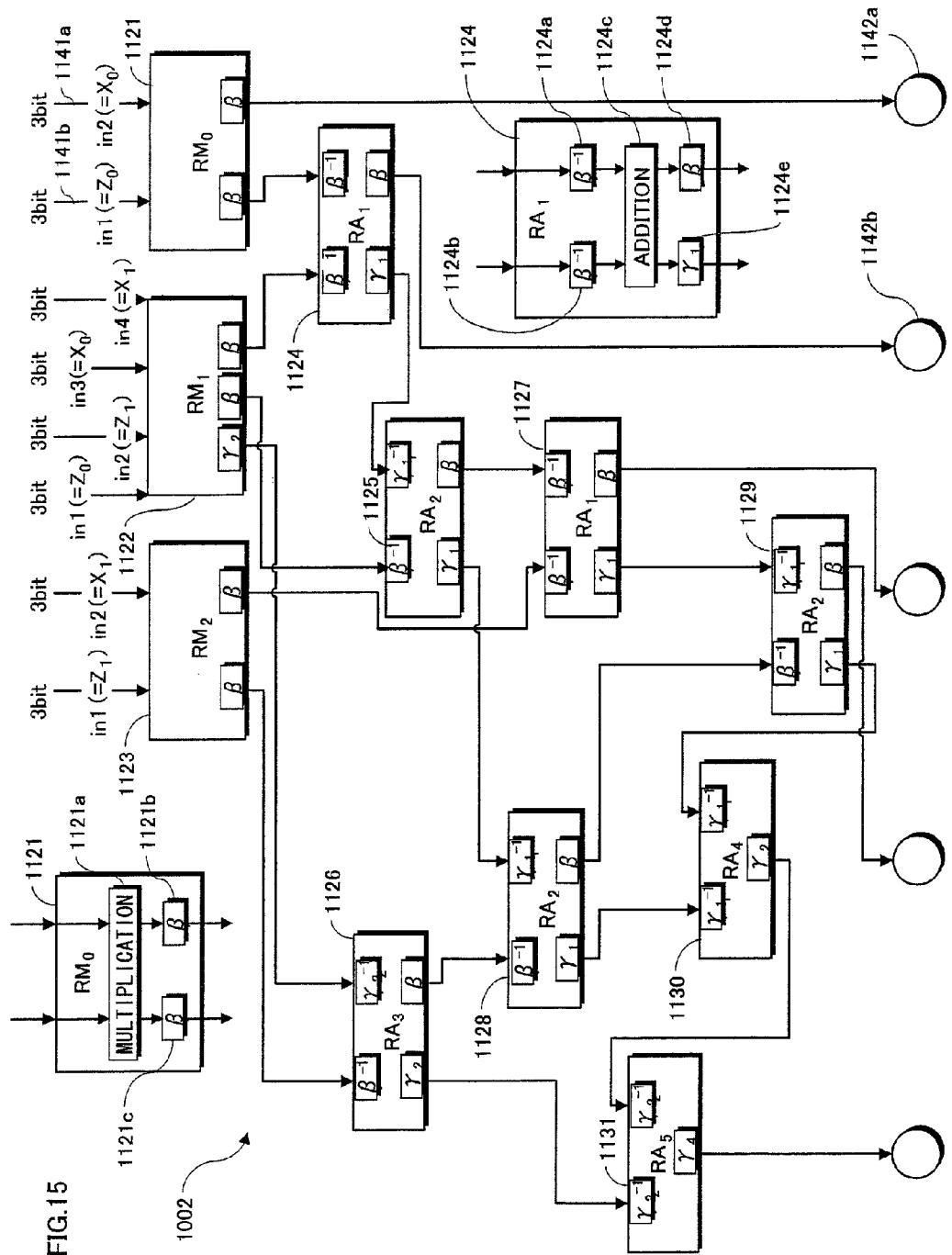
FIG. 15 shows the structure of multiplication processing 1002 decomposed with respect to $RT_1$; input value conversion operations and output value conversion operations are indicated in the figure.

FIG. 15 indicates input value conversion operations and output value conversion operations for each of $RM_0$ 1121, $RM_1$ 1122, $RM_2$ 1123, $RA_1$ 1124, $RA_2$ 1125, ..., $RA_5$ 1131 which compose the multiplication processing 1002 in FIG. 14.

For example, $RA_1$ 1124 includes an input value conversion operation $\beta^{-1}$ 1124b immediately after the high-order input value, an input value conversion operation $\beta^{-1}$ 1124a immediately after the low-order input value, an addition 1124c which adds the output value of $\beta^{-1}$ 1124b and the output value of $\beta^{-1}$ 1124a, an output value conversion operation $\gamma_1$ 1124e immediately after the high-order output value of the addition 1124c, and an output value conversion operation $\beta$ 1124d immediately after the low-order output value of the addition 1124c.

$RM_0$ 1121 includes a multiplication 1121a applied to the high-order and low-order input values thereof, an input value conversion operation $\beta$ 1121c immediately after the high-order output value of the multiplication 1121a, and an input value conversion operation $\beta$ 1121b immediately after the low-order output value of the multiplication 1121a.

(b) Decomposition of $RT_i$ ($2 \leq i \leq k-1$)

Figure 16:
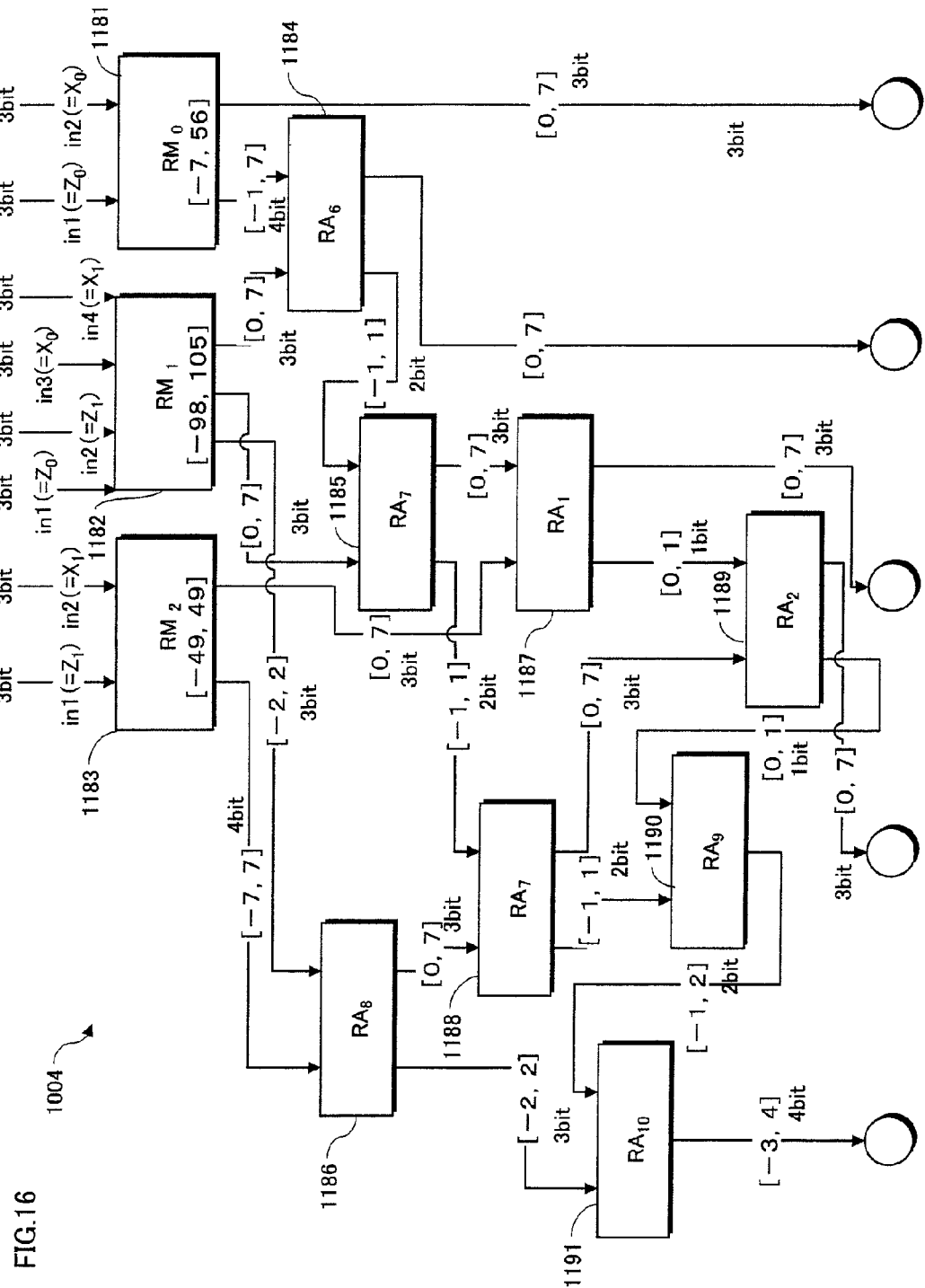
FIG. 16 shows a structure of multiplication processing 1004, decomposed with respect to $RT_1$ ($2 \leq i \leq k-1$)

Next, description is given on the structure of multiplication processing which is post-decomposition $RT_i$ ($2 \leq i \leq k-1$). Since conversion operations in this processing include inverse conversions of the output value conversion operations and the like of the preceding processing, contents of the processing are somewhat different from those of $RT_1$. FIG. 16 indicates the structure of post-decomposition multiplication processing 1004 included in $RT_i$ ($2 \leq i \leq k-1$). In this example also, the bit size of n is 6 bits, and each 6-bit data is decomposed into two digits. Each digit is composed of 3 bits.

Here, the multiplication processing for each digit is further decomposed, and as with the multiplication processing applied to the $RT_1$, the multiplication processing 1004 includes $RM_0$ 1181, $RM_1$ 1182, $RM_2$ 1183, addition processing $RA_6$ 1184, $RA_7$ 1185, $RA_8$ 1186, $RA_1$ 1187, $RA_7$ 1188, $RA_2$ 1189, $RM_9$ 1190, and $RA_{10}$ 1191, as shown in FIG. 16.

Here, $RM_0$ 1181 is post-decomposition multiplication processing which receives $Z_0$ and $X_0$ as input; $RM_1$ 1182 is post-decomposition multiplication processing which receives $Z_0$, $Z_1$, $X_0$, and $X_1$ as input; and $RM_2$ 1183 is post-decomposition multiplication processing which receives $Z_1$ and $X_1$ as input.

Further, by adding the outputs of $RM_0$, $RM_1$, and $RM_2$ using the addition processing $RA_1$, $R_2$, ..., $RA_{10}$, the post-conversion value of the resulting product of multiplying Z and X is obtained. Here, $RM_0$, $RM_1$, $RM_2$, $RA_1$, $RA_2$, ..., $RA_{10}$ are tabulated.

Note that the descriptions such as "[−7,56]" in $RM_0$, $RM_1$, and $RM_2$ indicate that the output value of the processing is in the range of −7 to 56. Also note that unlike the multiplication processing applied to $RT_1$, negative values are included in the range. A negative output is generated due to performing an input dependent subtraction to cancel an input dependent addition of the preceding processing. Here, $RM_0$, $RM_1$, $RM_2$, $RA_1$, $RA_2$, ... $RA_{10}$ each have two outputs composed of the high-order part which includes negative values in the range and the low-order part which includes only positive values in the range. The left-side output facing the figure indicates the high-order part of the output before output value conversion operation, while the right-side output indicates the low-order part of the output before output value conversion operation ($RM_1$ may take one of 106 kinds of values, that is, 0 to 105, and needs 7 bits for expression in a binary form. Accordingly, when each digit is 3 bits, $RM_1$ has three digits, including the middle-order part which is in the range of positive values).

For example, output "out" of $RM_0$ is as follows:

Low-order part=out mod 8,

High-order part=(out−(Low-order part)/8 mod 8.

Output "out" of $RM_1$ is as follows:

Low-order part=out mod 8,

Middle-order part=(out−(Low-order part)/8 mod 8,

High-order part=(out−Low-order part−Middle-order part×8)/64.

It should be noted that the value range for the high-order and low-order parts of the output indicates the range for the value before output value conversion operation, and the value after output value conversion operation may be outside this range. For example, the high-order part of the output of $RM_0$ is [−1,7] before output value conversion operation, but may be set to such as [0,8] after output value conversion operation for the sake of easy handling. According to this example, the multiplication processing receives inputs of Z and X each being 6 bits, and outputs values of 16 bits in total (the most significant digit including sign information).

Figure 17:
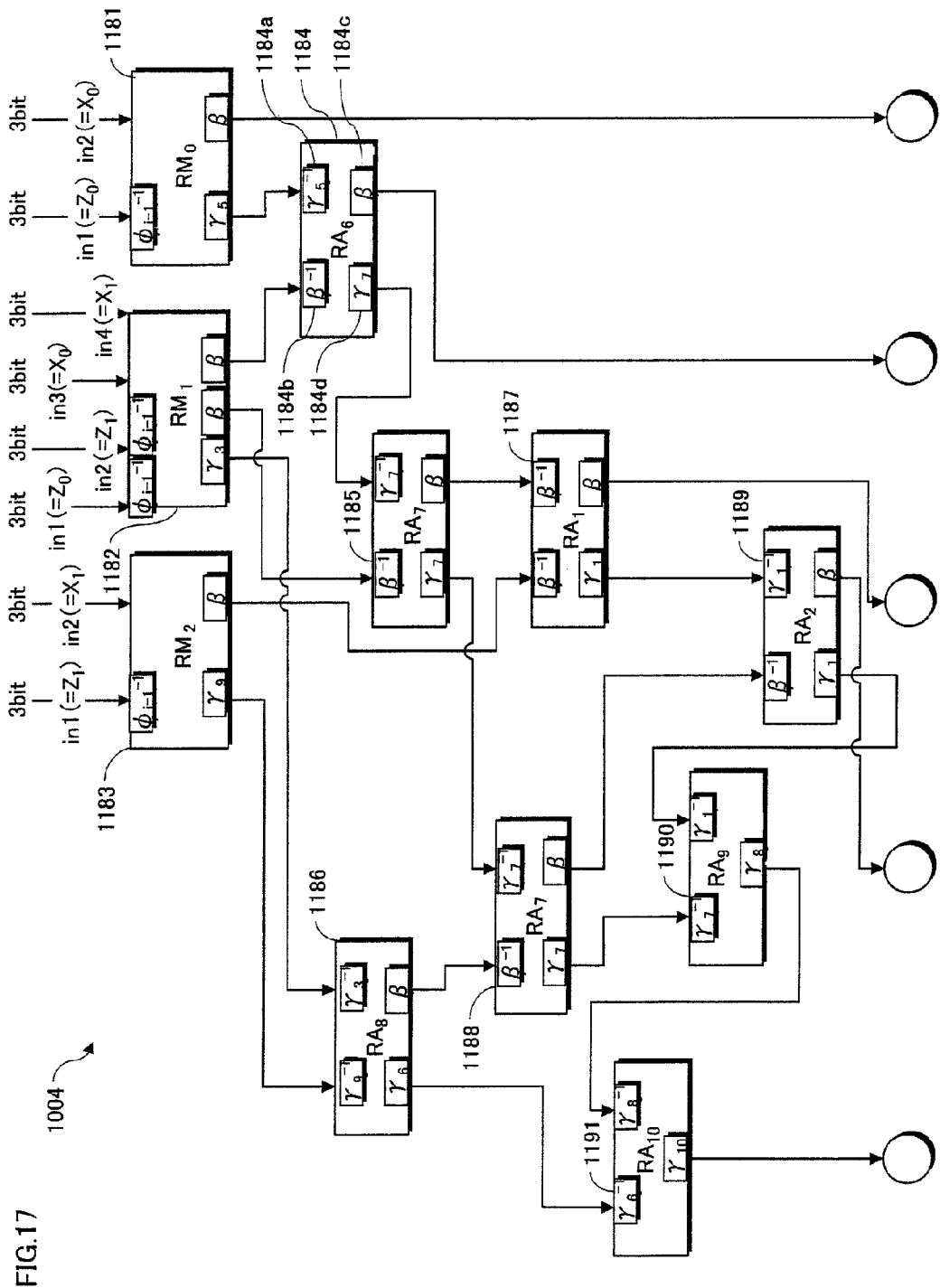
FIG. 17 shows the structure of multiplication processing 1004 decomposed with respect to $RT_1$ ($2 \leq i \leq k-1$); input value conversion operations and output value conversion operations are indicated in the figure.

FIG. 17 indicates input value conversion operations and output value conversion operations included in each of $RM_0$ 1181, $RM_1$ 1182, $RM_2$ 1183, ..., $RA_1$ 1187, $RA_2$ 1189, ..., $RA_{10}$ 1191 shown in FIG. 14. For example, $RA_6$ 1184 includes an input value conversion operation $\beta^{-1}$ 1184b immediately after the high-order input value, $\gamma_s^{-1}$ 1184a immediately after the low-order input value, an output value conversion operation $\gamma$, 1184d immediately after the high-order output value, and an output value conversion operation $\beta$ 1184c immediately after the low-order output value.

It should be noted that each input value conversion operation and output value conversion operation may be any conversion operation as long as conversion operations directly connected within the figure cancel each other.

(c) Decomposition of $RT_k$

Next, description is given on the structure of multiplication processing which is post-decomposition $RT_k$.

Figure 18:
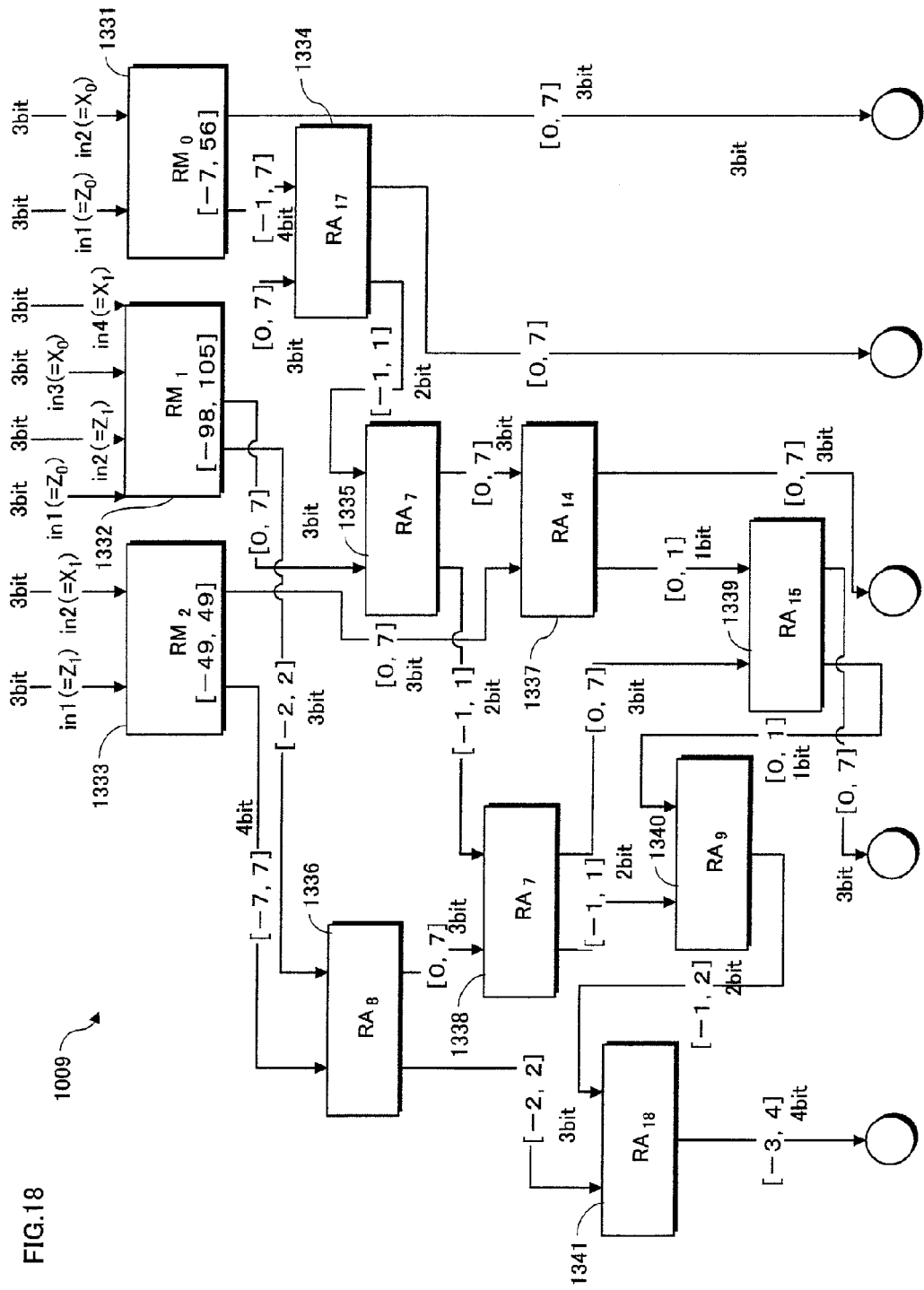
FIG. 18 shows a structure of multiplication processing 1009 decomposed with respect to $RT_k$.

FIG. 18 shows the structure of multiplication processing 1009, which is post-decomposition $RT_k$.

As shown in FIG. 18, the multiplication processing 1009 includes $RM_0$ 1331, $RM_1$ 1332, $RM_2$ 1333, addition processing $RA_{17}$ 1334, $RA_7$ 1335, $RA_8$ 1336, $RA_{14}$ 1337, $RA_7$ 1338, $RA_{15}$ 1339, $RM_9$ 1340, and $RA_{18}$ 1341.

Here, $RM_0$ 1331 is post-decomposition multiplication processing which receives $Z_0$ and $X_0$ as input; $RM_1$ 1332 is post-decomposition multiplication processing which receives $Z_0$, $Z_1$, $X_0$, and $X_1$ as input; and $RM_2$ 1333 is post-decomposition multiplication processing which receives $Z_1$ and $X_1$ as input.

Furthermore, by adding the outputs of $RM_0$, $RM_1$, and $RM_2$ using the addition processing $RA_{17}$, $RA_7$, ..., the post-conversion value of the resulting product of multiplying Z and X is obtained.

Figure 19:
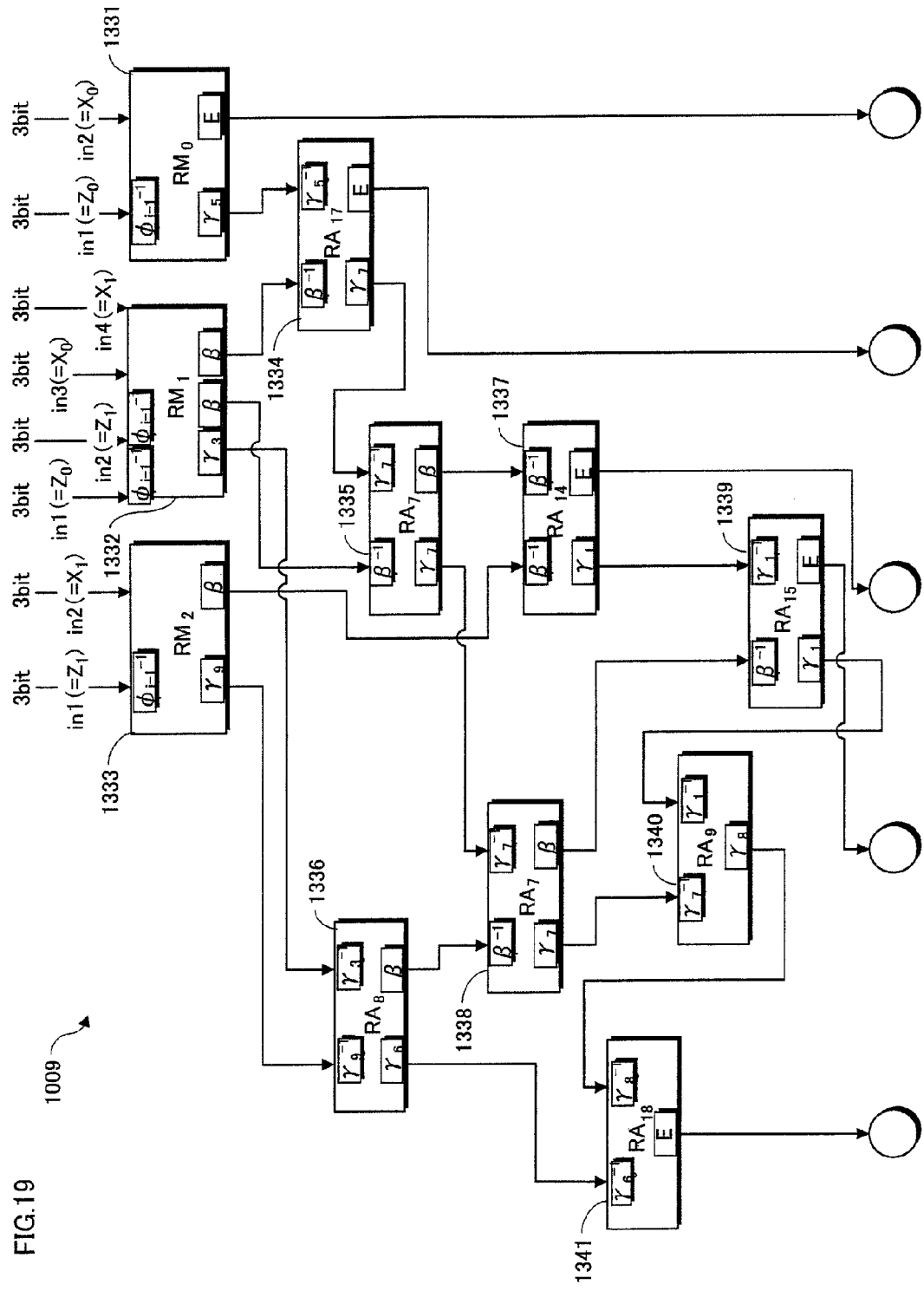
FIG. 19 shows a structure of multiplication processing 1009 decomposed with respect to $RT_k$; input value conversion operations and output value conversion operations are indicated in the figure.

FIG. 19 indicates input value conversion operations and output value conversion operations for each of $RM_0$ 1331, $RM_1$ 1332, $RM_2$ 1333, $RA_{17}$ 1334, $RA_7$ 1335, $RA_8$ 1336, $RA_{14}$ 1337, $RA_7$ 1338, $RA_{15}$ 1339, $RA_9$ 1340, and $RA_{18}$ 1341 which compose the multiplication processing 1009 in FIG. 18.

It should be noted that $RM_0$ 1331, $RA_{17}$ 1334, $RA_{14}$ 1337, $RA_{15}$ 1339, and $RA_{18}$ 1341 in FIG. 19 each include a conversion operation E. Here, the conversion operation E indicates that no process is performed.

(d) Specific Examples of Tables Corresponding to $RM_1$ in $RT_1$.

Figures 41, 42A, 42B, 42C:
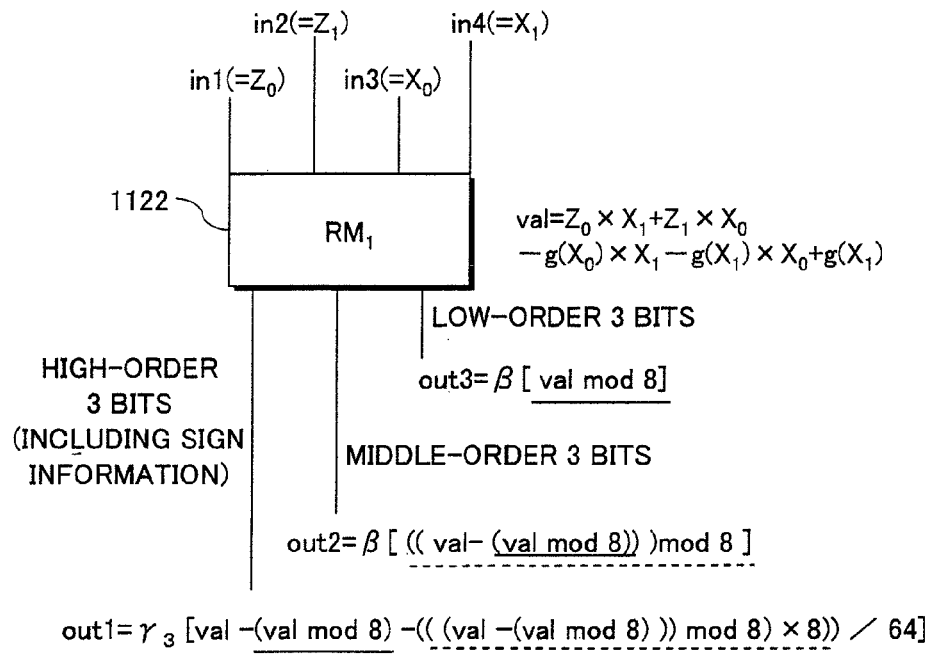
FIG. 41 provides details of $RM_1$ of $RT_1$ shown in FIG. 15.
FIGS. 42A, 42B, and 42C each provide a table as a specific example of a conversion operation $\beta$, a conversion operation g, and a conversion operation $\gamma_3$ of $RM_1$ of $RT_1$ shown in FIG. 15.

FIGS. 41 to 43 show specific examples of tables corresponding to $RM_1$ 1122 shown in FIG. 15 on $RT_1$.

FIG. 41 shows details of $RM_1$ 1122 shown in FIG. 15 on $RT_1$. $RM_1$ applies a conversion operation using a table 1421 shown in FIG. 43 to an input value group composed of four input values which are in1, in2, in3, and in4, and outputs an output value group composed of three output values, which are out1, out2, and out3.

Here, if in1=$Z_0$, in2=$Z_1$, in3=$X_0$, and in4=$X_1$, then $RT_1$ computes:

$$val = Z_0 \times X_1 + Z_1 \times X_0 - g(X_0) \times X_1 - g(X_1) \times X_0 + g(X_1).$$

As a result, the following are obtained:

out1=$\gamma_3$[val−(val mod 8)−(((val−(val mod 8)))mod 8)×8])/64]

out2=$\beta$[((val−(val mod 8))8)mod 8]

out3=$\beta$[val mod 8]

As shown in FIG. 43, the table 1421 is composed of multiple input value groups (in1, in2, in3, and in4), and multiple output value groups (out1, out2, and out3) respectively corresponding to the multiple input value groups.

It should be noted that in FIG. 43, to facilitate understanding of the operation processes, intermediate values obtained during operations are described in addition to the multiple input value groups (in1, in2, in3, and in4) and the multiple output value groups (out1, out2, out3, and out4). However, as described earlier, the table 1421 is composed only of the multiple input value groups (in1, in2, in3, and in4) and the multiple output value groups (out1, out2, and out3).

FIG. 42A, FIG. 42B, and FIG. 42C show the tables 1422, 1423, and 1424, respectively, as a specific example of the conversion operation $\beta$, conversion operation g, and conversion operation $\gamma_3$ in $RM_1$ shown in FIG. 15 on $RT_1$.

(e) Specific Examples of Tables Corresponding to $RM_1$ in $RT_i$ ($2 \leq i \leq k-1$)

Figure 24:
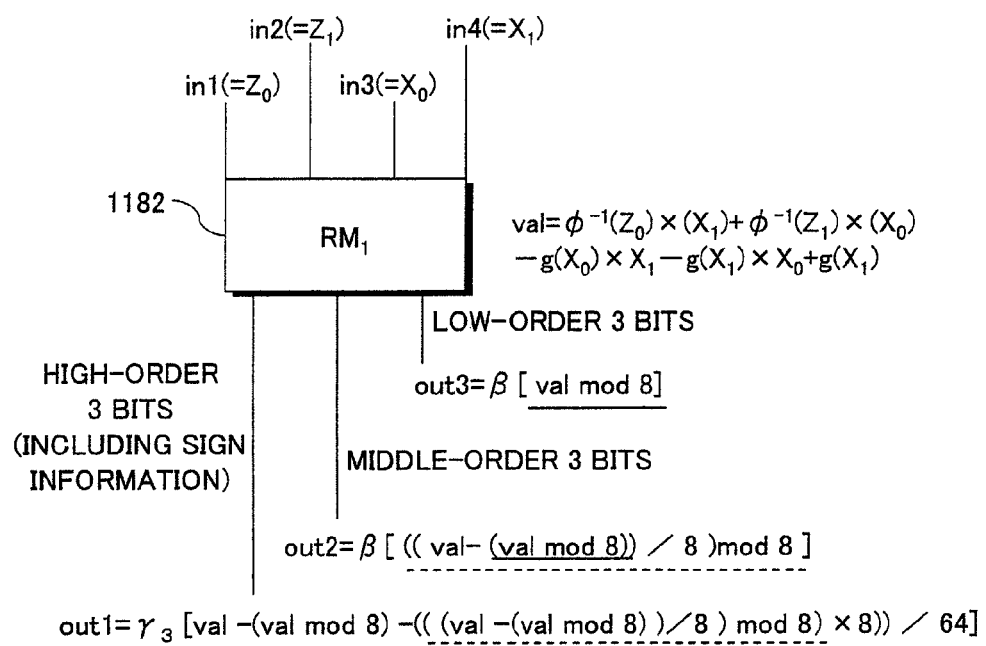
FIG. 24 provides details of $RM_1$ of $RT_1$ ($2 \leq i \leq k-1$) shown in FIG. 17.

FIGS. 24 to 26 show specific examples of tables corresponding to $RM_1$ 1182 shown in FIG. 17 on $RT_i$ ($2 \leq i \leq k-1$).

FIG. 24 shows details of $RM_1$ 1182 shown in FIG. 17 on $RT_1$. $RM_1$ applies a conversion operation using a table 1360 shown in FIG. 25 to an input value group composed of four input values (in1, in2, in3, and in4), and outputs an output value group composed of three output values (out1, out2, and out3).

Here, if in1=$Z_0$, in2=$Z_1$, in3=$X_0$, and in4=$X_1$, then $RT_i$ ($2 \leq i \leq k-1$) computes:

$$val = \phi^{-1}(Z_0) \times (X_1) + \phi^{-1}(Z_1) \times (X_0) - g(X_0) \times X_1 - g(X_1) \times X_0 + g(X_1).$$

As a result, the followings are obtained:

out1=$\gamma_3$[val−(val mod 8)−(((val−(val mod 8))/8)mod 8)×8))/64]

out2=$\beta$[((val−(val mod 8))/8)mod 8]

out3=$\beta$[val mod 8]

As shown in FIG. 25, the table 1360 is composed of multiple input value groups (in1, in2, in3, and in4), and multiple output value groups (out1, out2, and out3) respectively corresponding to the multiple input value groups.

It should be noted that in FIG. 25, to facilitate understanding of the operation processes, intermediate values obtained during operations are described in addition to the multiple input value groups (in1, in2, in3, and in4) and the multiple output value groups (out1, out2, and out3). However, as described earlier, the table 1360 is composed only of the multiple input value groups (in1, in2, in3, and in4) and the multiple output value groups (out1, out2, and out3)

FIG. 26A, FIG. 26B, FIG. 26C, and FIG. 26D show tables as specific examples of the conversion operation $\beta$, conversion operation $\phi^{-1}$, conversion operation g, and conversion operation $\gamma_3$ in $RM_1$ shown in FIG. 17 on $RT_1$.

It should be noted, in FIG. 25, while the value of out1 before output value conversion operation can take one of five values in the range of −2 to 2, as a result of application of $\gamma_3$, the value is converted to one of eight values in the range of 0 to 7. This makes it harder for an attacker to examine occurrence probability of each post-conversion value and guess its pre-conversion value. For example, this can prevent an attack which analyzes contents of processing performed by a table based on an assumption that the value with the highest occurrence probability is 0 before conversion. It should be noted here that while $\gamma_3(-1)$ corresponding to $-1$ takes one of two values, 0 and 1, $\gamma_3$ is set in a manner that the values of the output out1 of the entire $RM_1$ are as uniformly distributed as possible. That is to say, while the value of the output out1 is distributed from 0 and 7, $\gamma_3$ is set to make occurrence probability of each value the same. In FIG. 26, because the occurrence probabilities of $-1$, 0, and 1 as the input to $\gamma_3$ are high, they are each converted to two values. Likewise, $\gamma_1$ in out1 in FIG. 31 described below is also converted to multiple values.

(f) Specific Examples of Tables Corresponding to $RM_1$ in $RT_k$

Figures 26A, 26B, 26C, 26D, 27:
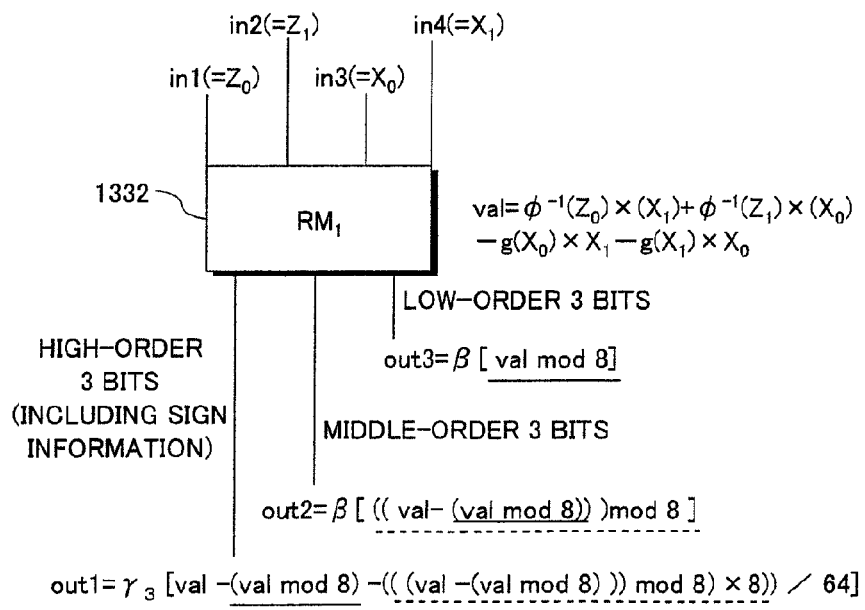
FIGS. 26A, 26B, 26C, and 26D each provide a table as a specific example of a conversion operation $\beta$, a conversion operation $\phi^{-1}$ a conversion operation g, and a conversion operation $\gamma_3$ of $RM_1$ of $RT_1$ ($2 \leq i \leq k-1$) shown in FIG. 17.
FIG. 27 provides details of $RM_1$ of $RT_k$ shown in FIG. 19.

FIGS. 27 to 29 show specific examples of tables corresponding to $RM_1$ 1332 shown in FIG. 19 on $RT_k$.

FIG. 27 shows details of $RM_1$ 1332 indicated in FIG. 19 on $RT_k$. $RM_1$ applies a conversion operation using a table 1390 shown in FIG. 28 to an input value group composed of four input values (in1, in2, in3, and in4), and outputs an output value group composed of three output values (out1, out2, and out3).

Here, if in1=$Z_0$, in2=$Z_1$, in3=$X_0$, and in4=$X_1$, then $RT_k$ computes:

$$val = \phi^{-1}(Z_0) \times (X_1) + \phi^{-1}(Z_1) \times (X_0) - g(X_0) \times X_1 - g(X_1) \times X_0.$$

As a result, the followings are obtained:

out1=$\gamma_3$[val−(val mod 8)−(((val−(val mod 8)))mod 8)×8))/64]

out2=$\beta$[((val−(val mod 8)))mod 8]

out3=$\beta$[val mod 8]

As shown in FIG. 28, the table 1390 is composed of multiple input value groups (in1, in2, in3, and in4), and multiple output value groups (out1, out2, and out3) respectively corresponding to the multiple input value groups.

It should be noted that in FIG. 28, to facilitate understanding of the operation processes, intermediate values obtained during operations are described in addition to the multiple input value groups (in1, in2, in3, and in4) and the multiple output value groups (out1, out2, and out3). However, as described earlier, the table 1390 is composed only of the multiple input value groups (in1, in2, in3, and in4) and the multiple output value groups (out1, out2, and out3).

FIG. 29A, FIG. 29B, FIG. 29C, and FIG. 29D show tables 1391, 1392, 1393, and 1394, respectively, as a specific example of the conversion operation $\beta$, conversion operation $\phi^{-1}$, conversion operation g, and conversion operation $\gamma_3$ in $RM_1$ shown in FIG. 19 on $RT_1$.

(g) Specific Examples of Tables Corresponding to $RA_1$ in $RT_1$

Figures 29A, 29B, 29C, 29D, 30:
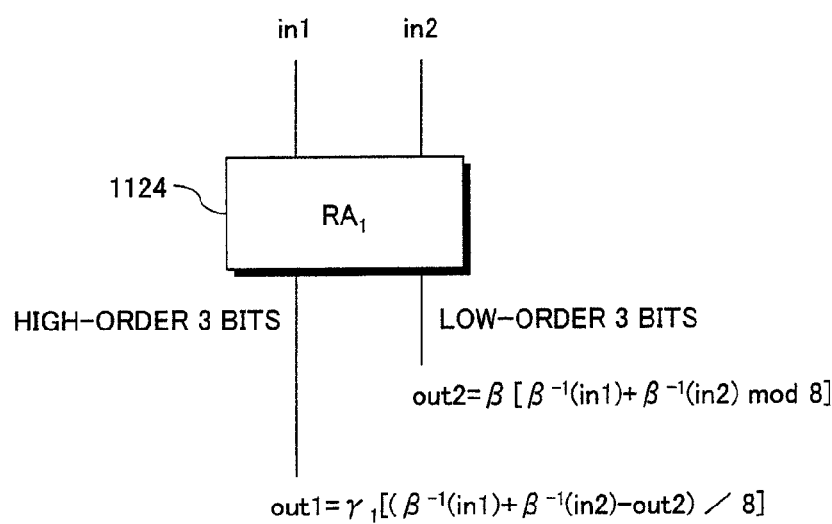
FIGS. 29A, 29B, 29C, and 29D each provide a table as a specific example of a conversion operation $\beta$, a conversion operation $\phi^{-1}$ a conversion operation g, and a conversion operation $\gamma_3$ of $RM_1$ of $RT_k$ ($2 \leq i \leq k-1$) shown in FIG. 19.
FIG. 30 provides details of $RA_1$ of $RT_1$ shown in FIG. 15.

FIGS. 30 to 32 show specific examples of tables corresponding to $RA_1$ 1124 shown in FIG. 15 on $RT_1$.

FIG. 30 shows details of $RA_1$ 1124 shown in FIG. 15 on $RT_1$. $RA_1$ applies a conversion operation using a table 1410 shown in FIG. 31 to an input value group composed of two input values (in1 and in2), and outputs an output value group composed of two output values (out1 and out2).

$RT_1$ computes:

out1=$\gamma_1$[($\beta^{-1}$(in1)+$\beta^{-1}$(in2)−out2)/8]

out2=$\beta$[$\beta^{-1}$(in1)+$\beta^{-1}$(in2)mod 8]

As shown in FIG. 31, the table 1410 is composed of multiple input value groups (in1 and in2), and multiple output value groups (out1 and out2) respectively corresponding to the multiple input value groups.

It should be noted that in FIG. 31, to facilitate understanding of the operation processes, intermediate values obtained during operations are described in addition to the multiple input value groups (in1 and in2) and the multiple output value groups (out1 and out2). However, as described earlier, the table 1410 is composed only of the multiple input value groups (in1 and in2) and the multiple output value groups (out1 and out2).

Figure 32A:
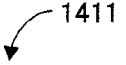
FIGS. 32A, 32B, and 32C each provide a table as a specific example of a conversion operation $\beta$, a conversion operation $\gamma_1$ and a conversion operation $\beta^{-1}$ of $RA_1$ of $RT_1$ shown in FIG. 15.
Figure 32B:
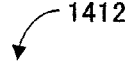
Figure 32C:
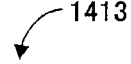

FIG. 32A, FIG. 32B, and FIG. 32C show tables 1411, 1412, and 1413, respectively, as a specific example of the conversion operation $\beta$, conversion operation $\gamma_1$, and conversion operation $\beta^{-1}$ in $RA_1$ in $RT_1$ shown in FIG. 15.

(10) Specific Example of Decomposition of Modular Processing

A specific example of decomposition of modular processing is described in the following using FIGS. 20 to 23.

As shown in FIGS. 20 to 23, modular processing 1005, which is post-conversion processing, is composed of modular operations $RD_0$ 1201, $RD_1$ 1206, $RD_2$ 1212, $RD_3$ 1218, additions $RA_1$ 1202, $RA_1$ 1203, $RA_2$ 1204, $RA_{12}$ 1205, $RA_1$ 1207, $RA_1$ 1208, $RA_2$ 1209, $RA_{12}$ 1210, $RA_4$ 1211, $RA_1$ 1213, $RA_1$ 1214, $RA_2$ 1215, $RA_{13}$ 1216, $RA_4$ 1217, $RA_1$ 1219, $RA_1$ 1220, $RA_2$ 1221, and $RA_4$ 1222.

Here, the modular operations $RD_0$ 1201, $RD_1$ 1206, $RD_2$ 1212, and $RD_3$ 1218 are tables for performing modular operations. These tables store multiple pairs of data, each being composed of a target value and a remainder value corresponding to the target value, the target value being the target of the operation. Upon receiving designation of a target value as input, the remainder value corresponding to the target value is searched on the table and output. It should be noted that the modular operations $RD_0$ 1201, $RD_1$ 1206, $RD_2$ 1212, and $RD_3$ 1218 respectively apply a conversion operation before and after the above-mentioned modular operation.

$RA_1$, $RA_2$, $RA_{12}$, . . . , are addition processing tables for performing addition to reflect addition and carry for each digit. These tables store multiple sets of data, each set being composed of two target values and a sum value corresponding to the two target values, the two target values being the target of the operations. Upon receiving designation of two target values as input, the sum value corresponding to these target values is searched on the table and output. It should be noted that $RA_1$, $RA_2$, $RA_{12}$, . . . , respectively apply a conversion operation before and after the above-mentioned addition operation.

In this example, the modular processing 1005 calculates the remainder of the following with the integer n being the modulus:

$$Z = Z_0 + Z_1 \times 2^3 + Z_2 \times 2^6 + Z_3 \times 2^9 + Z_4 \times 2^{12}$$

Figure 20:
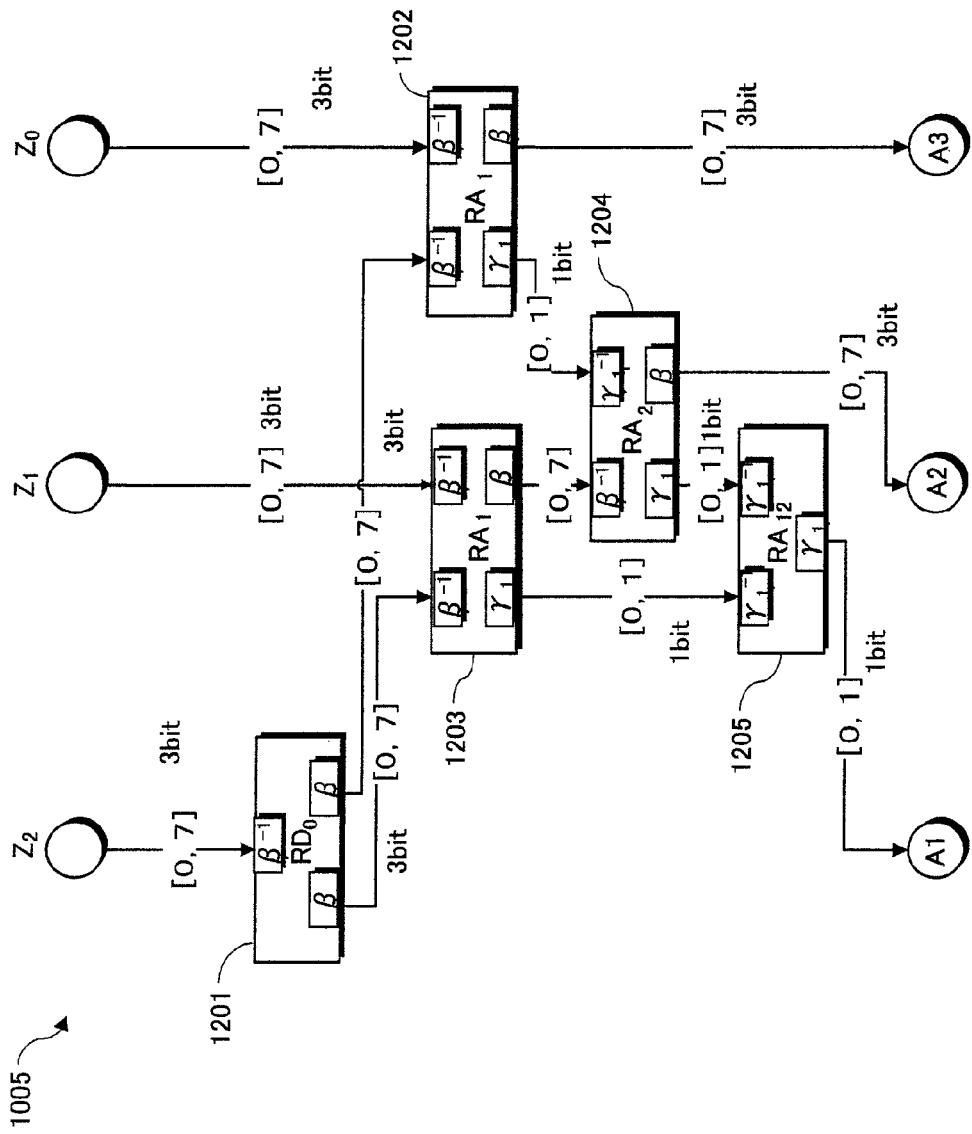
FIG. 20 shows a structure of the post-decomposition modular processing 1005 (continued to FIG. 21)

(a) Operations shown in FIG. 20, which are part of the modular processing 1005, calculate the following:

$$(Z_0 + Z_1 \times 2^3) + (Z_2 \times 2^5 \bmod n)$$

In other words, in the operations shown in FIG. 20, the modular operation $RD_0$ 1201, the addition $RA_1$ 1203 and $RA_1$ 1202 each receive three 3-bit input values $Z_2$, $Z_1$, and $Z_0$ as input.

The modular operation $RD_0$ 1201 outputs the high-order 3 bits and the low-order 3 bits of its operation result to the additions $RA_1$ 1203 and $RA_1$ 1202, respectively. The addition $RA_1$ 1203 outputs the high-order 1 bit and the low-order 3 bits of its operation result to the additions $RA_{12}$ 1205 and $RA_2$ 1204, respectively. The addition $RA_1$ 1202 outputs the high-order 1 bit and the low-order 3 bits of its operation result to the additions $RA_2$ 1204 and $RA_1$ 1207. The addition $RA_2$ 1204 outputs the high-order 1 bit and the low-order 3 bits of its operation result to the additions $RA_{12}$ 1205 and $RA_1$ 1208, respectively. The addition $RA_{12}$ 1205 outputs its 1-bit operation result to the addition $RA_4$ 1211.

Figure 21:
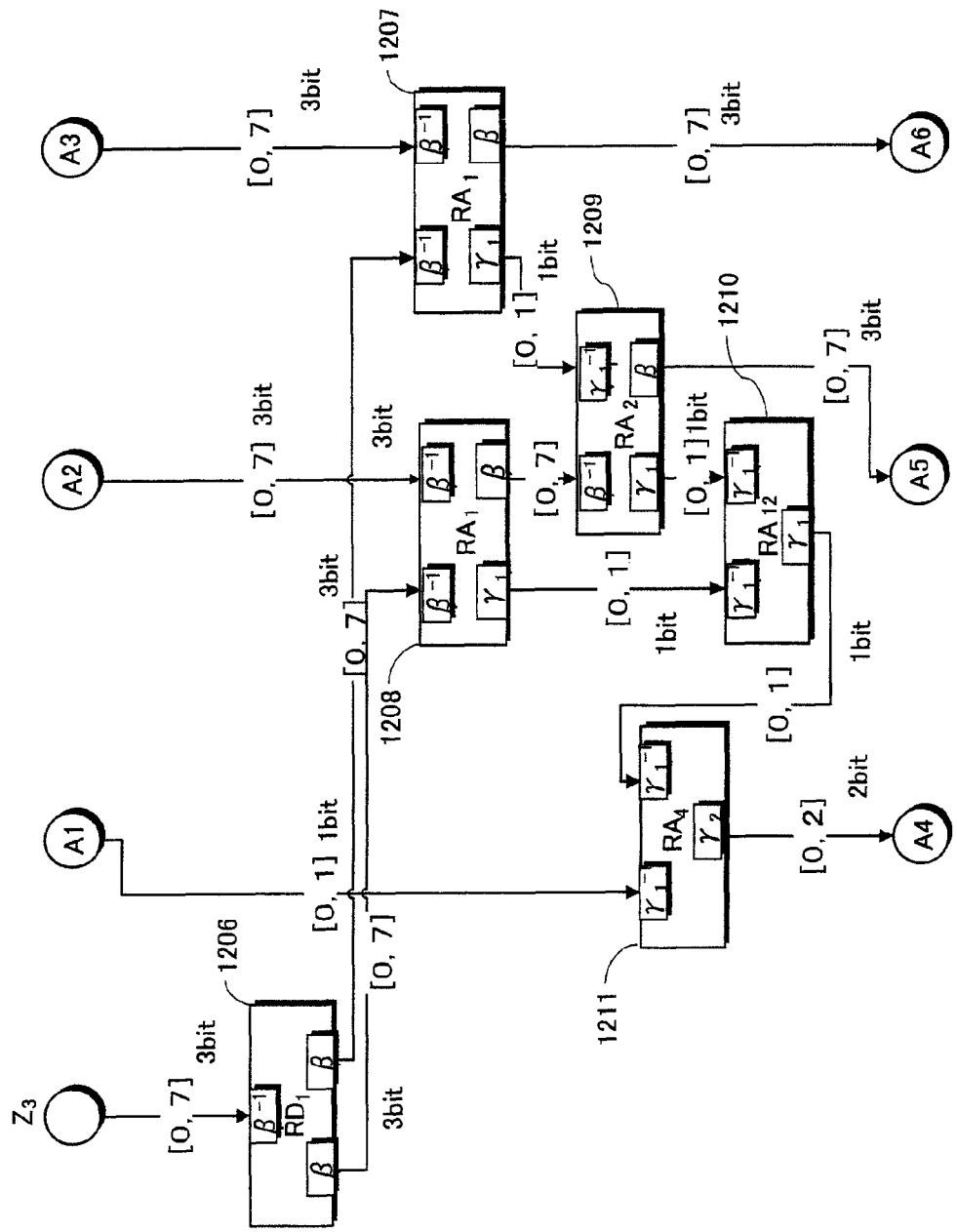
FIG. 21 shows the structure of the post-decomposition modular processing 1005 (continued to FIG. 22)

(b) In operations shown in FIG. 21, which are part of the modular processing 1005, one input value $Z_3$ is input, and ($Z_3 \times 2^9$ mod n) is added using the input value $Z_3$ and the three final operation results in FIG. 20.

The modular operation $RD_1$ 1206 receives input of one 3-bit input value $Z_3$, and outputs the high-order 3 bits and the low-order 3 bits to the additions $RA_1$ 1208 and $RA_1$ 1207, respectively.

The addition $RA_1$ 1208 outputs the high-order 1 bit and the low-order 3 bits of its operation result to the additions $RA_{12}$ 1210 and $RA_2$ 1209. The addition $RA_1$ 1207 outputs the high-order 1 bit and the low-order 3 bits of its operation result to the additions $RA_2$ 1209 and $RA_1$ 1213. The addition $RA_2$ 1209 outputs the high-order 1 bit and the low-order 3 bits of its operation result to the additions $RA_{12}$ 1210 and $RA_1$ 1214. The addition $RA_{12}$ 1210 outputs its 1-bit operation result to the addition $RA_4$ 1211. The addition $RA_4$ 1211 outputs its 1-bit operation result to the addition $RA_{13}$ 1216.

Figure 22:
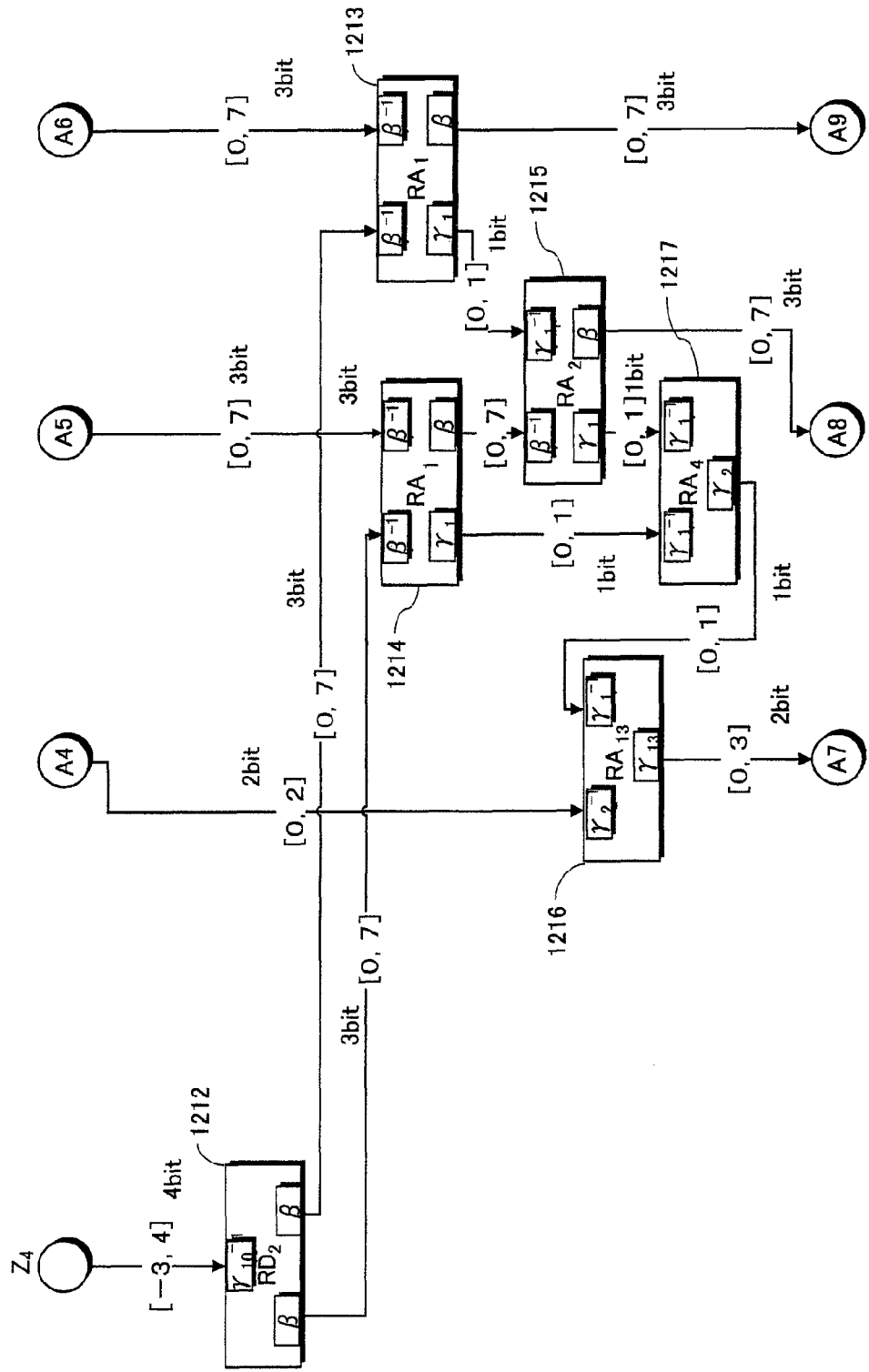
FIG. 22 shows the structure of the post-decomposition modular processing 1005 (continued to FIG. 23)

(c) Further, in operations shown in FIG. 22, which are part of the modular processing 1005, one input value $Z_4$ is input, and ($Z_4 \times 2^{12}$ mod n) is added using the input value $Z_4$ and the three final operation results in FIG. 21.

The modular operation $RD_2$ 1212 receives input of one 4-bit input value $Z_4$, and outputs the high-order 3 bits and the low-order 3 bits of its operation result to the additions $RA_1$ 1214 and $RA_1$ 1213, respectively.

The addition $RA_1$ 1214 outputs the high-order 1 bit and the low-order 3 bits of its operation result to the additions $RA_4$ 1217 and $RA_2$ 1215. The addition $RA_1$ 1213 outputs the high-order 1 bit and the low-order 3 bits of its operation result to the additions $RA_2$ 1215 and $RA_1$ 1219, respectively. The addition $RA_2$ 1215 outputs the high-order 1 bit and the low-order 3 bits of its operation result to the additions $RA_4$ 1217 and $RA_1$ 1220, respectively. The addition $RA_4$ 1217 outputs its 1-bit operation result to the addition $RA_{13}$ 1216. The addition $RA_{13}$ 1216 outputs its 2-bit operation result to the addition $RD_3$ 1218.

(d) The final operation result, shown in FIG. 22, of the modular processing 1005 is 3 digits. Thus, further modular processing is required.

Figure 23:
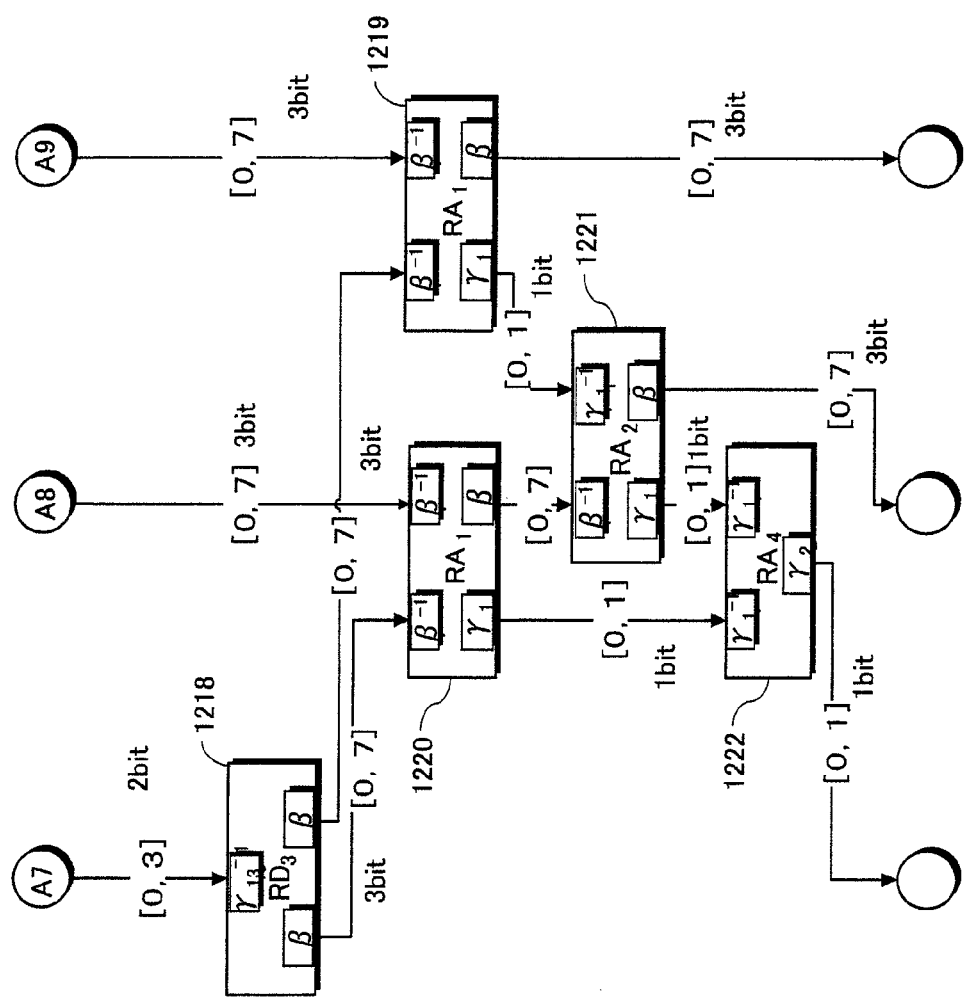
FIG. 23 shows the structure of the post-decomposition modular processing 1005 (continued from FIG. 22)

Operations shown in FIG. 23, which are part of the modular processing 1005 performs this further modular processing. The operation result shown in FIG. 23 may sometimes be three digits. In this case, further modular processing is required, and thus, processing similar to the processing in FIG. 23 is repeated. If the operation result thereof is a 2-digit value, this value is the resulting value of the modular operation (after conversion).

In the operations shown in FIG. 23, the modular operation $RD_3$ 1218 outputs the high-order 3 bits and the low-order 3 bits of its operation result to the additions $RA_1$ 1220 and $RA_1$ 1219, respectively. The addition $RA_1$ 1220 outputs the high-order 1 bit and the low-order 3 bits of its operation result to the additions $RA_4$ 1222 and $RA_2$ 1221, respectively. The addition $RA_1$ 1219 outputs the high-order 1 bit of its operation result to the addition $RA_2$ 1221, and outputs the low-order 3 bits of its operation result as part of the final output. The addition $RA_2$ 1221 outputs the high-order 1 bit of its operation result to the addition $RA_4$ 1222, and outputs the low-order 3 bits of its operation result as part of the final output. The addition $RA_4$ 1222 outputs its 1-bit operation result as part of the final output.

(e) It should be noted that in the above-described numerical example, because n is small being a 6-bit value, multiplication processing is decomposed into processes for individual digits. However, if the bit size is larger, processing of each digit can be further decomposed as described in "Process Decomposition (2)".

2.4 Structure and Operations of Obfuscation System 1

Here, description is given on structures and operations of the obfuscating apparatus 100 and the encryption processing apparatus 300 included in the obfuscation system 1.

(1) Structure of Obfuscating apparatus 100

Figure 33:
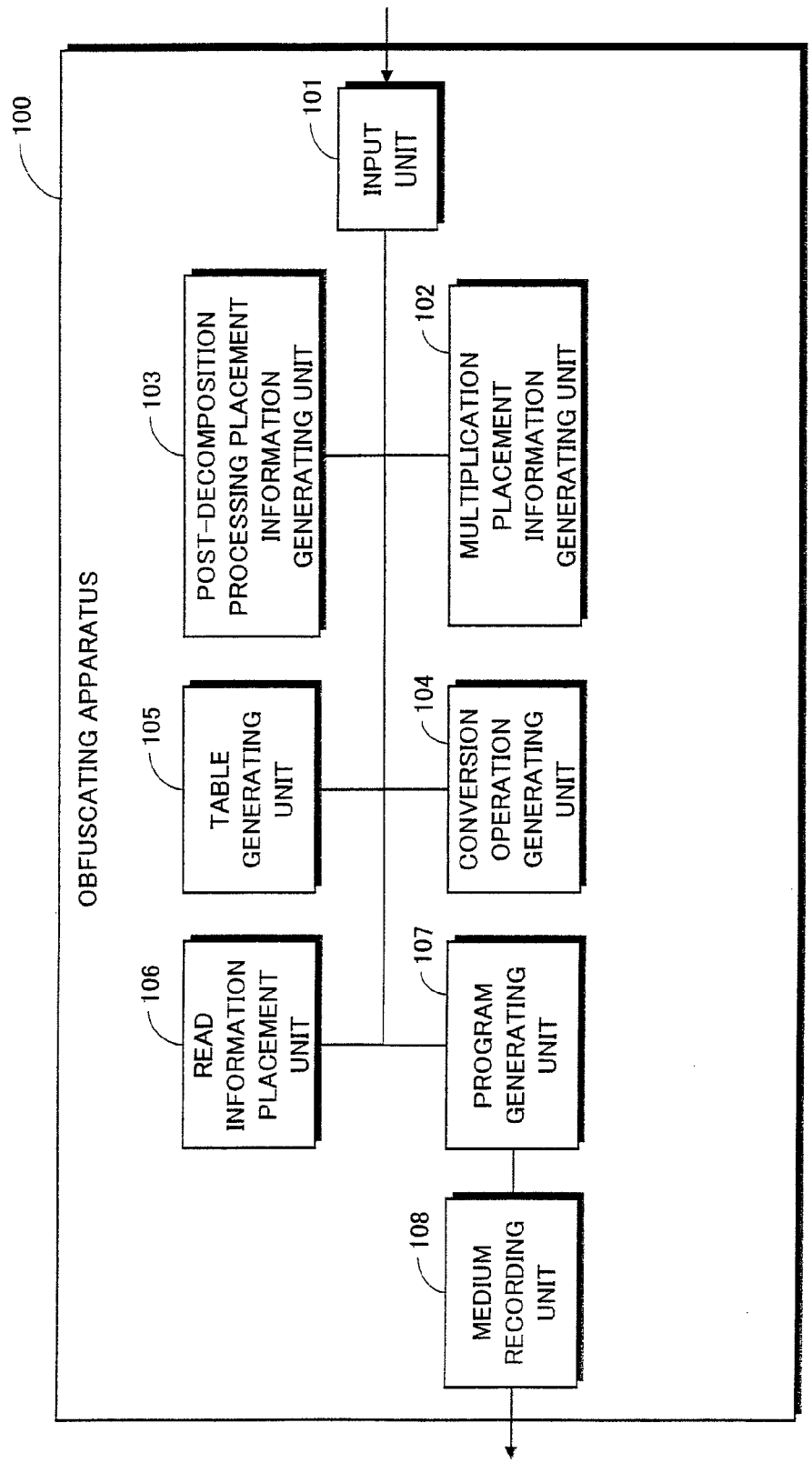
FIG. 33 shows a structure of an obfuscating apparatus 100.

FIG. 33 indicates the structure of the obfuscating apparatus 100.

As shown in FIG. 33, the obfuscating apparatus 100 includes an input unit 101, a multiplication placement information generating unit 102, a post-decomposition processing placement information generating unit 103, a conversion operation generating unit 104, a table generating unit 105, a read information placement unit 106, a program generating unit 107, and a medium recording unit 108. The input unit 101 receives input of the secret key d; the multiplication placement information generating unit 102 generates, from the secret key d, multiplication placement information that indicates the processing order of multiplication processing and squaring processing; the post-decomposition processing placement information generating unit 103 generates post-decomposition processing placement information that indicates placement of decomposed processing of the multiplication processing and the squaring processing, and one or more input value conversion operations and one or more output value conversion operations which are added to the decomposed processing; the conversion operation generating unit 104 generates functions indicating the input value conversion operations and output value conversion operations; the table generating unit 105 generates tables using the post-decomposition processing placement information, the input value conversion operations, and the output value conversion operations; the read information placement unit 106, with use of the multiplication placement information and the post-decomposition processing placement information, generates read instruction order information that indicates placement of instructions to read tables; the program generating unit 107 generates an obfuscated program, using the tables and the read instruction order information; and the medium recording unit 108 records the obfuscated program onto a medium.

The input unit 101 receives the secret key d as input.

The multiplication placement information generating unit 102 generates, from the secret key d, the multiplication placement information which indicates processing order of the modular multiplication processing and modular squaring processing. This corresponds to processing shown at the step S401 in FIG. 4. In the case shown in FIG. 4, the multiplication placement information 421 indicates the processing order as follows: {modular squaring, modular multiplication, modular squaring, modular squaring, modular multiplication, . . . }.

The post-decomposition processing placement information generating unit 103 generates the post-decomposition processing placement information in accordance with a given placement method. The post-decomposition processing placement information indicates placement information of the decomposed modular multiplication processing and the decomposed modular squaring processing, and the one or more input value conversion operations and the one or more output value conversion operations which are added to the decomposed processing. It should be noted here that only placement information of each processing and conversion operation is generated, and functions corresponding to the processing and conversion operations are not generated.

The conversion operation generating unit 104 refers to post-decomposition processing placement information and generates functions for the placed input value conversion operations and output value conversion operations. The generating method of the functions for the input value conversion operations and output value conversion operations is as described earlier in "2.3 Obfuscation Executed by Obfuscating Apparatus 100".

The table generating unit 105 generates the tables, using the post-decomposition processing placement information, input value conversion operations, and output value conversion operations. The generating method of the tables is as described earlier in "2.3 Obfuscation Executed by Obfuscating Apparatus 100".

The read information placement unit 106, with use of the multiplication placement information and post-decomposition processing placement information, generates the read instruction order information indicating an order of instructions to read tables. Specifically, the read information placement unit 106 generates a read table instruction group by sequentially placing read table instructions corresponding to the respective processing in the transformed multiplication modular processing and transformed modular squaring processing, and places the read table instruction group with use of the multiplication placement information so as to place the read table instructions.

The program generating unit 107 generates the obfuscated program composed of the read instruction order information and the tables.

The medium recording unit 108 records the obfuscated program onto the medium 200.

(2) Structure of Encryption Processing Apparatus 300

Figure 34:
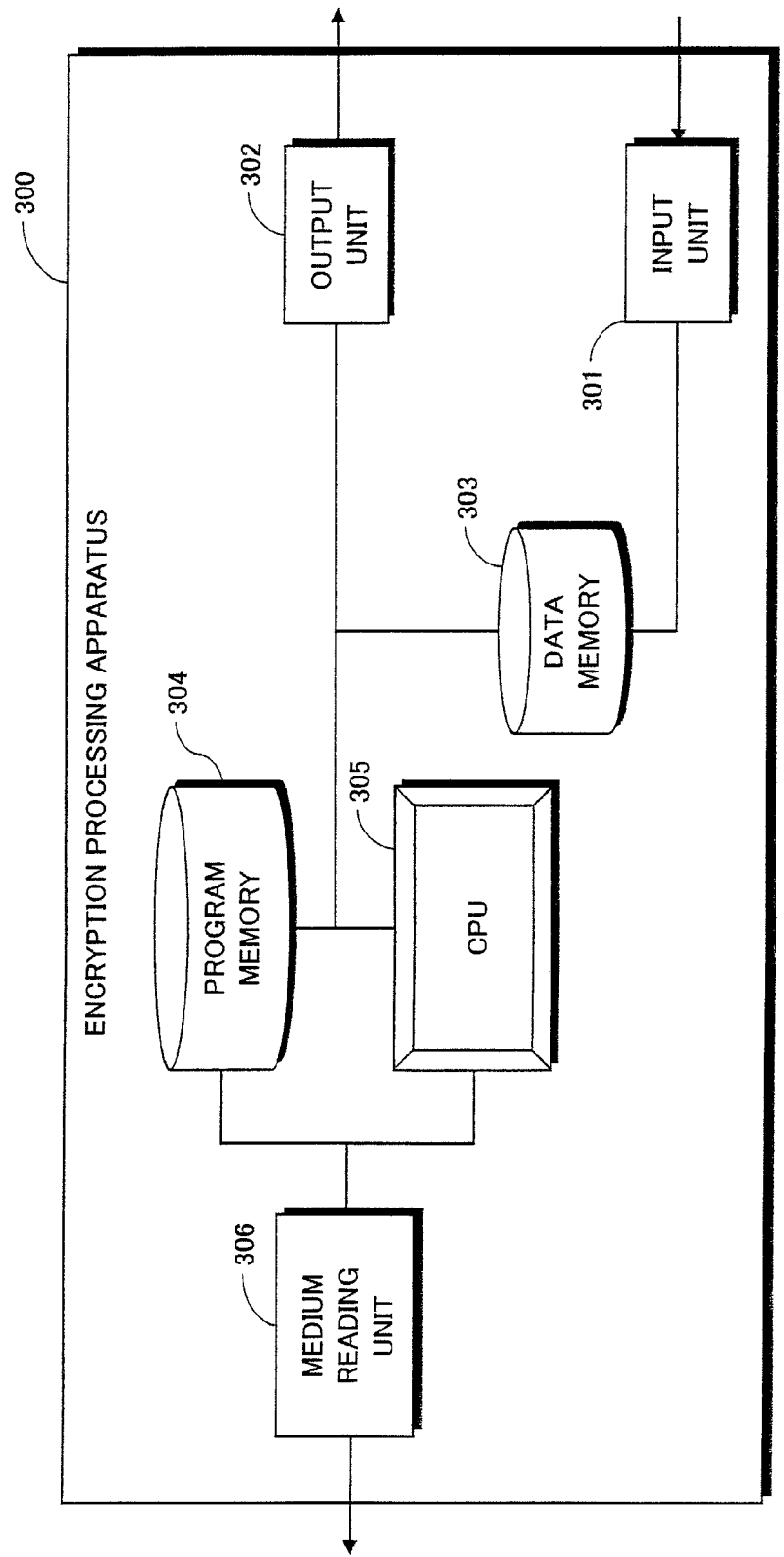
FIG. 34 shows a structure of an encryption processing apparatus 300.

FIG. 34 shows the structure of the encryption processing apparatus 300.

As shown in FIG. 34, the encryption processing apparatus 300 includes an input unit 301, an output unit 302, a data memory 303, a program memory 304, a CPU 305, and a medium reading unit 306. The input unit 301 receives encrypted data or message data; the output unit 302 outputs decrypted data or signature data; and the medium reading unit 306 reads the obfuscated program from the medium 200.

The input unit 301 receives encrypted data during decryption processing and receives message data during signature generation processing. The decryption processing and the signature generation processing are described later.

The output unit 302 outputs decrypted data during decryption processing and outputs signature data during signature generation processing.

The data memory 303 stores the decrypted data and message data, which are input data, and the intermediate value data obtained during execution of the obfuscated program.

The program memory 304 stores the obfuscated program.

The CPU 305 executes instructions described in the obfuscated program.

The medium reading unit 306 reads the obfuscated program from the medium 200 and stores it in the program memory 304.

(3) Operations of Obfuscation System 1

The operations of the obfuscation system 1 are composed of "obfuscation processing", "decryption processing", and "signature generation processing". In the "obfuscation processing" the obfuscating apparatus 100 generates an obfuscated program and stores it in the medium 200; and the encryption processing apparatus 300 performs decryption in the "decryption processing" and signature generation in the "signature generation processing" through execution of the obfuscated program stored in the recording medium 200.

In the following, explanation is given on operations of each processing.

(a) Operations of Obfuscation Processing by Obfuscating Apparatus 100

Figure 35:
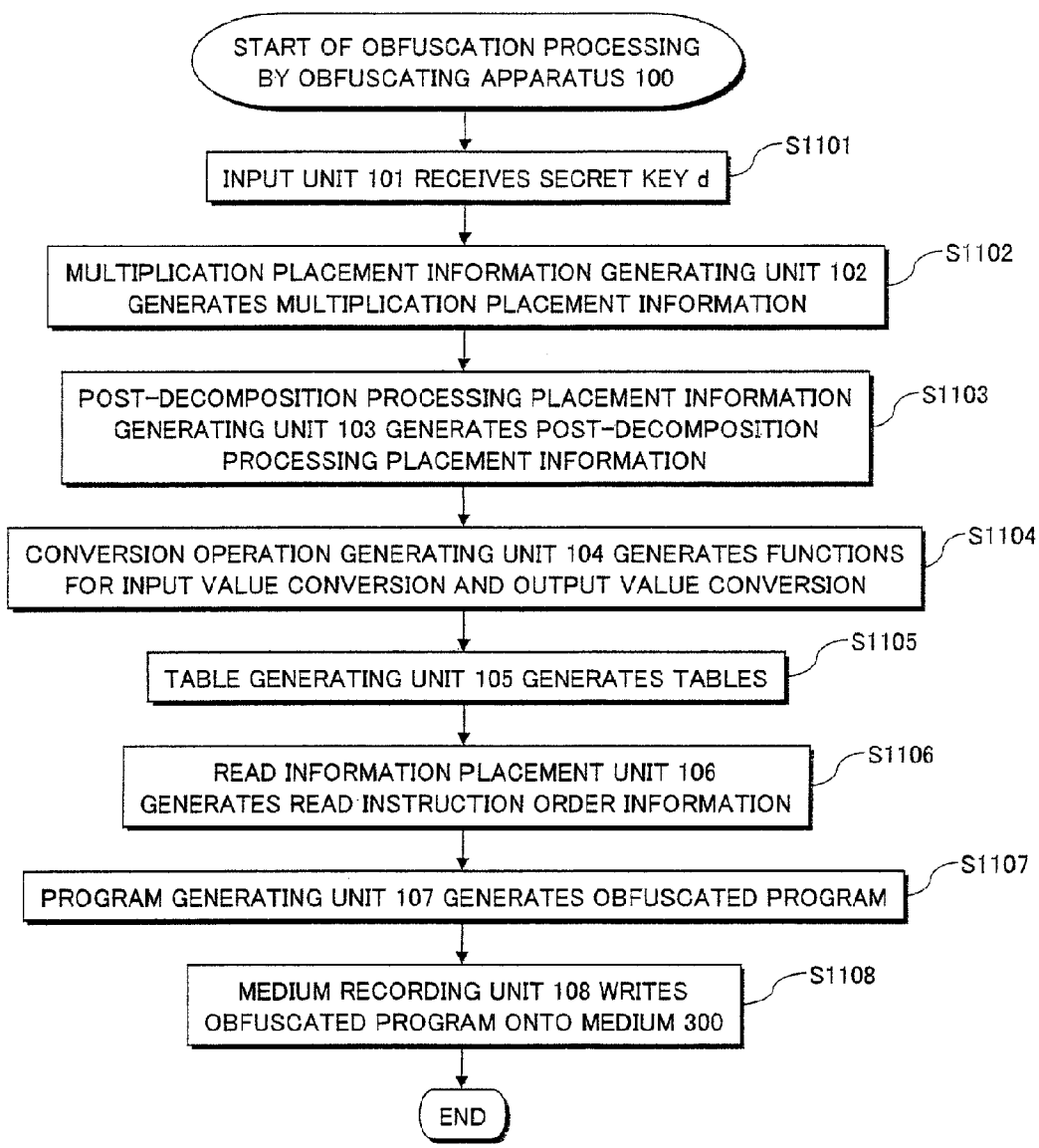
FIG. 35 is a flowchart showing operations during obfuscation processing by the obfuscating apparatus 100.

Operations of the obfuscation processing by the obfuscating apparatus 100 is described, with reference to the flowchart in FIG. 35.

The input unit 101 of the obfuscating apparatus 100 receives the secret key d (S1101); the multiplication placement information generating unit 102 generates the multiplication placement information (S1102); the post-decomposition processing placement information generating unit 103 generates the post-decomposition processing placement information (S1103); the conversion operation generating unit 104 generates the functions for the input value conversion operations and output value conversion operations (S1104); the table generating unit 105 generates the tables (S1105); the read information placement unit 106 generates the read Instruction order information (S1106); the program generating unit 107 generates the obfuscated program (S1107); and the medium recording unit 108 records the obfuscated program onto the medium 200 (S1108) This is how the operations of the obfuscation processing are completed.

(b) Operations of Encryption Processing by Encryption Processing Apparatus 300

Figure 36:
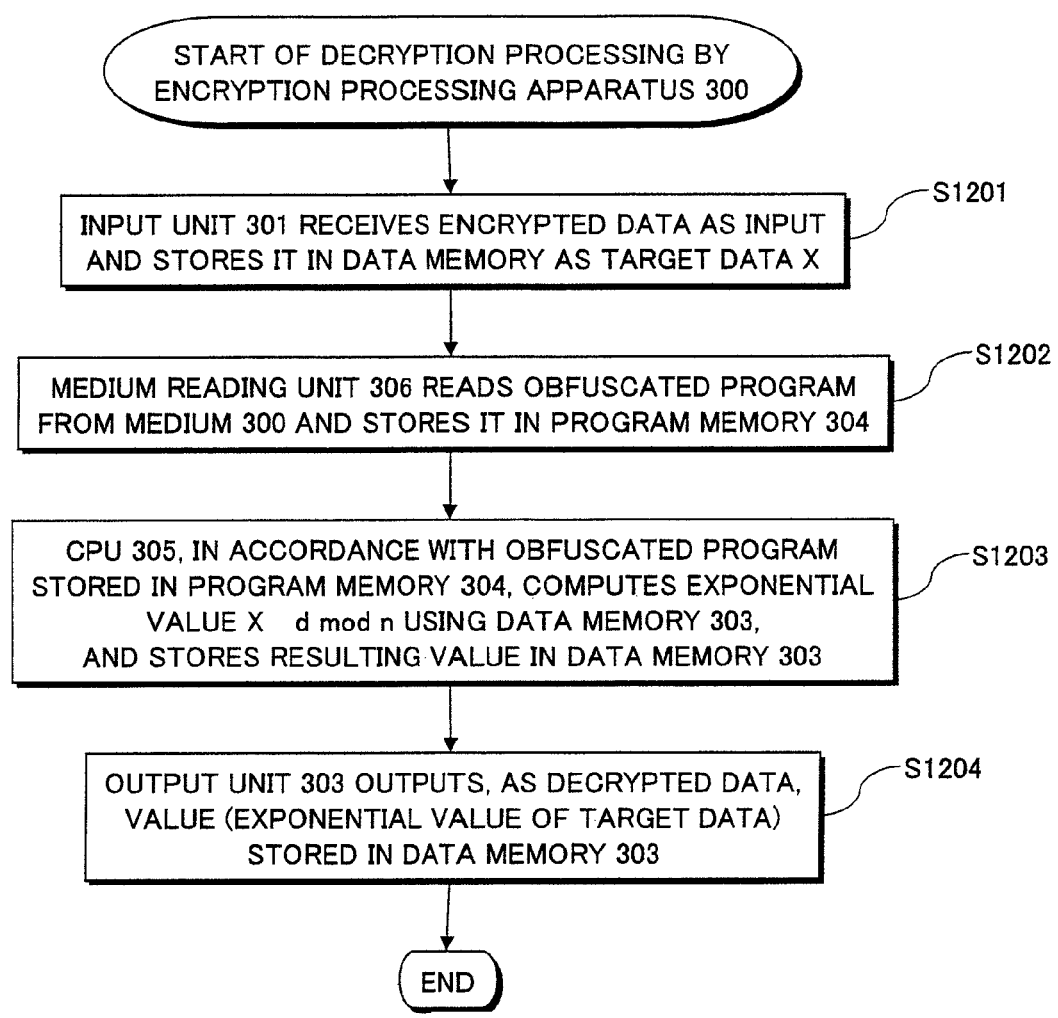
FIG. 36 is a flowchart showing operations during decryption processing by the encryption processing apparatus 300.

Operations of the encryption processing by the encryption processing apparatus 300 are described with reference to the flowchart in FIG. 36.

The input unit 301 of the encryption processing apparatus 300 receives the encrypted data as input and stores the encrypted data in the data memory as the target data X (S1201); the medium reading unit 306 reads the obfuscated program from the medium 200 and stores the obfuscated program in the program memory 304 (S1202); the CPU 305, in accordance with the obfuscated program stored in the program memory 304, uses the data memory 303, computes the exponential value $X^{\wedge}d \bmod n$ and stores the resulting value in the data memory 303 (S1203); the output unit 302 outputs the value (the exponential value of the target data) stored in the data memory 303 as the decrypted data (S1204). This is how the operations of the decryption processing are completed.

(c) Operations of Signature Generation Processing by Encryption Processing Apparatus 300

Figure 37:
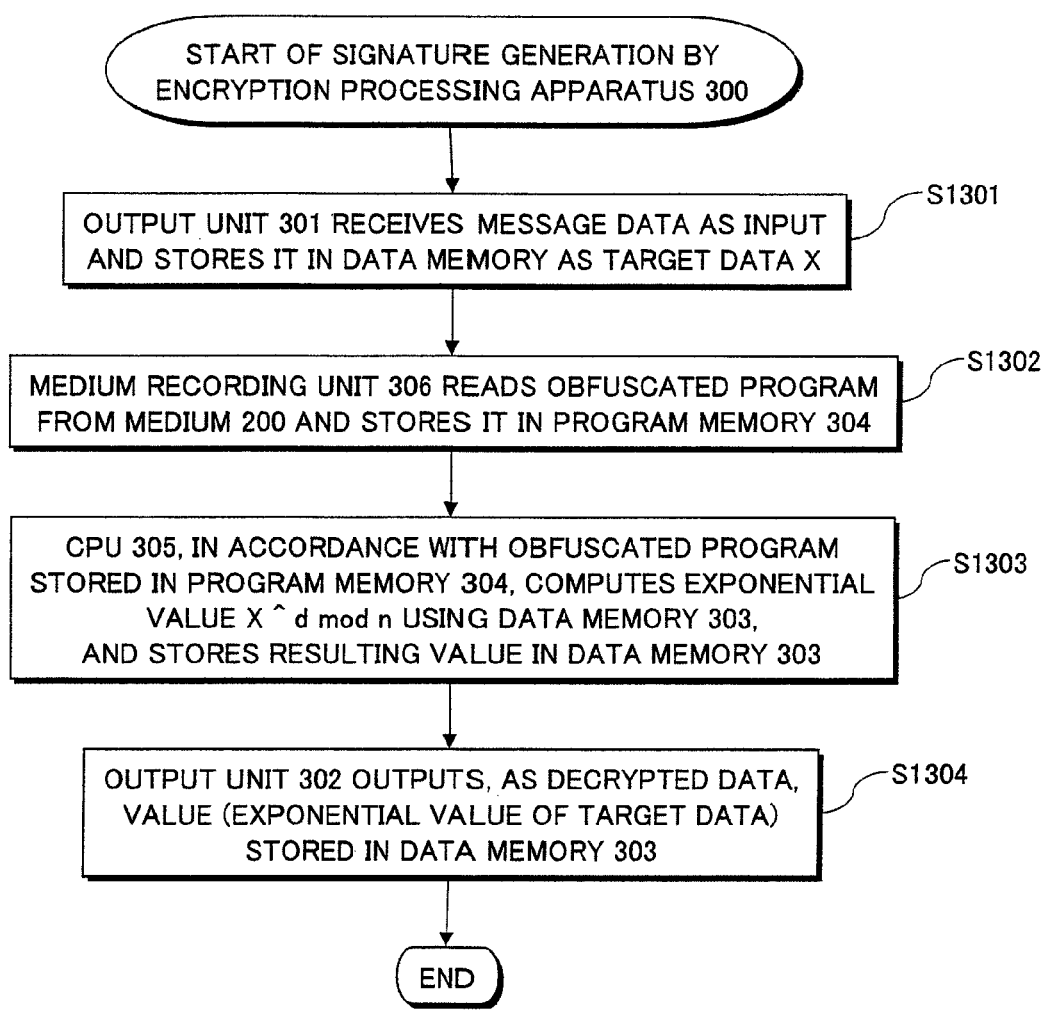
FIG. 37 is a flowchart showing operations during signature generation processing by the encryption processing apparatus 300.

Operations of the signature generation processing by the encryption processing apparatus 300 is described, referring to the flowchart in FIG. 37.

The input unit 301 of the encryption processing apparatus 300 receives the encrypted data as input and stores the encrypted data in the data memory as the target data X (S1301); the medium reading unit 306 reads the obfuscated program from the medium 200 and stores the obfuscated program in the program memory 304 (S1302); the CPU 305, in accordance with the obfuscated program stored in the program memory 304, uses the data memory 303, computes the exponential value $X^{\wedge}d \bmod n$, and stores the exponential value in the data memory 303 (S1303); the output unit 302 outputs the value (the exponential value of the target data) stored in the data memory 303 as the signature data (S1304). This is how the operations of the signature generation processing are completed.

(d) Operations of Tabulation by Obfuscating Apparatus 100

Figure 38:
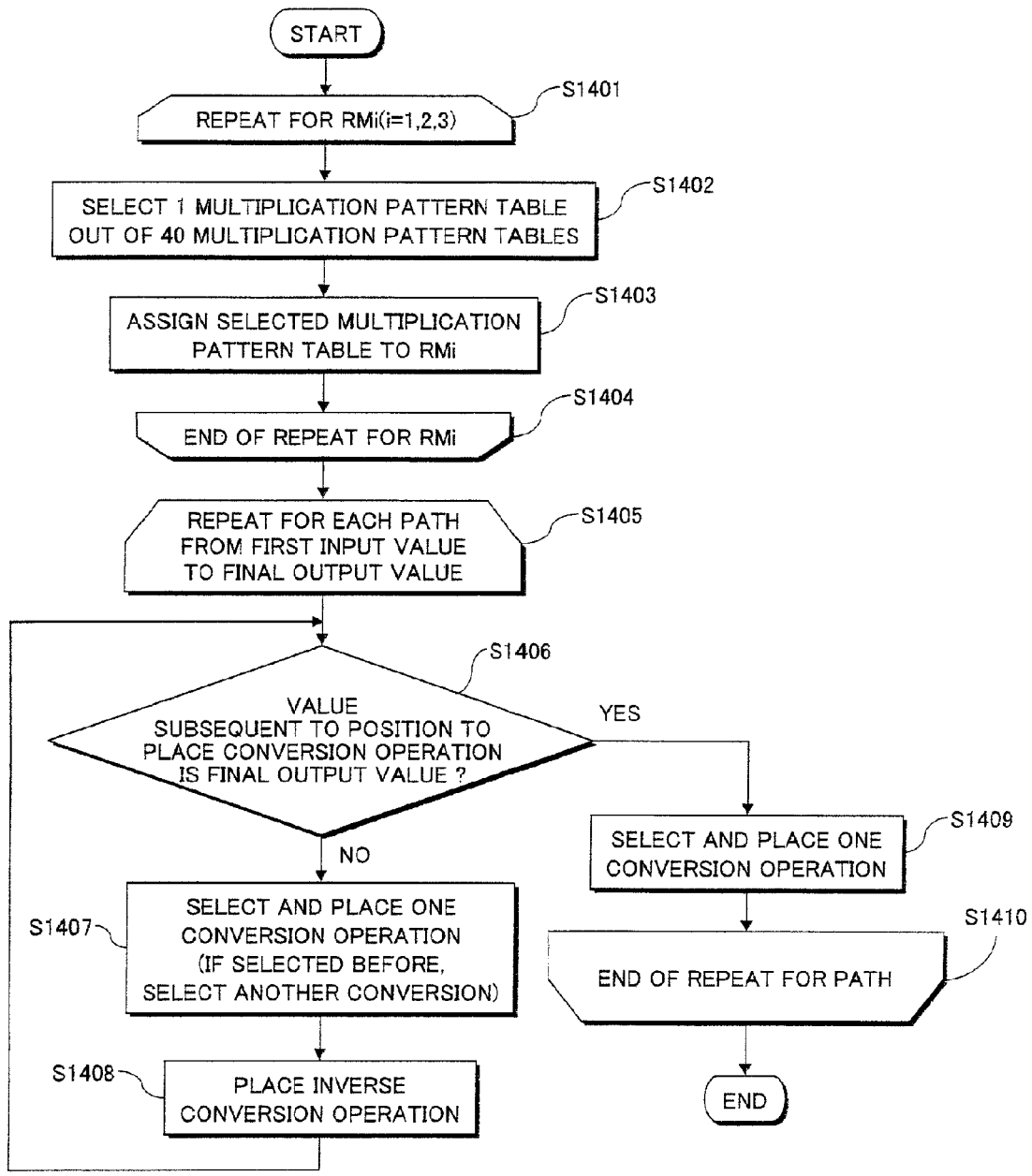
FIG. 38 is a flowchart showing operations during tabulation by the obfuscating apparatus 100.
Figure 39:
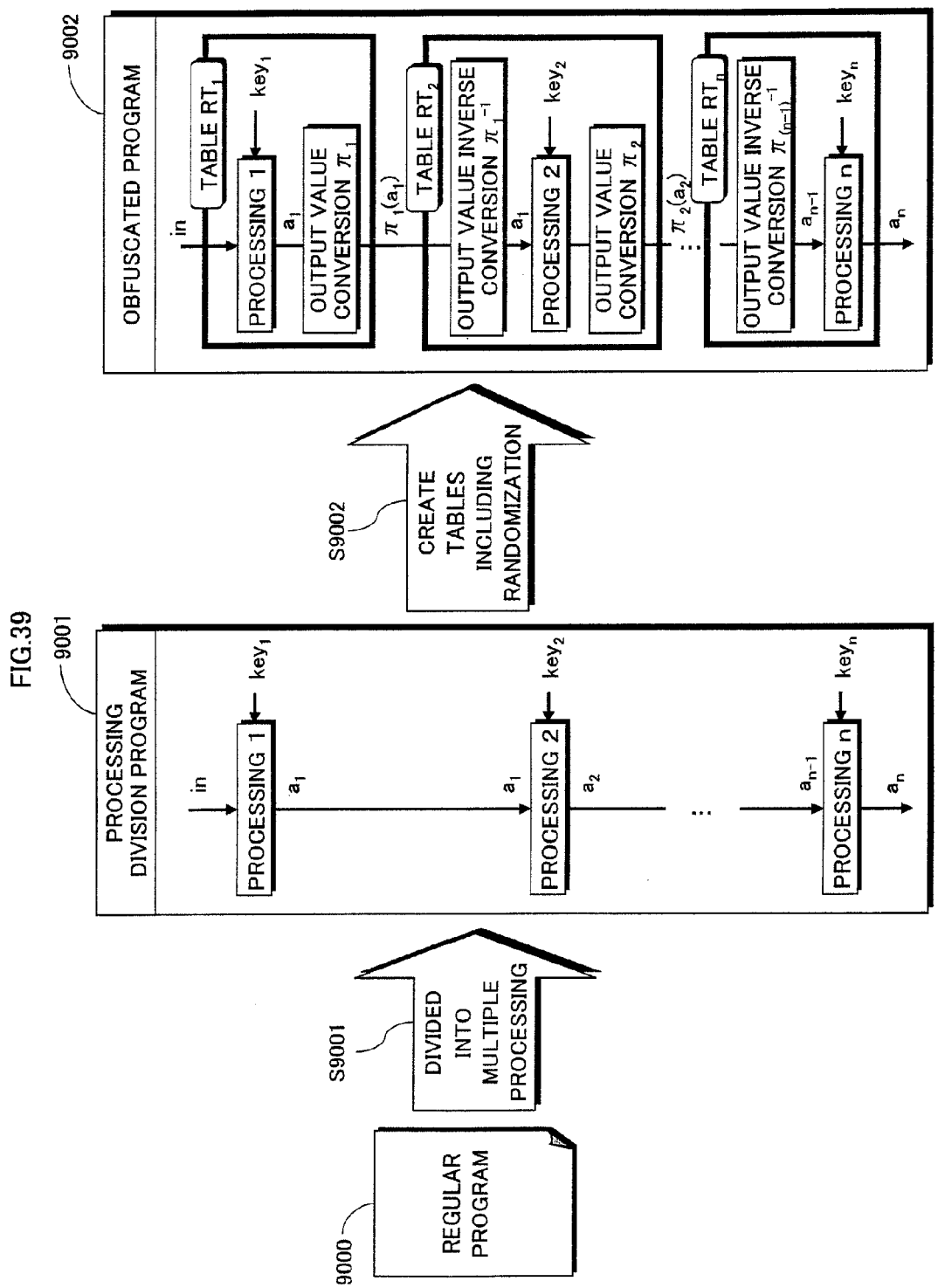
FIG. 39 shows a processing procedure of a conventional obfuscation method.
Figure 40:
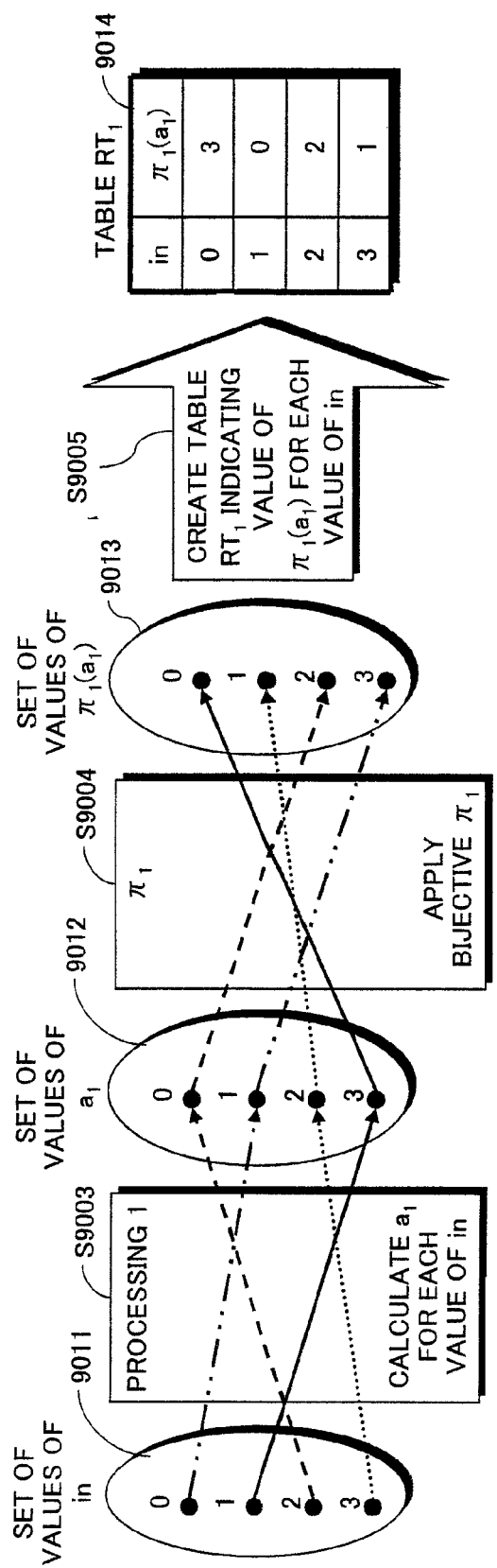
FIG. 40 shows an example of tabulation according to the conventional obfuscation method.

Operations of the tabulation by the obfuscating apparatus 100 are described, referring to the flowchart in FIG. 38. It should be noted here that while tabulation of the multiplication processing 1002 shown in FIG. 15 is described as an example, tabulation of other processing is similarly realized. Accordingly, its description is omitted.

The table generating unit 105 of the obfuscating apparatus 100 stores, among the tables shown in FIG. 15, only connection relations of the following tables in advance: $RM_0$ 1121, $RM_1$ 1122, $RM_2$ 1123, $RM_1$ 1124, $RM_2$ 1125, $RM_3$ 1126, $RA_1$ 1127, $RA_2$ 1128, $RA_2$ 1129, $RA_4$ 1130, and $RA_5$ 1131. Here, as described above, these connection relations are designed by a designer and digitalized.

The table generating unit 105 stores only these connections relations in the beginning, thus not storing contents of $RM_0$ 1121, $RM_1$ 1122, $RM_2$ 1123, $RA_1$ 1124, $RA_2$ 1125, $RA_3$ 1126, $RA_1$ 1127, $RA_2$ 1128, $RA_2$ 1129, $RA_4$ 1130, and $RA_5$ 1131.

According to the tabulation procedure, the obfuscating apparatus 100 determines the contents of $RM_0$ 1121, $RM_1$ 1122, $RM_2$ 1123, $RA_1$ 1124, $RA_2$ 1125, $RA_3$ 1126, $RA_1$ 1127, $RA_2$ 1128, $RA_2$ 1129, $RA_4$ 1130, and $RA_5$ 1131 according to the connection relations.

Also, the table generating unit 105 stores 40 kinds of multiplication pattern tables, in advance. Here, these multiplication pattern tables are 2-input/2-output tables which convert two input values to two output values. Each input value is 3 bits in length, and each output value is also 3 bits in length.

In steps S1401 to S1404 in FIG. 38, the table generating unit 105 arbitrarily selects, for each of $RM_0$ 1121, RM, 1122, and $RM_2$ 1123 shown in FIG. 15, one of the 40 kinds of multiplication pattern tables (S1402) and assigns the selected multiplication pattern table to $RM_0$ 1121, $RM_1$ 1122, and $RM_2$ 1123 (S1403). Here, when the table generating unit 105 arbitrarily selects one of the 40 kinds of multiplication pattern tables, in order to avoid selecting the same multiplication pattern table for different RM, the multiplication pattern table which has been selected is excluded from selection targets.

Next, in steps S1405 to S1410 in FIG. 38, the table generating unit 105 repeats the following for each path from the first input value of the multiplication processing 1002 to the final output value.

Here, one example of a path from the first input value to the final output value of the multiplication processing 1002 is a path from an input value 1141a, via the multiplication 1121a and conversion operation 1121b of $RM_0$ 1121, to the output value 1142a. Another example is a path from an input value 1141b, via the multiplication 1121a and conversion operation 1121c of $RM_0$1121, and the conversion operation 1124a, addition 1124c, and conversion operation 1124d of $RM_1$ 1124, to the output value 1142b.

As described above, these paths start from a 3-bit input value to a 3-bit output value via one RM and one or more RA.

On each path, positions for placing conversion operations are specified in advance. The table generating unit 105 stores the positions for placing conversion operations on each path, in advance. The positions for storing conversion operations are, for example, in FIG. 15, positions where the conversion operation 1121b and conversion operation 1121c are placed in $RM_0$ 1121, and positions where the conversion operation 1124a, conversion operation 1124b, conversion operation 1124d, and conversion operation 1124e are placed in $RA_1$ 1124.

The table generating unit 105 sequentially selects, from the beginning of each path, positions where conversion operations are placed, one by one.

If the position immediately following the selected position is the final output value (step S1406: YES), the table generating unit 105 selects one conversion operation and places the selected conversion operation at the position (S1409). This completes the processing on this path.

If the position immediately following the selected position is not the final output value (step S1406: NO), the table generating unit 105 selects one conversion operation and places the selected conversion operation at the position. Here, if the conversion operation has been selected before on the same path, a conversion operation other than the selected conversion operation is selected (step S1407). Next, at the next position, the inverse conversion of the conversion operation placed in the step S1407 is placed (step S1408), and goes back to the step S1406 to repeat the processing.

2.5 Effect of Second Embodiment

In the second embodiment, tables are generated for post-decomposition processing of multiplication and squaring. These tables have the same number of arguments as their inputs, and further, their outputs are set such that the output values of the tables are dependent on these arguments. In this way, an attack by an attacker, which takes advantage of the difference in the number of inputs between multiplication processing and squaring processing can be prevented. This is described in detail below.

Multiplication is a 2-input/1-output operation. On the other hand, squaring is a 1-input/1-output operation. Accordingly, an attacker may intend an attack using this difference. However, in the second embodiment, as described above, the input which, in the regular RSA cryptosystem operation, is included in the inputs for multiplication processing but not included in the input for squaring processing, is included in input value conversion operations and output value conversion operations. These input value conversion operations and output value conversion operations are placed before and after the multiplication processing and squaring processing, and the tables are generated including these conversion operations.

In this way, the tables corresponding to the multiplication processing and the tables corresponding to the squaring processing have the same number of inputs, thereby being able to prevent the attacker from analyzing the input and differentiating the multiplication and squaring processing to perform an attack.

Further, by using the input value conversion operations and output value conversion operations, the input values which are originally not included in the squaring processing are taken into account in the output of each table. Consequently, this can prevent an attacker from analyzing the output, identifying dummy input, and differentiating the multiplication and squaring processing to launch an attack.

In the second embodiment, as described earlier, each input value and output value in multiplication and squaring is an extremely large number (approximately 1024 bits). Thus, the multiplication processing and squaring processing are decomposed into processing performed for the individual digits.

In this case, too, for the multiplication and squaring, processing for a digit is decomposed into 4-input/1-output tables and 2-input/1-output tables so as to be able to easily place the above-mentioned input value conversion operations and output value conversion operations.

This way, for each of the post-decomposition multiplication processing and squaring processing which have been decomposed into the processes for the individual digits, tables which have the same number of arguments regardless of whether the processing is multiplication or squaring and whose input affects the output can be generated. As a result, it is not possible to identify whether the table is a multiplication table or a squaring table based on the way the table is decomposed. In other words, it becomes possible to prevent attacks based on analysis of the table and differentiation of the multiplication processing and the squaring processing. Consequently, the attacker will find it more difficult to identify the multiplication processing and the squaring processing, and thus, the present invention is effective.

Also, since the multiplication processing or squaring processing is decomposed into processing tables for the individual digits, the table size of $2^{2048}\times$(output byte size of the table) bytes required for each multiplication processing or squaring processing can be reduced to $(256\times256)/2\times2^{16}\times$(output byte size of the table)$=2^{31}\times$(output byte size of the table) by decomposing the process for each digit into a 4-input/1-output table and a 2-input/1-output table.

Furthermore, by using one table to represent a plurality of tables which indicate the same conversion operation, the post-decomposition tables can be reduced to two pieces of 4-input/1-output tables and two pieces of 2-output/1-input tables. As a result, the table size required for one multiplication processing or squaring processing is reduced to $2\times2^{16}\times$(output byte size of the table)$+2\times2^{8}\times$(output byte size of the table)$=131,584\times$(output byte size of the table). This is how decomposing and sharing tables allow the table size to be reduced.

As is clear from the above, being able to prevent an attacker from, in order to launch an attack, exploiting the difference in the number of inputs between the multiplication processing and squaring processing, and also being able to reduce the table size for use, the present invention is able to generate a computer-implementable source-code obfuscated program for the RSA cryptosystem.

2.6 Examination of Security

In the following, security against a brute force attack using bijective mapping is examined with respect to the second embodiment. Here, the brute force attack using bijective mapping is an attack in which all the possible variations of bijective mappings are tried to search out the correct bijective mapping. Specifically, a table is generated for each bijective mapping, and whether this bijective mapping is correct or not is judged by being compared with a table included in the actual program. When the bijective mapping is correct, all the values in the tables match.

(1) When Multiplication Table or Squaring Table is Attacked

In a case where a multiplication table or a squaring table is attacked, because each table includes a bijective mapping of above-described g and φ, the attack to the table will not succeed unless the correct mapping is used for each of these two tables.

As described in the second embodiment, when each digit is decomposed into 4 bits, variations of the bijective mapping for each of g and φ is $16!=2^{44}$. Accordingly, the calculation amount required to execute the brute force attack is $16!=2^{44}$. Since the attacker is required to search out bijective mappings of both g and φ, the calculation amount required for the attack is $(2^{44})\ 2=2^{88}$.

(2) When Addition Table is Attacked

In a case where an addition table is attacked, the calculation amount required for the attack is $(2^{44})\ 2=2^{88}$, as an addition table includes at least two kinds of φ.

Next, with respect to the second embodiment, an analysis is conducted on security against a brute force attack in the case where each pre-decomposition table corresponding to each digit is either a multiplication table or a squaring table. There are 80 kinds of multiplication tables and squaring tables, and each table may be either a multiplication table or a squaring table. Accordingly, the calculation amount of the brute force attack is $2^{80}$.

In order to improve the security against attacks, it is effective to decompose each digit into 4 bits and generate tables which depend on two kinds of functions.

3. Modifications

Although the present invention has been described by way of the embodiments above, it is to be noted that the present invention is not limited to the embodiments, and naturally, various modifications should be construed as being included therein unless such modifications depart from the scope of the present invention. For examples, the following cases are included in the present invention as well.

(1) In the second embodiment, the processing targeted for tabulation are modular multiplication processing and modular squaring processing according to the RSA cryptosystem, and the same inputs are used for these processing. However, it is not limited to this.

Processing with different numbers of inputs can be tabulated instead. For example, processing of an elliptic curve addition (coordinates of two points are input) and an elliptic doubling (coordinate of one point is input) of elliptic curve encryption can be targeted for the tabulation. It should be noted that in the case of the elliptic curve cryptosystem also, differentiation between the elliptic addition and the elliptic doubling provides a clue to a malicious analysis. Thus, it is effective to make them indistinguishable, as with the present invention, thereby preventing attacks.

It should be noted that the present invention is obviously applicable to and effective for not only processing related to encryption, but also any programs which include processing receiving different numbers of inputs, and identification of these processing yields a clue to a malicious analysis.

Also, in the second embodiment, conversion operations are performed to equalize the numbers of inputs for the squaring processing, whose input value is only the target data X, and for the multiplication processing, whose input values are the target data X and the intermediate value Y. But the present invention is not limited to this. By applying the method of the present invention, it is possible to perform obfuscation in a case where one set of inputs does not completely include the other set, that is to say, for example, where the first processing includes inputs X and Y, and the second processing includes inputs Y and Z. In this case, the first processing can be tabulated after adding processing (corresponding to the input dependent addition or subtraction in the second embodiment) which depends on the input Z, and the second processing can be tabulated after adding processing which depends on the input X.

(2) In the second embodiment, decryption processing of the RSA cryptosystem and signature generation processing of the RSA signature scheme are performed using the obfuscated program. However, it can be any processing which includes exponential operation processing with the secret key being the exponent. For example, it can be RSA-PSS signature scheme, decryption processing of RSA-OAEP encryption scheme, or decryption processing of RSA-KEM scheme. In addition, it can be decryption processing of ElGamal encryption scheme.

(3) While the encryption processing apparatus stores, into the program memory, the obfuscated program that has been read from the medium, this process can be decomposed into several steps so that each time a portion of the obfuscated program is stored into the program memory while being read, the portion can be executed by the CPU.

(4) In the signature generation processing, the exponential value of the target data is calculated with the message, which is the input, as the target data. However, the exponential value of the target data X can be calculated using X=Hash(m), where m is the message.

Here, Hash represents a hash function, and Hash(m) represents a hash value of the message m. The hash function used is, for example, SHA-1, SHA-224, SHA-256, SHA-384, SHA-512, MD5, WHIRLPOOL, RIPEMD128, or REPEMD160.

(5) While in the second embodiment, the obfuscated program is recorded in a medium and distributed, it can be transmitted through a communication path.

(6) While, in the second embodiment, the input value conversion operation includes the input dependent subtraction, and the output value conversion operation includes the input dependent addition, it is not limited to this. For example, the placement of the input dependent subtraction and the input dependent addition can be reversed. Also, it is not limited to the subtraction and addition, and a set of a multiplication and a division can be applied. That is to say, any combination of conversion operations is applicable as long as the conversion operations depend on the target data X. However, if the tables are decomposed in the above-described way to suppress the table size, the combination of an addition and a subtraction is preferable.

Additionally, immediately before and after each modular multiplication operation and each modular squaring operation, a subtraction and an addition which depend on one input value of the operation can be placed.

Furthermore, when each modular multiplication operation and each modular squaring operation is decomposed to a multiplication operation and a modular operation, and a squaring operation and a modular operation, respectively, a subtraction and an addition which depend on the input value of the operation can be placed immediately before and after the operation, respectively, instead.

(7) In the second embodiment, both multiplication processing and squaring processing are tabulated after the input dependent addition and input dependent subtraction are added thereto. However, it is not limited to this. That is to say, in the present invention, as long as the squaring processing includes a conversion operation (input dependent addition) which depends on the target data X, it is difficult to distinguish a multiplication table from a squaring table even if relationship between the input value and the output value of each table is analyzed. Thus, such a structure can be applied.

(8) According to the prior art, when the RSA encryption is decrypted using a binary method, application of a conventional method which converts processing into a randomized table causes difference in the numbers of inputs between multiplication and squaring, allowing the attacker to launch an attack as a result. More specifically, from the number of inputs to each table, whether the table performs multiplication or squaring can be distinguished.

In the present invention, for multiplication processing and squaring processing, tables having the same number of arguments as input are generated, and furthermore, output values of the tables are set in a manner that the output depends on these arguments. More specifically, by tabulating squaring processing after performing additional processing in which the argument that is required only in the multiplication is added thereto, the number of the arguments become equal to that of the multiplication processing. Moreover, in this case, unlike adding a dummy argument which is not actually processed, the output depends on all the arguments. Accordingly, whether there is any added argument or not is unknown.

(9) The present invention provides a source code obfuscating system, a source code obfuscating apparatus, and a source code obfuscating method which prevent attacks taking advantage of the difference in the numbers of inputs between multiplication and squaring.

As described earlier, the present invention is an obfuscating apparatus which receives first processing as input and outputs a first table, the first processing calculating, based on first processing input information which is composed of one or more numbers, first processing output information which is composed of one or more numbers. The obfuscating apparatus includes: a first conversion unit for converting first conversion input information, which is composed of one or more numbers, to first conversion output information, which is composed of one or more numbers; and a first table generating unit for generating the first table indicating correspondence between first table input information which is composed of one or more numbers and first table output information which is composed of one or more numbers. Here, the first table input information includes (i) a number included in the first processing input information or in the first conversion input information and (ii) a number included in additional input information which is composed of one or more numbers, and the first table output information includes the first processing output information or the first conversion output information.

Here, the obfuscating apparatus may further include a second conversion unit operable to convert second conversion input information, which is composed of one or more numbers, to second conversion output information, which is composed of one or more numbers. Here, the first table input information is composed of a number included in the first conversion input information and a number included in the additional input information, the first processing input information includes at least one number included in the conversion output information, the second conversion input information includes at least one number included in the first processing output information, and the first table output information includes the second conversion output information.

Here, the conversion operation performed by the first conversion unit may be a conversion operation based on the first table input information.

Here, the obfuscating apparatus may further receive second processing as input, in addition to the first processing, the second processing calculating, based on second process input information which is composed of one or more numbers, second processing output information which is composed of one or more numbers, and further include an additional input information determination unit for determining, as the additional input information, numbers which are included in the second processing input information and are not included in the first processing input information.

Here, the second processing may calculate, using the second processing input information composed of a first number and a second number, the second processing output information composed of a product of the first number and the second number; and the first processing may calculate, using the first processing input information composed of the first number, the first processing output information composed of a square of the first number.

Here, the obfuscating apparatus may further receive third processing as input in addition to the first processing and the second processing, and outputs the first table and a second table, the third processing calculating, based on third processing input information which includes (a) one or more numbers or (b) at least one number included in second intermediate value information, third processing output information which is composed of one or more numbers. The obfuscating apparatus includes: a third conversion unit for converting third conversion input information, which is composed of one or more numbers, to third conversion output information, which is composed of one or more numbers; a second table generating unit for generating the second table which indicates correspondence between second table input information, which is composed of one or more numbers, and second table output information, which is composed of one or more numbers; and a third conversion unit for converting third conversion input information, which is composed of one or more numbers, to third conversion output information, which is composed of one or more numbers. The second table input information includes at least one of the numbers included the first table output information, the third conversion input information includes at least one number included in the first table output information, and the second table output information includes the third processing output information.

Here, the obfuscating apparatus may further receive fourth processing as input, in addition to the first processing, the second processing, and the third processing, the fourth processing calculating, based on fourth processing input information which is composed of one or more numbers, fourth processing output information which is composed of one or more numbers, and the second table input information includes at least one of the numbers included in the first table output information and the second additional input information. Here, the obfuscating apparatus includes a second additional input information determination unit for determining, as the second additional input information, numbers which are included in the fourth processing input information and are not included in the third processing input information.

Here, in the obfuscating apparatus, the conversion by the first conversion unit and the conversion by the third conversion unit may be performed based on numbers which are included in both the first processing input information and the third processing input information.

Here, the obfuscating apparatus may include a fourth conversion unit for converting fourth conversion input information which is composed of one or more numbers to fourth conversion output information which is composed of one or more numbers, the fourth conversion input information includes at least one number included in the third processing output information, and the second table output information includes the fourth processing output information instead of the third processing output information.

Here, the obfuscating apparatus may receive fifth processing as input, the fifth processing calculating, based on fifth processing input information which is composed of one or more numbers, fifth processing output information which is composed of one or more numbers, and include a process dividing unit for dividing the fifth processing into one or more 4-input/1-output processes and one or more 2-input/1-output processes, each of the 4-input/1-output processes calculating, based on process input information including four numbers, process output information including one number, and each of the 2-input/1-output processes calculating, based on process input information including two numbers, process output information including one number. Here, each of the first processing and the third processing may be at least one of the 4-input/1-output processes and the 2-input/1-output processes.

Additionally, the present invention is also embodied as a obfuscation method which receives first processing as input and outputs a first table, the first processing calculating, based on first processing input information which is composed of one or more numbers, first processing output information, which is composed of one or more numbers. The obfuscation method includes: a first converting step of converting first conversion input information, which is composed of one or more numbers, to first conversion output information which is composed of one or more numbers; and a first table generating step of generating the first table indicating correspondence between first table input information which is composed of one or more numbers and first table output information which composed of one or more numbers. Here, the first table input information may include (i) a number included in the first processing input information or in the first conversion input information and (ii) a number included in additional input information which is composed of one or more numbers, and the first table output information includes the first processing output information or the first conversion output information.

Here, the obfuscation method may further include a second converting step of converting second conversion input information, which is composed of one or more numbers, to second conversion output information, which is composed of one or more numbers. Here, the first table input information is composed of a number included in the first conversion input information and a number included in the additional input information, the first processing input information includes at least one number included in the conversion output information, the second conversion input information includes at least one number included in the first processing output information, and the first table output information includes the second conversion output information.

Here, the conversion performed in the first converting step may be a conversion operation based on the first table input information.

Here, the obfuscation method may further receive second processing as input, in addition to the first processing, the second processing calculating, based on second process input information which is composed of one or more numbers, second processing output information, which is composed of one or more numbers, and further include an additional input information determining step of determining, as the additional input information, numbers which are included in the second processing input information and are not included in the first processing input information.

Here, the second processing may calculate, using the second processing input information composed of a first number and a second number, the second processing output information composed of a product of the first number and the second number; and the first processing may calculate, using the first processing input information composed of the first number, the first processing output information composed of a square of the first number.

Here, the obfuscation method may further receive third processing as input, in addition to the first processing and the second processing, and outputs the first table and a second table, the third processing calculating, based on third processing input information which includes (a) one or more numbers or (b) at least one number included in second intermediate value information, third processing output information which is composed of one or more numbers. The obfuscating apparatus includes: a third converting step of converting third conversion input information, which is composed of one or more numbers, to third conversion output information, which is composed of one or more numbers; a second table generating step of generating the second table which indicates correspondence between second table input information, which is composed of one or more numbers, and second table output information, which is composed of one or more numbers; and a third converting step of converting third conversion input information, which is composed of one or more numbers, to third conversion output information, which is composed of one or more numbers. The second table input information includes at least one of the numbers included the first table output information, the third conversion input information includes at least one number included in the first table output information, and the second table output information includes the third processing output information.

Here, the obfuscation method may further receive fourth processing as input, in addition to the first processing, the second processing, and the third processing, the fourth processing calculating, based on fourth processing input information which is composed of one or more numbers, fourth processing output information which is composed of one or more numbers, and the second table input information includes at least one of the numbers included in the first table output information and the second additional input information. Here, the obfuscation method includes a second additional input information determining step of determining, as the second additional input information, numbers which are included in the fourth processing input information and are not included in the third processing input information.

Here, in the obfuscation method, the conversion operation in the first converting step and the conversion operation in the third converting step may be performed based on numbers which are included in both the first processing input information and the third processing input information.

Here, the obfuscation method may include a fourth converting step of converting fourth conversion input information which is composed of one or more numbers to fourth conversion output information which is composed of one or more numbers, the fourth conversion input information includes at least one number included in the third processing output information, and the second table output information includes the fourth processing output information instead of the third processing output information.

Here, the obfuscation method may receive fifth processing as input, the fifth processing calculating, based on fifth processing input information which is composed of one or more numbers, fifth processing output information which is composed of one or more numbers, and include a process dividing step of dividing the fifth processing into one or more 4-input/1-output processes and one or more 2-input/1-output processes, each of the 4-input/1-output processes calculating, based on process input information including four numbers, process output information including one number, and each of the 2-input/1-output processes calculating, based on process input information including two numbers, process output information including one number. Here, each of the first processing and the third processing may be at least one of the 4-input/1-output processes and the 2-input/1-output processes.

The present invention is also embodied as an information processing system including the above-mentioned obfuscating apparatus, a program, and an information processing apparatus which executes the program. The program includes processing of calculating the first table output information based on the first table input information, using the first table.

In addition, the present invention is embodied as a program included in an information processing system which is composed of the obfuscating apparatus, the program, and an information processing apparatus for executing the program. The program includes processing of calculating the first table output information based on the first table input information, using the first table.

Here, the first processing may be part of decryption processing.

Here, the first processing may be part of signature generation processing.

The present invention is also embodied as a recording medium having recorded thereon the above-mentioned program.

Furthermore, the present invention is embodied as an information processing apparatus included in an information processing system which is composed of the obfuscating apparatus, a program and the information processing apparatus which executes the program, and the program includes processing of calculating the first table output information based on the first table input information, using the first table.

The present invention is also embodied as an integrated circuit of an obfuscating apparatus which receives first processing as input and outputs a first table, the first processing calculating, based on first processing input information which is composed of one or more numbers, first processing output information, which is composed of one or more numbers. The integrated circuit includes: a first conversion unit for converting first conversion input information, which is composed of one or more numbers, to first conversion output information which is composed of one or more numbers; and a first table generating unit for generating the first table indicating correspondence between first table input information which is composed of one or more numbers and first table output information which composed of one or more numbers. Here, the first table input information includes (i) a number included in the first processing input information or in the first conversion input information and (ii) a number included in additional input information which is composed of one or more numbers, and the first table output information includes the first processing output information or the first conversion output information.

The present invention is an integrated circuit of an information processing apparatus which executes information processing including the above-described first processing, the integrated circuit including: a table holding unit for holding the first table; and an output value calculating unit for receiving input of the first table input information and outputting the first table output information.

Furthermore, the obfuscating apparatus may output a program instead of the first table, and further include a program generating unit for generating the program composed of a program instruction group which includes one or more program instructions, and the program instruction group includes the processing which receives the first table input information as input and outputs the corresponding first table.

The present invention is also embodied as an obfuscating apparatus which generates an obfuscated program by obfuscating a program which includes first processing and second processing, the first processing performing processing using a first input value group which is a set of one or more input values, and the second processing performing second processing using a second input value group which includes more input values than those included in the first processing. The above-described obfuscating apparatus includes: an input unit for receiving the program; a table generating unit for generating a second table that establishes correspondence between the second input value group and a result of the second processing, and a first table that establishes correspondence between (a) the first input value group and an additional input value group and (b) results of the converted first processing; and a program generating unit for replacing the first processing in the program with processing which extracts the results from the first table with use of the first input value group and for replacing the second processing with processing which extracts the results from the second table with use of the second input value group. The additional input value group is a set of input values which are included in the second input value group and not included in the first input value group, and the converted first processing is processing generated by adding, to the first processing, processing which uses the addition input value group.

According to the stated structures, the present invention is able to prevent attacks which take advantage of the difference in the number of inputs between multiplication and squaring, and accordingly, is highly valuable.

(10) Each of the above-mentioned devices, specifically, is a computer system including a microprocessor, a ROM, a RAM, a hard disk unit, a display unit, a keyboard, a mouse, and the like. Computer programs are stored in the ROM, RAM, or hard disk unit, and each device achieves its predetermined functions as the microprocessor operates in accordance with the computer programs. Here, each computer program is composed of a plurality of command codes that show instructions with respects to the computer, for achieving the predetermined functions.

(11) All or part of the compositional elements of each apparatus may be composed from one system LSI (Large Scale Integration). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The LSI achieves its functions by the microprocessor operating according to the computer programs.

The structures of the above-described devices may be separately accumulated as an individual chip. Or, part or all of these structures may be included on one chip.

Here, the LSI may be an IC, a system LSI, a super LSI, or ultra LSI, depending on the degree of integration. Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

Furthermore, if a semiconductor technology or related technologies give birth to a new circuit-integrating technology that would replace the LSI, such technologies may be used for integrating the functional blocks. One such possibility is an application of biotechnology.

(12) Part or all of the compositional elements of each device may be composed of a removable IC card or a single module. The IC card or the module is a computer system composed of a microprocessor, a ROM, a RAM, or the like. The IC card or the module may include the aforementioned super-multifunctional LSI. The IC card or the module may achieve its functions by the microprocessor operating according to computer programs. The IC card or the module may be tamper-resistant.

(13) The present invention may be methods shown by the above. Furthermore, the methods may be a computer program realized by a computer, and may be a digital signal of the computer program.

(14) Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the digital signal recorded in any of the aforementioned recording medium apparatuses.

(15) Furthermore, the present invention may be the computer program or the digital signal transmitted on an electric communication network, a wireless or wired communication network, or a network of which the Internet is representative.

(16) Also, the present invention may be a computer system including a microprocessor and a memory, whereby the memory stores the computer program, and the microprocessor operates in accordance with the computer program.

(17) Furthermore, by transferring the program or the digital signal to the recording medium, or by transferring the program or the digital signal via a network or the like, the program or the digital signal may be executed by another independent computer system.

(18) The present invention may be any combination of the above-described embodiments and modifications.

According to the stated structure, it is possible to prevent attacks that take advantage of the difference in the number of inputs between multiplication and squaring.

Each apparatus included in the present invention processes information secretly without being known by a third party, applies a digital signature to information, prevents information tampering and identity thefts by performing signature verification, and so on that each apparatus can be managerially, continuously, and repeatedly used in all the industries where information needs to be handled securely and reliably. Furthermore, each apparatus included in the present invention is able to be manufactured and sold managerially, continuously, and repeatedly in the electronic device manufacturing industry.

The invention claimed is:

1. A program obfuscating apparatus which obfuscates an information security program instructing execution of a security operation that processes target information securely and reliably with use of key information, the program obfuscating apparatus comprising:

a non-transitory memory device that stores a program; and
a processing device that executes the program and causes the program obfuscating apparatus to operate as:
an acquisition unit that acquires the information security program in which a plurality of basic operations are placed in an order determined by the key information such that an operation result of the plurality of basic operations is equivalent to an operation result of the security operation, the plurality of basic operations being one or more first basic operations and one or more second basic operations, each of the first basic operations requiring a plurality of inputs, and each of the second basic operations requiring only part of the plurality of inputs;
a transformation unit that places an input dependent conversion operation and an input dependent inverse conversion operation before and after each of the second basic operations, respectively, the input dependent conversion operation depending on, among the plurality of inputs, one or more inputs unrequired for the second basic operation, and the input dependent inverse conversion operation being an inverse conversion of the input dependent conversion operation;
a table generating unit that, for each of the second basic operations, (i) generates a table which yields an operation result equivalent to an operation result of a set of operations including the input dependent conversion operation placed immediately before the second basic operation, the second basic operation, and the input dependent inverse conversion operation placed immediately after the second basic operation, and (ii) generates a reference instruction to refer to the table; and an output unit that outputs an obfuscated program including the generated tables and the generated reference instructions, wherein each of the second basic operations is a squaring operation, for each squaring operation included in the information security program, the transformation unit places an input value conversion operation and an inverse thereof, each depending on one or more inputs unrequired for the squaring operation, before and after each of the squaring operations, and the table generating unit generates, for each of the squaring operations, a table which yields an operation result equivalent to an operation result of a set of operations including the input dependent conversion operation, the squaring operation, and the input dependent inverse conversion operation, wherein the transformation unit further, with respect to each of the first basic operations, (a) places an input dependent conversion operation before the first basic operation, (b) places an input dependent inverse conversion operation after the first basic operation, or (c) places an input dependent conversion operation and an input dependent inverse conversion operation before and after the first basic operations, respectively, the input dependent conversion operation depending on the inputs required for the first basic operation, and the input dependent inverse conversion operation being an inverse conversion of the input dependent conversion operation which depends on the inputs required for the first basic operation, and each input dependent conversion operation is a subtraction operation, and each input dependent inverse conversion operation is an addition operation, wherein the transformation unit further places a first conversion operation and a second conversion operation immediately before each of the plurality of basic operations except for before a basic operation placed first in the information security program, the first conversion operation applying a first conversion to an operation result of a basic operation immediately preceding the basic operation, and the second conversion operation applying a second conversion to an operation result of the first conversion operation, the second conversion being an inverse conversion of the first conversion, the table generating unit further (i) generates a first table which yields an operation result equivalent to an operation result of a set of operations including the basic operation placed first in the information security program and the first conversion operation placed immediately thereafter, and (ii) generates a reference instruction to refer to the first table, for each of the plurality of basic operations except for the basic operation placed first and a basic operation placed last in the information security program, (iii) generates a second table which yields an operation result equivalent to a set of operations including the second conversion operation and the first conversion operation in addition to the subtraction operation placed immediately before the basic operation, the basic operation, and the addition operation placed immediately thereafter, and (iv) generates a reference instruction to refer to the second table, and (v) generates a third table which yields an operation result equivalent to a set of operations including the basic operation placed last in the information security program and a second conversion operation placed immediately before the basic operation, and (vi) generates a reference instruction to refer to the third table, and the output unit outputs the obfuscated program including the generated first, second, and third tables and all generated reference instructions, and wherein the transformation unit (i) decomposes the basic operations, the subtraction operations, the addition operations, the first conversion operations, and the second conversion operations placed in the information security program into a plurality of digit operations, and (ii) places the generated digit operations within the security information program, the table generating unit (i) generates a first digit operation table which yields an operation result equivalent to an operation result of digit operations among the generated digit operations such that the operation result of the first digit operation table is equivalent to the operation result of the set of operations including the basic operation placed first in the information security program and the first conversion operation placed immediately thereafter, and (ii) generates a digit operation reference instruction to refer to the first digit operation table, for each of the plurality of basic operations except for the basic operation placed first and the basic operation placed last in the information security program, (iii) generates a second digit operation table which yields an operation result equivalent to an operation result of digit operations among the generated digit operations such that the operation result of the second digit operation table is equivalent to the operation result of the set of operations including the subtraction operation placed immediately before the basic operation, the basic operation, the addition operation placed immediately thereafter, the second conversion operation, and the first conversion operation, and (iv) generates a digit operation reference instruction to refer to the second digit operation table, (v) generates a third digit operation table which yields an operation result equivalent to an operation result of digit operations among the generated digit operations such that the operation result of the third digit operation table is equivalent to the operation result of the set of operations including the basic operation placed last in the information security program and the second conversion operation placed immediately therebefore, and (vi) generates a digit operation reference instruction to refer to the third digit operation table, and the output unit outputs the obfuscated program including the generated first, second, and third digit operation tables and all generated digit operation table reference instructions.

2. The program obfuscating apparatus of claim 1, wherein the table generating unit generates each of the first, second, and third digit operation tables by selecting a table out of a predetermined number of shared tables.

3. The program obfuscating apparatus of claim 1, wherein the acquisition unit, the transformation unit, the table generating unit, and the output unit compose an integrated circuit.

4. The program obfuscating apparatus of claim 1, wherein the transformation unit places, as each of the input dependent conversion operation and the input dependent inverse conversion operation, a conversion operation which depends on a number of inputs, the number being equivalent to a number of the plurality of inputs required for the first basic operation.

5. The program obfuscating apparatus of claim 4, wherein the input dependent conversion operation and the input dependent inverse conversion operation each depend on, among the plurality of inputs, one or more inputs which are required for the first basic operation and unrequired for the second basic operation.

6. A program obfuscating apparatus which obfuscates an information security program instructing execution of a security operation that processes target information securely and reliably with use of key information, the program obfuscating apparatus comprising:
a non-transitory memory device that stores a program; and
a processing device that executes the program and causes the program obfuscating apparatus to operate as:
an acquisition unit that acquires the information security program in which a plurality of basic operations are placed in an order determined by the key information such that an operation result of the plurality of basic operations is equivalent to an operation result of the security operation, the plurality of basic operations being one or more first basic operations and one or more second basic operations, each of the first basic operations requiring a plurality of inputs, and each of the second basic operations requiring only part of the plurality of inputs;
a transformation unit that places an input dependent conversion operation and an input dependent inverse conversion operation before and after each of the second basic operations, respectively, the input dependent conversion operation depending on, among the plurality of inputs, one or more inputs unrequired for the second basic operation, and the input dependent inverse conversion operation being an inverse conversion of the input dependent conversion operation;
a table generating unit that, for each of the second basic operations, (i) generates a table which yields an operation result equivalent to an operation result of a set of operations including the input dependent conversion operation placed immediately before the second basic operation, the second basic operation, and the input dependent inverse conversion operation placed immediately after the second basic operation, and (ii) generates a reference instruction to refer to the table; and
an output unit that outputs an obfuscated program including the generated tables and the generated reference instructions, wherein
each of the second basic operations is a squaring operation,
for each squaring operation included in the information security program, the transformation unit places an input value conversion operation and an inverse thereof, each depending on one or more inputs unrequired for the squaring operation, before and after each of the squaring operations, and
the table generating unit generates, for each of the squaring operations, a table which yields an operation result equivalent to an operation result of a set of operations including the input dependent conversion operation, the squaring operation, and the input dependent inverse conversion operation, wherein
the transformation unit further, with respect to each of the first basic operations, (a) places an input dependent conversion operation before the first basic operation, (b) places an input dependent inverse conversion operation after the first basic operation, or (c) places an input dependent conversion operation and an input dependent inverse conversion operation before and after the first basic operations, respectively, the input dependent conversion operation depending on the inputs required for the first basic operation, and the input dependent inverse conversion operation being an inverse conversion of the input dependent conversion operation which depends on the inputs required for the first basic operation, and
each input dependent conversion operation is a subtraction operation, and each input dependent inverse conversion operation is an addition operation, wherein
the security operation is a modular exponential operation $C^d \bmod n$, n being a modulus, C being target information and secret key d being the key information,
the plurality of basic operations placed in the order determined by the key information are one or more modular multiplication operations and one or more modular squaring operations that are placed according to each bit value of the secret key d based on a binary method so that a result of the plurality of the basic operations is equivalent to an operation result of the modular exponential operation $C^d \bmod n$,
immediately before and immediately after each of the modular multiplication operations and the modular squaring operations except for immediately before and immediately after one of (a) a modular multiplication operation and (b) a modular squaring operation, which is placed first in the information security program, and one of (a) a modular multiplication operation and (b) a modular squaring operation, which is placed last in the information security program, the transformation unit places a subtraction operation and an addition operation that depend on one input value to (a) the modular multiplication operation or (b) the modular squaring operation, and
the table generating unit generates, for each of the modular multiplication operations and the modular squaring operations except for the one of (a) a modular multiplication operation and (b) a modular squaring operation, which is placed first in the information security program, and the one of (a) a modular multiplication operation and (b) a modular squaring operation, which is placed last in the information security program, a table which yields an operation result equivalent to a result of a set of operations including the subtraction operation placed immediately before the modular multiplication operation or the modular squaring operation, the modular multiplication operation or the modular squaring operation, and the addition operation placed immediately thereafter.

7. The program obfuscating apparatus of claim 6, wherein the information security program is a computer program which, with use of the modular exponential operation $C^d \bmod n$, performs one of secret communication, digital signature, and signature verification, with respect to the target information.

8. A program obfuscating apparatus which obfuscates an information security program instructing execution of a security operation that processes target information securely and reliably with use of key information, the program obfuscating apparatus comprising:
a non-transitory memory device that stores a program, and
a processing device that executes the program and causes the program obfuscating apparatus to operate as:
an acquisition unit that acquires the information security program in which a plurality of basic operations are placed in an order determined by the key information such that an operation result of the plurality of basic operations is equivalent to an operation result of the security operation, the plurality of basic operations being one or more first basic operations and one or more second basic operations, each of the first basic operations requiring a plurality of inputs, and each of the second basic operations requiring only part of the plurality of inputs;

a transformation unit that places an input dependent conversion operation and an input dependent inverse conversion operation before and after each of the second basic operations, respectively, the input dependent conversion operation depending on, among the plurality of inputs, one or more inputs unrequired for the second basic operation, and the input dependent inverse conversion operation being an inverse conversion of the input dependent conversion operation;

a table generating unit that, for each of the second basic operations, (i) generates a table which yields an operation result equivalent to an operation result of a set of operations including the input dependent conversion operation placed immediately before the second basic operation, the second basic operation, and the input dependent inverse conversion operation placed immediately after the second basic operation, and (ii) generates a reference instruction to refer to the table; and an output unit that outputs an obfuscated program including the generated tables and the generated reference instructions, wherein each of the second basic operations is a squaring operation, for each squaring operation included in the information security program, the transformation unit places an input value conversion operation and an inverse thereof, each depending on one or more inputs unrequired for the squaring operation, before and after each of the squaring operations, and the table generating unit generates, for each of the squaring operations, a table which yields an operation result equivalent to an operation result of a set of operations including the input dependent conversion operation, the squaring operation, and the input dependent inverse conversion operation, wherein the transformation unit further, with respect to each of the first basic operations, (a) places an input dependent conversion operation before the first basic operation, (b) places an input dependent inverse conversion operation after the first basic operation, or (c) places an input dependent conversion operation and an input dependent inverse conversion operation before and after the first basic operations, respectively, the input dependent conversion operation depending on the inputs required for the first basic operation, and the input dependent inverse conversion operation being an inverse conversion of the input dependent conversion operation which depends on the inputs required for the first basic operation, and each input dependent conversion operation is a subtraction operation, and each input dependent inverse conversion operation is an addition operation, wherein the security operation is a modular exponential operation $C^d \bmod n$, n being a modulus, C being target information and secret key d being the key information, the plurality of basic operations placed in the order determined by the key information are one or more modular multiplication operations and one or more modular squaring operations that are placed according to each bit value of the secret key d based on a binary method so that a result of the plurality of the basic operations is equivalent to an operation result of the modular exponential operation $C^d \bmod n$, the transformation unit (i) decomposes each of the modular multiplication operations except for (a) a modular multiplication operation placed first in the information security program and (b) a modular multiplication operation placed last in the information security program, places resulting multiplication operation and modular operation, and places, immediately before and immediately after the placed multiplication operation, a subtraction operation and an addition operation, respectively, the subtraction operation and the addition operation depending on an input value to the placed multiplication operation, and (ii) decomposes each of the modular squaring operations except for (a) a modular squaring operation placed first in the information security program and (b) a modular squaring operation placed last in the information security program, places resulting squaring operation and modular operation, and places, immediately before and immediately after the placed squaring operation, a subtraction operation and an addition operation, respectively, the subtraction operation and the addition operation depending on an input value to the placed squaring operation, and the table generating unit generates, for each placed multiplication operation or each placed squaring operation, which has a subtraction operation and an addition operation placed therebefore and thereafter, respectively, a table which yields an operation result equivalent to a result of a set of operations including the subtraction operation placed immediately before the placed multiplication operation or the placed squaring operation, the placed multiplication operation or the placed squaring operation, and the addition operation placed immediately thereafter.

9. An obfuscation system including the program obfuscating apparatus and a program execution apparatus, the program obfuscating apparatus obfuscating an information security program instructing execution of a security operation that processes target information securely and reliably with use of key information, wherein the program obfuscating apparatus includes:

a non-transitory memory device that stores a program; and a processing device that executes the program and causes the program obfuscating apparatus to operate as:

an acquisition unit that acquires the information security program in which a plurality of basic operations are placed in an order determined by the key information such that an operation result of the plurality of basic operations is equivalent to an operation result of the security operation, the plurality of basic operations being one or more first basic operations and one or more second basic operations, each of the first basic operations requiring a plurality of inputs, and each of the second basic operations requiring only part of the plurality of inputs;

a transformation unit that places an input dependent conversion operation and an input dependent inverse conversion operation before and after each of the second basic operations, respectively, the input dependent conversion operation depending on, among the plurality of inputs, one or more inputs unrequired for the second basic operation, and the input dependent inverse conversion operation being an inverse conversion of the input dependent conversion operation;

a table generating unit that, for each of the second basic operations, (i) generates a table which yields an operation result equivalent to an operation result of a set of operations including the input dependent conversion operation placed immediately before the second basic operation, the second basic operation, and the input dependent inverse conversion operation placed immediately after the second basic operation, and (ii) generates a reference instruction to refer to the table; and an output unit that outputs an obfuscated program including the generated tables and the generated reference instructions, the program execution apparatus includes an obfuscated program acquisition unit that acquires the obfuscated program, and, in accordance with reference instructions included in the obfuscation program, refers to the tables included in the obfuscated program, and processes the target information reliably and securely with use of the key information, wherein each of the second basic operations is a squaring operation, for each squaring operation included in the information security program, the transformation unit places an input value conversion operation and an inverse thereof, each depending on one or more inputs unrequired for the squaring operation, before and after each of the squaring operations, and the table generating unit generates, for each of the squaring operations, a table which yields an operation result equivalent to an operation result of a set of operations including the input dependent conversion operation, the squaring operation, and the input dependent inverse conversion operation, wherein the transformation unit further, with respect to each of the first basic operations, (a) places an input dependent conversion operation before the first basic operation, (b) places an input dependent inverse conversion operation after the first basic operation, or (c) places an input dependent conversion operation and an input dependent inverse conversion operation before and after the first basic operations, respectively, the input dependent conversion operation depending on the inputs required for the first basic operation, and the input dependent inverse conversion operation being an inverse conversion of the input dependent conversion operation which depends on the inputs required for the first basic operation, and each input dependent conversion operation is a subtraction operation, and each input dependent inverse conversion operation is an addition operation, wherein the transformation unit further places a first conversion operation and a second conversion operation immediately before each of the plurality of basic operations except for before a basic operation placed first in the information security program, the first conversion operation applying a first conversion to an operation result of a basic operation immediately preceding the basic operation, and the second conversion operation applying a second conversion to an operation result of the first conversion operation, the second conversion being an inverse conversion of the first conversion, the table generating unit further (i) generates a first table which yields an operation result equivalent to an operation result of a set of operations including the basic operation placed first in the information security program and the first conversion operation placed immediately thereafter, and (ii) generates a reference instruction to refer to the first table, for each of the plurality of basic operations except for the basic operation placed first and a basic operation placed last in the information security program, (iii) generates a second table which yields an operation result equivalent to a set of operations including the second conversion operation and the first conversion operation in addition to the subtraction operation placed immediately before the basic operation, the basic operation, and the addition operation placed immediately thereafter, and (iv) generates a reference instruction to refer to the second table, and (v) generates a third table which yields an operation result equivalent to a set of operations including the basic operation placed last in the information security program and a second conversion operation placed immediately before the basic operation, and (vi) generates a reference instruction to refer to the third table, and the output unit outputs the obfuscated program including the generated first, second, and third tables and all generated reference instructions, and wherein the transformation unit (i) decomposes the basic operations, the subtraction operations, the addition operations, the first conversion operations, and the second conversion operations placed in the information security program into a plurality of digit operations, and (ii) places the generated digit operations within the security information program, the table generating unit (i) generates a first digit operation table which yields an operation result equivalent to an operation result of digit operations among the generated digit operations such that the operation result of the first digit operation table is equivalent to the operation result of the set of operations including the basic operation placed first in the information security program and the first conversion operation placed immediately thereafter, and (ii) generates a digit operation reference instruction to refer to the first digit operation table, for each of the plurality of basic operations except for the basic operation placed first and the basic operation placed last in the information security program, (iii) generates a second digit operation table which yields an operation result equivalent to an operation result of digit operations among the generated digit operations such that the operation result of the second digit operation table is equivalent to the operation result of the set of operations including the subtraction operation placed immediately before the basic operation, the basic operation, the addition operation placed immediately thereafter, the second conversion operation, and the first conversion operation, and (iv) generates a digit operation reference instruction to refer to the second digit operation table, (v) generates a third digit operation table which yields an operation result equivalent to an operation result of digit operations among the generated digit operations such that the operation result of the third digit operation table is equivalent to the operation result of the set of operations including the basic operation placed last in the information security program and the second conversion operation placed immediately therebefore, and (vi) generates a digit operation reference instruction to refer to the third digit operation table, and the output unit outputs the obfuscated program including the generated first, second, and third digit operation tables and all generated digit operation table reference instructions.

10. A program obfuscation method used by a program obfuscating apparatus which obfuscates an information security program instructing execution of a security operation that processes target information securely and reliably with use of key information, the program obfuscation method comprising:
- an acquiring step of acquiring the information security program in which a plurality of basic operations are placed in an order determined by the key information such that an operation result of the plurality of basic operations is equivalent to an operation result of the security operation, the plurality of basic operations being one or more first basic operations and one or more second basic operations, each of the first basic operations requiring a plurality of inputs, and each of the second basic operations requiring only part of the plurality of inputs;
- a transforming step of placing an input dependent conversion operation and an input dependent inverse conversion operation before and after each of the second basic operations, respectively, the input dependent conversion operation depending on, among the plurality of inputs, one or more inputs unrequired for the second basic operation, and the input dependent inverse conversion operation being an inverse conversion of the input dependent conversion operation;
- a table generating step of, for each of the second basic operations, (i) generating a table which yields an operation result equivalent to an operation result of a set of operations including the input dependent conversion operation placed immediately before the second basic operation, the second basic operation, and the input dependent inverse conversion operation placed immediately after the second basic operation, and (ii) generating a reference instruction to refer to the table; and
- an outputting step of outputting an obfuscated program including the generated tables and the generated reference instructions, wherein each of the second basic operations is a squaring operation, for each squaring operation included in the information security program, the transforming step places an input value conversion operation and an inverse thereof, each depending on one or more inputs unrequired for the squaring operation, before and after each of the squaring operations, and the table generating step generates, for each of the squaring operations, a table which yields an operation result equivalent to an operation result of a set of operations including the input dependent conversion operation, the squaring operation, and the input dependent inverse conversion operation, wherein the transforming step further, with respect to each of the first basic operations, (a) places an input dependent conversion operation before the first basic operation, (b) places an input dependent inverse conversion operation after the first basic operation, or (c) places an input dependent conversion operation and an input dependent inverse conversion operation before and after the first basic operations, respectively, the input dependent conversion operation depending on the inputs required for the first basic operation, and the input dependent inverse conversion operation being an inverse conversion of the input dependent conversion operation which depends on the inputs required for the first basic operation, and each input dependent conversion operation is a subtraction operation, and each input dependent inverse conversion operation is an addition operation, wherein the transforming step further places a first conversion operation and a second conversion operation immediately before each of the plurality of basic operations except for before a basic operation placed first in the information security program, the first conversion operation applying a first conversion to an operation result of a basic operation immediately preceding the basic operation, and the second conversion operation applying a second conversion to an operation result of the first conversion operation, the second conversion being an inverse conversion of the first conversion, the table generating step further (i) generates a first table which yields an operation result equivalent to an operation result of a set of operations including the basic operation placed first in the information security program and the first conversion operation placed immediately thereafter, and (ii) generates a reference instruction to refer to the first table, for each of the plurality of basic operations except for the basic operation placed first and a basic operation placed last in the information security program, (iii) generates a second table which yields an operation result equivalent to a set of operations including the second conversion operation and the first conversion operation in addition to the subtraction operation placed immediately before the basic operation, the basic operation, and the addition operation placed immediately thereafter, and (iv) generates a reference instruction to refer to the second table, and (v) generates a third table which yields an operation result equivalent to a set of operations including the basic operation placed last in the information security program and a second conversion operation placed immediately before the basic operation, and (vi) generates a reference instruction to refer to the third table, and the output step outputs the obfuscated program including the generated first, second, and third tables and all generated reference instructions, and wherein the transforming step (i) decomposes the basic operations, the subtraction operations, the addition operations, the first conversion operations, and the second conversion operations placed in the information security program into a plurality of digit operations, and (ii) places the generated digit operations within the security information program, the table generating step (i) generates a first digit operation table which yields an operation result equivalent to an operation result of digit operations among the generated digit operations such that the operation result of the first digit operation table is equivalent to the operation result of the set of operations including the basic operation placed first in the information security program and the first conversion operation placed immediately thereafter, and (ii) generates a digit operation reference instruction to refer to the first digit operation table, for each of the plurality of basic operations except for the basic operation placed first and the basic operation placed last in the information security program, (iii) generates a second digit operation table which yields an operation result equivalent to an operation result of digit operations among the generated digit operations such that the operation result of the second digit operation table is equivalent to the operation result of the set of operations including the subtraction operation placed immediately before the basic operation, the basic operation, the addition operation placed immediately thereafter, the second conversion operation, and the first conversion operation, and (iv) generates a digit operation reference instruction to refer to the second digit operation table, (v) generates a third digit operation table which yields an operation result equivalent to an operation result of digit operations among the generated digit operations such that the operation result of the third digit operation table is equivalent to the operation result of the set of operations including the basic operation placed last in the information security program and the second conversion operation placed immediately therebefore, and (vi) generates a digit operation reference instruction to refer to the third digit operation table, and the output step outputs the obfuscated program including the generated first, second, and third digit operation tables and all generated digit operation table reference instructions.

11. A non-transitory computer-readable recording medium having recorded thereon a computer program used in a program obfuscating apparatus for obfuscating a program, the program obfuscating apparatus obfuscating an information security program which instructs execution of a security operation that processes target information securely and reliably with use of key information, the computer program causing a computer to execute steps comprising:

an acquiring step of acquiring the information security program in which a plurality of basic operations are placed in an order determined by the key information such that an operation result of the plurality of basic operations is equivalent to an operation result of the security operation, the plurality of basic operations being one or more first basic operations and one or more second basic operations, each of the first basic operations requiring a plurality of inputs, and each of the second basic operations requiring only part of the plurality of inputs;

a transforming step of placing an input dependent conversion operation and an input dependent inverse conversion operation before and after each of the second basic operations, respectively, the input dependent conversion operation depending on, among the plurality of inputs, one or more inputs unrequired for the second basic operation, and the input dependent inverse conversion operation being an inverse conversion of the input dependent conversion operation;

a table generating step of, for each of the second basic operations, (i) generating a table which yields an operation result equivalent to an operation result of a set of operations including the input dependent conversion operation placed immediately before the second basic operation, the second basic operation, and the input dependent inverse conversion operation placed immediately after the second basic operation, and (ii) generating a reference instruction to refer to the table; and an outputting step of outputting an obfuscated program including the generated tables and the generated reference instructions, wherein each of the second basic operations is a squaring operation, for each squaring operation included in the information security program, the transforming step places an input value conversion operation and an inverse thereof, each depending on one or more inputs unrequired for the squaring operation, before and after each of the squaring operations, and the table generating step generates, for each of the squaring operations, a table which yields an operation result equivalent to an operation result of a set of operations including the input dependent conversion operation, the squaring operation, and the input dependent inverse conversion operation, wherein the transforming step further, with respect to each of the first basic operations, (a) places an input dependent conversion operation before the first basic operation, (b) places an input dependent inverse conversion operation after the first basic operation, or (c) places an input dependent conversion operation and an input dependent inverse conversion operation before and after the first basic operations, respectively, the input dependent conversion operation depending on the inputs required for the first basic operation, and the input dependent inverse conversion operation being an inverse conversion of the input dependent conversion operation which depends on the inputs required for the first basic operation, and each input dependent conversion operation is a subtraction operation, and each input dependent inverse conversion operation is an addition operation, wherein the transforming step further places a first conversion operation and a second conversion operation immediately before each of the plurality of basic operations except for before a basic operation placed first in the information security program, the first conversion operation applying a first conversion to an operation result of a basic operation immediately preceding the basic operation, and the second conversion operation applying a second conversion to an operation result of the first conversion operation, the second conversion being an inverse conversion of the first conversion, the table generating step further (i) generates a first table which yields an operation result equivalent to an operation result of a set of operations including the basic operation placed first in the information security program and the first conversion operation placed immediately thereafter, and (ii) generates a reference instruction to refer to the first table, for each of the plurality of basic operations except for the basic operation placed first and a basic operation placed last in the information security program, (iii) generates a second table which yields an operation result equivalent to a set of operations including the second conversion operation and the first conversion operation in addition to the subtraction operation placed immediately before the basic operation, the basic operation, and the addition operation placed immediately thereafter, and (iv) generates a reference instruction to refer to the second table, and (v) generates a third table which yields an operation result equivalent to a set of operations including the basic operation placed last in the information security program and a second conversion operation placed immediately before the basic operation, and (vi) generates a reference instruction to refer to the third table, and the output step outputs the obfuscated program including the generated first, second, and third tables and all generated reference instructions, and wherein the transforming step (i) decomposes the basic operations, the subtraction operations, the addition operations, the first conversion operations, and the second conversion operations placed in the information security program into a plurality of digit operations, and (ii) places the generated digit operations within the security information program, the table generating step
(i) generates a first digit operation table which yields an operation result equivalent to an operation result of digit operations among the generated digit operations such that the operation result of the first digit operation table is equivalent to the operation result of the set of operations including the basic operation placed first in the information security program and the first conversion operation placed immediately thereafter, and (ii) generates a digit operation reference instruction to refer to the first digit operation table, for each of the plurality of basic operations except for the basic operation placed first and the basic operation placed last in the information security program, (iii) generates a second digit operation table which yields an operation result equivalent to an operation result of digit operations among the generated digit operations such that the operation result of the second digit operation table is equivalent to the operation result of the set of operations including the subtraction operation placed immediately before the basic operation, the basic operation, the addition operation placed immediately thereafter, the second conversion operation, and the first conversion operation, and (iv) generates a digit operation reference instruction to refer to the second digit operation table, (v) generates a third digit operation table which yields an operation result equivalent to an operation result of digit operations among the generated digit operations such that the operation result of the third digit operation table is equivalent to the operation result of the set of operations including the basic operation placed last in the information security program and the second conversion operation placed immediately therebefore, and (vi) generates a digit operation reference instruction to refer to the third digit operation table, and the output step outputs the obfuscated program including the generated first, second, and third digit operation tables and all generated digit operation table reference instructions.

* * * * *